United States Patent
Flynn et al.

(10) Patent No.: US 10,013,354 B2
(45) Date of Patent: Jul. 3, 2018

(54) APPARATUS, SYSTEM, AND METHOD FOR ATOMIC STORAGE OPERATIONS

(75) Inventors: David Flynn, Sandy, UT (US); Stephan Uphoff, Roswell, GA (US); Xiangyong Ouyang, Columbus, OH (US); David Nellans, Salt Lake City, UT (US); Robert Wipfel, Draper, UT (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 789 days.

(21) Appl. No.: 13/193,559

(22) Filed: Jul. 28, 2011

(65) Prior Publication Data

US 2012/0030408 A1 Feb. 2, 2012
US 2014/0237159 A9 Aug. 21, 2014

Related U.S. Application Data

(63) Continuation-in-part of application No. 12/879,004, filed on Sep. 9, 2010, now Pat. No. 8,578,127.
(Continued)

(51) Int. Cl.
*G06F 12/02* (2006.01)
*G06F 3/06* (2006.01)
(Continued)

(52) U.S. Cl.
CPC ........ *G06F 12/0815* (2013.01); *G06F 3/0619* (2013.01); *G06F 3/0643* (2013.01);
(Continued)

(58) Field of Classification Search
None
See application file for complete search history.

(56) References Cited

U.S. PATENT DOCUMENTS

| 5,193,184 A | 3/1993 | Belsan et al. |
| 5,261,068 A | 11/1993 | Gaskins et al. |

(Continued)

FOREIGN PATENT DOCUMENTS

| CN | 1771495 | 5/2006 |
| GB | 0123416 | 9/2001 |

(Continued)

OTHER PUBLICATIONS

Seltzer, Margo I. "Transaction Support in a Log-Structured File System". Data Engineering, 1993. Proceedings. Ninth International Conference on. IEEE, 1993.*
(Continued)

*Primary Examiner* — Charles Rones
*Assistant Examiner* — Hewy H Li
(74) *Attorney, Agent, or Firm* — Loza & Loza, LLP; Gabriel Fitch

(57) ABSTRACT

A storage layer (SL) for a non-volatile storage device presents a logical address space of a non-volatile storage device to storage clients. Storage metadata assigns logical identifiers in the logical address space to physical storage locations on the non-volatile storage device. Data is stored on the non-volatile storage device in a sequential log-based format. Data on the non-volatile storage device comprises an event log of the storage operations performed on the non-volatile storage device. The SL presents an interface for requesting atomic storage operations. Previous versions of data overwritten by the atomic storage device are maintained until the atomic storage operation is successfully completed. Data pertaining to a failed atomic storage operation may be identified using a persistent metadata flag stored with the data on the non-volatile storage device. Data pertaining to failed or incomplete atomic storage requests may be invalidated and removed from the non-volatile storage device.

19 Claims, 21 Drawing Sheets

Related U.S. Application Data

(60) Provisional application No. 61/382,816, filed on Sep. 14, 2010, provisional application No. 61/368,564, filed on Jul. 28, 2010.

(51) Int. Cl.
 G06F 11/14 (2006.01)
 G06F 12/0815 (2016.01)

(52) U.S. Cl.
 CPC .......... *G06F 3/0679* (2013.01); *G06F 3/0688* (2013.01); *G06F 11/1471* (2013.01); *G06F 12/0246* (2013.01); *G06F 2212/7201* (2013.01); *G06F 2212/7207* (2013.01)

(56) References Cited

U.S. PATENT DOCUMENTS

| | | | |
|---|---|---|---|
| 5,325,509 A | 6/1994 | Lautzenheiser | |
| 5,404,485 A | 4/1995 | Ban | |
| 5,414,840 A * | 5/1995 | Rengarajan | G06F 17/30362 |
| 5,438,671 A | 8/1995 | Miles | |
| 5,499,367 A | 3/1996 | Bamford et al. | |
| 5,504,882 A | 4/1996 | Chai | |
| 5,535,399 A | 7/1996 | Blitz et al. | |
| 5,553,261 A | 9/1996 | Hasbun et al. | |
| 5,594,883 A | 1/1997 | Pricer | |
| 5,598,370 A | 1/1997 | Nijima et al. | |
| 5,651,133 A | 7/1997 | Burkes | |
| 5,682,497 A | 10/1997 | Robinson | |
| 5,682,499 A | 10/1997 | Bakke et al. | |
| 5,701,434 A | 12/1997 | Nakagawa | |
| 5,754,563 A | 5/1998 | White | |
| 5,802,602 A | 9/1998 | Rahman et al. | |
| 5,832,515 A | 11/1998 | Ledain et al. | |
| 5,845,329 A | 12/1998 | Onishi et al. | |
| 5,960,462 A | 9/1999 | Solomon et al. | |
| 6,000,019 A | 12/1999 | Dykstal et al. | |
| 6,014,724 A | 1/2000 | Jennett | |
| 6,170,039 B1 | 1/2001 | Kishida | |
| 6,170,047 B1 | 1/2001 | Dye | |
| 6,173,381 B1 | 1/2001 | Dye | |
| 6,185,654 B1 | 2/2001 | Van Doren | |
| 6,236,593 B1 | 5/2001 | Hong et al. | |
| 6,256,642 B1 | 7/2001 | Krueger et al. | |
| 6,311,290 B1 | 10/2001 | Hashbun et al. | |
| 6,330,688 B1 | 12/2001 | Brown | |
| 6,336,174 B1 | 1/2002 | Li et al. | |
| 6,356,986 B1 | 3/2002 | Solomon et al. | |
| 6,370,631 B1 | 4/2002 | Dye | |
| 6,385,710 B1 | 5/2002 | Goldman et al. | |
| 6,404,647 B1 | 6/2002 | Minne | |
| 6,412,080 B1 | 6/2002 | Fleming et al. | |
| 6,418,478 B1 | 7/2002 | Ignatius et al. | |
| 6,480,933 B1 * | 11/2002 | Cargemel et al. | 711/113 |
| 6,507,911 B1 | 1/2003 | Langford | |
| 6,523,102 B1 | 2/2003 | Dye et al. | |
| 6,535,997 B1 * | 3/2003 | Janson | G06Q 40/02 |
| | | | 235/380 |
| 6,564,285 B1 | 5/2003 | Mills | |
| 6,587,915 B1 | 7/2003 | Kim | |
| 6,601,211 B1 | 7/2003 | Norman | |
| 6,625,685 B1 | 9/2003 | Cho et al. | |
| 6,629,112 B1 | 9/2003 | Shank | |
| 6,658,438 B1 | 12/2003 | Moore et al. | |
| 6,671,757 B1 | 12/2003 | Multer et al. | |
| 6,715,027 B2 | 3/2004 | Kim et al. | |
| 6,725,342 B1 | 4/2004 | Coulson | |
| 6,751,155 B2 | 6/2004 | Gorobets | |
| 6,754,774 B2 | 6/2004 | Gruner et al. | |
| 6,775,185 B2 | 8/2004 | Fujisawa et al. | |
| 6,779,088 B1 | 8/2004 | Benveniste et al. | |
| 6,785,785 B2 | 8/2004 | Piccirillo et al. | |
| 6,865,657 B1 | 3/2005 | Traversat et al. | |
| 6,877,076 B1 | 4/2005 | Cho et al. | |
| 6,880,049 B2 | 4/2005 | Gruner et al. | |
| 6,883,079 B1 | 4/2005 | Priborsky | |
| 6,938,133 B2 | 8/2005 | Johnson et al. | |
| 6,957,158 B1 | 10/2005 | Hancock et al. | |
| 6,959,369 B1 | 10/2005 | Ashton et al. | |
| 6,973,551 B1 | 12/2005 | Walton | |
| 6,981,070 B1 | 12/2005 | Luk et al. | |
| 6,996,676 B2 | 2/2006 | Megiddo | |
| 7,010,652 B2 | 3/2006 | Piccirillo et al. | |
| 7,010,662 B2 | 3/2006 | Aasheim et al. | |
| 7,043,599 B1 | 5/2006 | Ware et al. | |
| 7,050,337 B2 | 5/2006 | Iwase et al. | |
| 7,058,769 B1 | 6/2006 | Danilak | |
| 7,076,599 B2 | 7/2006 | Aasheim et al. | |
| 7,082,495 B2 | 7/2006 | DeWhitt et al. | |
| 7,082,512 B2 | 7/2006 | Aasheim et al. | |
| 7,089,391 B2 | 8/2006 | Geiger et al. | |
| 7,093,101 B2 | 8/2006 | Aasheim et al. | |
| 7,096,321 B2 | 8/2006 | Modha | |
| 7,167,953 B2 | 1/2007 | Megiddo et al. | |
| 7,173,852 B2 | 2/2007 | Gorobets | |
| 7,181,572 B2 | 2/2007 | Walmsley | |
| 7,194,577 B2 | 3/2007 | Johnson et al. | |
| 7,194,740 B1 | 3/2007 | Frank et al. | |
| 7,215,580 B2 | 5/2007 | Gorobets | |
| 7,219,238 B2 | 5/2007 | Saito et al. | |
| 7,243,203 B2 | 7/2007 | Scheuerlein | |
| 7,246,179 B2 | 7/2007 | Camara et al. | |
| 7,257,690 B1 | 8/2007 | Baird | |
| 7,275,135 B2 | 9/2007 | Coulson | |
| 7,305,520 B2 | 12/2007 | Voight et al. | |
| 7,310,711 B2 * | 12/2007 | New et al. | 711/154 |
| 7,340,558 B2 | 3/2008 | Lee et al. | |
| 7,340,566 B2 | 3/2008 | Voth | |
| 7,395,384 B2 | 7/2008 | Sinclair | |
| 7,398,348 B2 | 7/2008 | Moore et al. | |
| 7,415,575 B1 | 8/2008 | Tong et al. | |
| 7,450,420 B2 | 11/2008 | Sinclair et al. | |
| 7,487,320 B2 | 2/2009 | Bansal et al. | |
| 7,516,267 B2 | 4/2009 | Coulson et al. | |
| 7,529,905 B2 | 5/2009 | Sinclair | |
| 7,552,271 B2 | 6/2009 | Sinclair et al. | |
| 7,603,532 B2 | 10/2009 | Rajan et al. | |
| 7,610,348 B2 | 10/2009 | Kisley et al. | |
| 7,644,239 B2 | 1/2010 | Cenk Ergan et al. | |
| 7,725,628 B1 | 5/2010 | Phan et al. | |
| 7,743,210 B1 | 6/2010 | Jernigan, IV et al. | |
| 7,873,782 B2 | 1/2011 | Terry | |
| 7,930,326 B2 | 4/2011 | Doucette et al. | |
| 7,970,770 B2 | 6/2011 | Edwards | |
| 8,205,060 B2 | 6/2012 | Hanh et al. | |
| 8,417,901 B2 | 4/2013 | Lin | |
| 8,489,820 B1 | 7/2013 | Ellard | |
| 8,607,028 B2 | 12/2013 | Kale et al. | |
| 8,904,091 B1 | 12/2014 | Guda et al. | |
| 9,015,209 B2 | 4/2015 | Hahn et al. | |
| 2002/0069317 A1 | 6/2002 | Chow et al. | |
| 2002/0069318 A1 | 6/2002 | Chow et al. | |
| 2002/0103819 A1 | 8/2002 | Duvillier | |
| 2002/0181134 A1 | 12/2002 | Bunker et al. | |
| 2003/0028726 A1 | 2/2003 | Gaertner et al. | |
| 2003/0061296 A1 | 3/2003 | Craddock et al. | |
| 2003/0145230 A1 | 7/2003 | Chiu et al. | |
| 2003/0163630 A1 | 8/2003 | Aasheim et al. | |
| 2003/0198084 A1 | 10/2003 | Fujisawa et al. | |
| 2004/0003002 A1 | 1/2004 | Adelmann | |
| 2004/0044840 A1 | 3/2004 | Wong | |
| 2004/0128470 A1 | 7/2004 | Hetzler | |
| 2004/0148360 A1 | 7/2004 | Mehra et al. | |
| 2004/0186946 A1 | 9/2004 | Lee | |
| 2004/0268064 A1 | 12/2004 | Rudelic | |
| 2004/0268359 A1 | 12/2004 | Hanes | |
| 2005/0002263 A1 | 1/2005 | Iwase et al. | |
| 2005/0015539 A1 | 1/2005 | Horii et al. | |
| 2005/0027951 A1 | 2/2005 | Piccirillo et al. | |
| 2005/0120177 A1 | 6/2005 | Black | |
| 2005/0141313 A1 | 6/2005 | Gorobets | |
| 2005/0193166 A1 | 9/2005 | Johnson et al. | |
| 2005/0240713 A1 | 10/2005 | Wu | |

(56) References Cited

U.S. PATENT DOCUMENTS

| | | |
|---|---|---|
| 2005/0246487 A1 | 11/2005 | Ergan |
| 2005/0246510 A1 | 11/2005 | Retnamma et al. |
| 2005/0257017 A1 | 11/2005 | Yagi |
| 2005/0267882 A1 | 12/2005 | Auperlee et al. |
| 2005/0273476 A1 | 12/2005 | Wertheimer |
| 2006/0004955 A1 | 1/2006 | Ware et al. |
| 2006/0075057 A1 | 4/2006 | Gildea et al. |
| 2006/0095659 A1 | 5/2006 | New et al. |
| 2006/0129778 A1 | 6/2006 | Clark et al. |
| 2006/0143396 A1 | 6/2006 | Cabot |
| 2006/0149893 A1 | 7/2006 | Barfuss et al. |
| 2006/0153026 A1* | 7/2006 | Blacquiere et al. .......... 369/47.1 |
| 2006/0179263 A1 | 8/2006 | Song et al. |
| 2006/0184722 A1 | 8/2006 | Sinclair |
| 2006/0190552 A1 | 8/2006 | Henze et al. |
| 2006/0248387 A1 | 11/2006 | Nicholson et al. |
| 2006/0265636 A1 | 11/2006 | Hummler |
| 2006/0294300 A1 | 12/2006 | Lubbers |
| 2007/0016699 A1 | 1/2007 | Minami |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0043900 A1 | 2/2007 | Yun |
| 2007/0043915 A1 | 2/2007 | Moir et al. |
| 2007/0050571 A1 | 3/2007 | Nakamura |
| 2007/0061508 A1 | 3/2007 | Zweighaft |
| 2007/0083530 A1* | 4/2007 | Lakshminath et al. ....... 707/100 |
| 2007/0088666 A1 | 4/2007 | Saito |
| 2007/0118713 A1 | 5/2007 | Guterman |
| 2007/0143560 A1 | 6/2007 | Gorobets |
| 2007/0143561 A1 | 6/2007 | Gorobets |
| 2007/0147356 A1 | 6/2007 | Gorobets |
| 2007/0156998 A1 | 7/2007 | Gorobets |
| 2007/0169030 A1* | 7/2007 | Tarditi et al. ................. 717/140 |
| 2007/0198770 A1 | 8/2007 | Horii et al. |
| 2007/0208790 A1 | 9/2007 | Reuter et al. |
| 2007/0233937 A1 | 10/2007 | Coulson et al. |
| 2007/0260608 A1 | 11/2007 | Hertzberg et al. |
| 2007/0266037 A1 | 11/2007 | Terry |
| 2007/0274150 A1 | 11/2007 | Gorobets |
| 2007/0276994 A1 | 11/2007 | Caulkins et al. |
| 2007/0294474 A1 | 12/2007 | Panabaker et al. |
| 2007/0300008 A1 | 12/2007 | Rogers et al. |
| 2008/0005220 A1* | 1/2008 | Tsunakawa ............ G06F 9/466 709/201 |
| 2008/0010395 A1 | 1/2008 | Mylly et al. |
| 2008/0046443 A1 | 2/2008 | Fachan et al. |
| 2008/0052477 A1 | 2/2008 | Lee |
| 2008/0126507 A1 | 5/2008 | Wilkinson |
| 2008/0140737 A1 | 6/2008 | Garst et al. |
| 2008/0141043 A1 | 6/2008 | Flynn et al. |
| 2008/0163220 A1* | 7/2008 | Wang et al. .................. 718/101 |
| 2008/0195798 A1 | 8/2008 | Lee et al. |
| 2008/0228992 A1 | 9/2008 | Dumitru et al. |
| 2008/0243966 A1 | 10/2008 | Croisettier |
| 2008/0263259 A1 | 10/2008 | Sadovsky et al. |
| 2008/0263305 A1 | 10/2008 | Shu et al. |
| 2008/0263569 A1 | 10/2008 | Shu et al. |
| 2008/0288819 A1* | 11/2008 | Heller, Jr. ........................ 714/19 |
| 2008/0320209 A1 | 12/2008 | Lee et al. |
| 2008/0320253 A1* | 12/2008 | Tomlin .................... G06F 9/466 711/155 |
| 2009/0125700 A1 | 5/2009 | Kisel |
| 2009/0132760 A1* | 5/2009 | Flynn et al. .................. 711/113 |
| 2009/0150599 A1 | 6/2009 | Bennett |
| 2009/0150605 A1* | 6/2009 | Flynn et al. .................. 711/112 |
| 2009/0222596 A1 | 9/2009 | Flynn et al. |
| 2009/0248763 A1 | 10/2009 | Rajan |
| 2009/0287887 A1 | 11/2009 | Matsuki |
| 2009/0292861 A1 | 11/2009 | Kanevsky et al. |
| 2010/0005228 A1 | 1/2010 | Fukutomi |
| 2010/0005255 A1 | 1/2010 | Kaushik et al. |
| 2010/0082529 A1 | 4/2010 | Mace et al. |
| 2010/0095059 A1 | 4/2010 | Kisley et al. |
| 2010/0153660 A1 | 6/2010 | Lasser |
| 2010/0205335 A1 | 8/2010 | Phan et al. |
| 2010/0211737 A1 | 8/2010 | Flynn |
| 2010/0262738 A1 | 10/2010 | Swing et al. |
| 2010/0262740 A1 | 10/2010 | Borchers et al. |
| 2010/0262757 A1 | 10/2010 | Sprinkle et al. |
| 2010/0262758 A1 | 10/2010 | Swing et al. |
| 2010/0262759 A1 | 10/2010 | Borchers et al. |
| 2010/0262760 A1 | 10/2010 | Swing et al. |
| 2010/0262761 A1 | 10/2010 | Borchers et al. |
| 2010/0262762 A1 | 10/2010 | Borchers et al. |
| 2010/0262766 A1 | 10/2010 | Sprinkle et al. |
| 2010/0262767 A1 | 10/2010 | Borchers et al. |
| 2010/0262773 A1 | 10/2010 | Borchers et al. |
| 2010/0262894 A1 | 10/2010 | Swing et al. |
| 2010/0262979 A1 | 10/2010 | Borchers et al. |
| 2011/0066792 A1 | 3/2011 | Shaeffer et al. |
| 2011/0119446 A1 | 5/2011 | Blumrich et al. |
| 2011/0208915 A1 | 8/2011 | Bannon et al. |
| 2011/0225364 A1 | 9/2011 | Edwards |
| 2011/0296133 A1 | 12/2011 | Flynn et al. |
| 2011/0320733 A1 | 12/2011 | Sanford et al. |
| 2012/0030408 A1 | 2/2012 | Flynn et al. |
| 2012/0059978 A1 | 3/2012 | Rosenband et al. |
| 2012/0110108 A1 | 5/2012 | Li et al. |
| 2012/0297140 A1 | 11/2012 | Wu et al. |
| 2012/0320209 A1 | 12/2012 | Rosenband et al. |
| 2013/0155855 A1 | 6/2013 | Batwara et al. |
| 2013/0166829 A1 | 6/2013 | Dumitru |

FOREIGN PATENT DOCUMENTS

| | | |
|---|---|---|
| WO | WO200201365 | 1/2002 |
| WO | WO2004099989 | 11/2004 |
| WO | WO2005103878 | 11/2005 |
| WO | WO2006065626 | 6/2006 |
| WO | WO2008130799 | 3/2008 |
| WO | WO2011106394 | 9/2011 |

OTHER PUBLICATIONS

IEEE Dictionary. "Atomic transaction". 7th ed. Published in 2000. Last updated Feb. 27, 2007.*
Rosenblum, Mendel. "The Design and Implementation of a Log-Structured File System." Published 1991. <http://www.cs.berkeley.edu/~brewer/cs262/LFS.pdf>.*
Randal, Paul S. "Understanding Logging and Recovery in SQL Server". Published Feb. 2009. <http://technet.microsoft.com/en-us/magazine/2009.02.logging.aspx>.*
Russinovich, Mark E. "Windows Internals, Fifth Edition". Chapters 11-12: "Common Log File System", "NTFS Design Goals and Features". Published Jun. 17, 2009.*
Weissel, Andreas. "Revisiting Log-Structured File Systems for Low-Power Portable Storage". Published Mar. 2005. <https://www4.cs.fau.de/~weissel/Publications/Papers/IWSSPS05.pdf>.*
Wikipedia. "Journaling File System". Published on Jul. 4, 2009.*
Wikipedia. "Transaction log". Published on Jul. 4, 2009.*
Chao, Chia, et al. Mime: a high performance parallel storage device with strong recovery guarantees. Technical Report HPL-CSP-92-9, Hewlett-Packard Laboratories, 1992.*
Rosenblum, Mendel, and John K. Ousterhout. "The design and implementation of a log-structured file system." ACM Transactions on Computer Systems (TOCS) 10.1 (1992): 26-52.*
Ganger, Gregory R., et al. "Soft updates: a solution to the metadata update problem in file systems." ACM Transactions on Computer Systems (TOCS)18.2 (2000): 127-153.*
International Bureau, International Report on Patentability for PCT/US2011/036539, dated Nov. 22, 2012.
International Bureau, International Search Report for PCT/US2011/045801, dated Apr. 6, 2012.
Arpaci-Dusseau, "Removing the Costs of Indirection in Flash-based SSDs with Nameless Writes," Jun. 2010, HotStorage'10, Boston, MA.
Spillane, Richard P., et al., "Enabling Transactional File Access via Lightweight Kernel Extensions," Appears in the Proceedings of the

(56) References Cited

OTHER PUBLICATIONS

7th USENIX Conference on File and Storage Technologies (FAST '09), Stony Brook University, IBM T. J. Watson Research Center, Feb. 25, 2009.
Gal, Eran, et al., "A Transactional Flash File System for Microcontrollers," School of Computer Science, Tel-Aviv University, USENIX Association, 2005 USENIX Annual Technical Conference, pp. 89-104.
Wright, Charles P., "Extending ACID Semantics to the File System," IBM T. J. Watson Research Center, Stony Brook University, ACM Transactions on Storage, vol. 3, No. 2, May 2007, pp. 1-40.
Kawaguchi, Atsuo, et al., "A Flash-Memory Based File System," Advanced Research Laboratory, Hitachi, Ltd., 1995.
Porter, Donald E., et al., "Operating System Transactions," Department of Computer Sciences, The University of Texas at Austin, SOSP '09, Oct. 11-14, 2009, Big Sky, Montana, ACM 978-1-60558-752-3/09/10, Oct. 2009.
Seltzer, Margo Ilene, "File System Performance and Transaction Support," A.B. (Harvard/Radcliffe College) 1983, A dissertation submitted in partial satisfaction of the requirements of the degree of Doctor of Philosophy in Computer Science in the Graduate Division of the University of California at Berkeley, 1992.
Sears, Russell, et al., "Stasis: Flexible Transactional Storage," University of California, Berkeley, USENIX Association, OSDI '06: 7th USENIX Symposium on Operating Systems Design and Implementation, pp. 29-44, Nov. 6, 2006.
Seltzer, Margo I., "Transaction Support in a Log-Structured File System," Harvard University Division of Applied Sciences, 1993.
Seltzer, Margo, et al., "Transaction Support in Read Optimized and Write Optimized File Systems," Department of Electrical Engineering and Computer Science, University of California Berkeley, California 94720, Proceedings of the 16th VLDB Conference, Brisbane, Australia, 1990.
Coburn, Joel, "NV-Heaps: Making Persistent Objects Fast and Safe with Next-Generation, Non-Volatile Memories," Department of Computer Science and Engineering, University of California, San Diego, ASPLOS '11, Mar. 5-11, 2011, Newport Beach, California, ACM 978-1-4503-0266-1/11/03, Mar. 5, 2011.
Volos, Haris, et al., "Mnemosyne: Lightweight Persistent Memory," Computer Sciences Department, University of Wisconsin—Madison, Skype Limited, ASPLOS '11, Mar. 5-11, 2011, Newport Beach, California, ACM 978-1-4503-0266-1/11/03, Mar. 5, 2011.
Brandon, Jr., Daniel, Ph.D., "Sparse Matrices in CS Education," Christian Brothers University, 650 East Parkway South, Memphis, Tennessee 38104, 2009, pp. 93-98, May 2009.
Rosenblum, Mendel, "The Design and Implementation of a Log-structured File System," 1992.
Wu, Michael, et al., "eNVy: A Non-Volatile, Main Memory Storage System," Department of Electrical and Computer Engineering, Department of Computer Science, Rice University, ASPLOS VI-10/94 San Jose, California, 1994, ACM 0-89791-660-3/94/0010, pp. 86-97, 1994.
WIPO, International Search Report and Written Opinion for PCT/US11/65927, dated Aug. 28, 2012.
European Patent Office, Supplementary Search Report for EP 11 81 3216, dated Nov. 7, 2013.
Macko et al. "Tracking Back References in a Write-Anywhere File System" Proceedings of the 8th USENIX Conference on File and Storage Technologies, (2010), 3 pages.
State Intellectual Property Office, Office Action, CN Application No. 200780050983.8, dated May 18, 2011.
State Intellectual Property Office, Office Action, CN Application No. 200780050970.0, dated Oct. 28, 2010.
State Intellectual Property Office, Office Action, CN Application No. 200780050970.0, dated Jun. 29, 2011.
State Intellectual Property Office, Office Action, CN Application No. 200780050970.0, dated Jan. 5, 2012.
State Intellectual Property Office, Office Action, CN Application No. 200780051020.X, dated Nov. 11, 2010.
State Intellectual Property Office, Office Action, CN Application No. 200780051020.X, dated Jul. 6, 2011.
State Intellectual Property Office, Office Action, CN Application No. 200780051020.X, dated Nov. 7, 2011.
European Patent Office, Office Action, EP Application No. 07865345.8, dated Nov. 17, 2010.
United States Patent Office, Final Office Action, U.S. Appl. No. 11/952,109, dated Nov. 29, 2011.
United States Patent Office, Office Action, U.S. Appl. No. 11/952,113, dated Mar. 6, 2012.
United States Patent Office, Office Action, U.S. Appl. No. 11/952,113, dated Dec. 15, 2010.
United States Patent Office, Office Action, U.S. Appl. No. 11/952,109, dated May 1, 2012.
Ari, "Performance Boosting and Workload Isolation in Storage Area Networks with SanCache," Hewlett Packard Laboratories, Proceedings of the 23rd IEEE / 14th NASA Goddard Conference on Mass Storage Systems and Technologies (MSST 2006), May 2006, pp. 263-27.
Gutmann, "Secure Deletion of Data from Magnetic and Solid-State Memory", Usenix, 14 pages, San Jose, CA, published Jul. 1, 1996.
Plank, "A Tutorial on Reed-Solomon Coding for Fault Tolerance in RAID-like System," Department of Computer Science, University of Tennessee, pp. 995-1012, Sep. 1997.
Actel, "Actel Fusion FPGAs Supporting Intelligent Peripheral Management Interface (IPMI) Applications," http://www.actel.com/documents/Fusion_IPMI_AN.pdf, Oct. 1, 2006, visited Mar. 11, 2010.
Asine, "ASPMC-660 Rugged IDE Flash Drive PMC Module", http://www.asinegroup.com/products/aspmc660.html, copyright 2002, visited Nov. 8, 2009.
BiTMICRO, "BiTMICRO Introduces E-Disk PMC Flash Disk Module at Military & Aerospace Electronics East 2004," http://www.bitmicro.com/press.sub, published May 18, 2004, visited Mar. 8, 2011.
Spansion, "Data Management Software (DMS) for AMD Simultaneous Read/Write Flash Memory Devices", published Jul. 7, 2003.
Van Hensbergen, "Dynamic Policy Disk Caching for Storage Networking," IBM Research Division, RC24123 (W0611-189), Nov. 2006.
Novell, "File System Primer", http://wiki.novell.com/index.php/File_System_Primer, 2006, visited Oct. 18, 2006.
Dan, "Implementing MLC NAND Flash for Cost-Effective, High-Capacity Memory," M-Systems, White Paper, 91-SR-014-02-8L, Rev 1.1, Sep. 2003.
Samsung Electronics, "Introduction to Samsung's Linux Flash File System—RFS Application Note", Version 1.0, Nov. 2006.
Morgenstern, David, "Is There a Flash Memory RAID in your Future?", http://www.eweek.com—eWeek, Ziff Davis Enterprise Holdings Inc., Nov. 8, 2006, visited Mar. 18, 2010.
Anonymous, "Method for Fault Tolerance in Nonvolatile Storage", http://ip.com, IP.com No. IPCOM000042269D, 2005.
Micron Technology, Inc., "NAND Flash 101: An Introduction to NAND Flash and How to Design It In to Your Next Product (TN-29-19)," http://www.micron.com/~/media/Documents/Products/Technical%20Note/NAND%20Flash/145tn2919_nand_101.pdf, 2006, visited May 10, 2010.
ELNEC, "NAND Flash Memories and Programming NAND Flash Memories Using ELNEC Device Programmers, Application Note," published Mar. 1, 2007.
Tal, "NAND vs. NOR Flash Technology," M-Systems, www2.electronicproducts.com/PrintArticle.aspx?ArticleURL=FEBMSY1.feb2002.html, visited Nov. 22, 2010.
Mesnier, "Object-Based Storage," IEEE Communications Magazine, Aug. 2003, pp. 84-90.
Garfinkel, "One Big File Is Not Enough: A Critical Evaluation of the Dominant Free-Space Sanitization Technique," 6th Workshop on Privacy Enhancing Technologies. Cambridge, United Kingdom, published Jun. 1, 2006.
Barrall et al., U.S. Appl. No. 60/625,495, "Dynamically Expandable and Contractible Fault-Tolerant Storage System Permitting Variously Sized Storage Devices and Method," filed Nov. 5, 2004.

(56) References Cited

OTHER PUBLICATIONS

Barrall et al., U.S. Appl. No. 60/718,768, "Dynamically Adaptable Fault-Tolerant Storage System," filed Sep. 20, 2005.
Terry et al., U.S. Appl. No. 60/797,127, "Filesystem-aware Block Storage System, Apparatus, and Method," filed May 3, 2006.
United States Patent Office, U.S. Appl. No. 60/912,728, published as U.S. Application Publication No. 20080263305 dated Oct. 23, 2008.
WIPO, International Search Report and Written Opinion for PCT/US2011/025885, dated Sep. 28, 2011.
WIPO, International Search Report and Written Opinion for PCT/US2007/025048, dated May 27, 2008.
WIPO, International Preliminary Report on Patentability for PCT/US2007/025048, dated Jun. 10, 2009.
WIPO, International Preliminary Report on Patentability for PCT/US2007/059048, dated Oct. 20, 2009.
WIPO, International Search Report and Written Opinion for PCT/US2007/059048, dated Aug. 25, 2008.
WIPO, International Preliminary Report on Patentability for PCT/US2007/086687, dated Mar. 18, 2009.
WIPO, International Search Report and Written Opinion for PCT/US2007/086687, dated Sep. 5, 2008.
WIPO, International Preliminary Report on Patentability for PCT/US2007/086688, dated Mar. 16, 2009.
WIPO, International Search Report and Written Opinion for PCT/US2007/086691, dated May 8, 2008.
WIPO, International Preliminary Report on Patentability for PCT/US2007/086691, dated Feb. 16, 2009.
WIPO, International Search Report and Written Opinion for PCT/US2007/086701, dated Jun. 5, 2008.
WIPO, International Preliminary Report on Patentability for PCT/US2007/086701, dated Mar. 16, 2009.
Adaptec, "Understanding Read and Write Caching," <http://ask.adaptec.com/app/answers/detail/a_id/2046/~/understanding-read-and-write-caching>, 2 pgs. Published Mar. 12, 2001.
Non-Final Office Action for U.S. Appl. No. 13/837,628, filed Mar. 15, 2013, and mailed from the USPTO dated Oct. 19, 2015, 47 pgs.
Final Office Action for U.S. Appl. No. 13/539,235, filed Jun. 29, 2012, and mailed from the USPTO dated Nov. 9, 2015, 20 pgs.
United States Patent Office, Non-Final Office Action, U.S. Appl. No. 13/107,820, dated Feb. 22, 2013.
United States Patent Office, Non-Final Office Action, U.S. Appl. No. 13/725,728, dated Dec. 21, 2012.
United States Patent Office, Non-Final Office Action, U.S. Appl. No. 13/335,922, dated Aug. 29, 2013.
United States Patent Office, Non-Final Office Action, U.S. Appl. No. 13/539,235, dated Feb. 13, 2015.
United States Patent Office, Non-Final Office Action, U.S. Appl. No. 14/087,297, dated Aug. 14, 2014.
United States Patent Office, Final Office Action, U.S. Appl. No. 14/087,297, dated Nov. 26, 2014.
United States Patent Office, Non-Final Office Action, U.S. Appl. No. 14/087,297, dated Mar. 11, 2015.
Batwara, et al., Non-Final Office Action dated May 21, 2015 for U.S. Appl. No. 13/725,728.
Batwara, et al., Notice of Allowance dated Oct. 19, 2015 for U.S. Appl. No. 13/725,728.
Flynn, et al., Final Office Action dated May 31, 2016 for U.S. Appl. No. 13/837,628.
Flynn, et al., Non-Final Office Action dated Jan. 12, 2017 for U.S. Appl. No. 13/837,628.
Flynn, et al., Non-Final Office Action dated Oct. 19, 2015 for U.S. Appl. No. 13/837,628.
Yehuda, et al., Atomicity of Restful Radosgw Operations, The Ceph Blog, Nov. 7, 2011, (Nov. 7, 2011), XP055148638, Retrieved from the Internet: URL:http://ceph.com/dev-notes/atomicity-of-restful-radosgw-operations/, [retrieved on Feb. 23, 2016], 3 pgs.
Flynn, et al., Office Action dated Jul. 25, 2017 for U.S. Appl. No. 14/994,452.
Flynn, et al., Notice of Allowance dated Oct. 25, 2017 for U.S. Appl. No. 13/837,628.

\* cited by examiner

APPARATUS, SYSTEM, AND METHOD FOR ATOMIC STORAGE OPERATIONS

CROSS REFERENCE TO RELATED APPLICATIONS

This application is a continuation-in-part of U.S. patent application Ser. No. 12/879,004, entitled, "Apparatus, System, and Method for Allocating Storage," filed on Sep. 9, 2010, and this application claims priority to U.S. Provisional Patent Application 61/368,564, entitled "Apparatus, System, and Method for Writing Data to Storage Media in a Single Atomic Operation," filed on Jul. 28, 2010, and to U.S. Provisional Patent Application No. 61/382,816, entitled "Atomic Writes", filed on Sep. 14, 2010, each of which are hereby incorporated by reference in its entirety.

FIELD OF THE INVENTION

The disclosure relates to data storage and, more particularly, to storing data on a storage media in a single, atomic storage operation.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
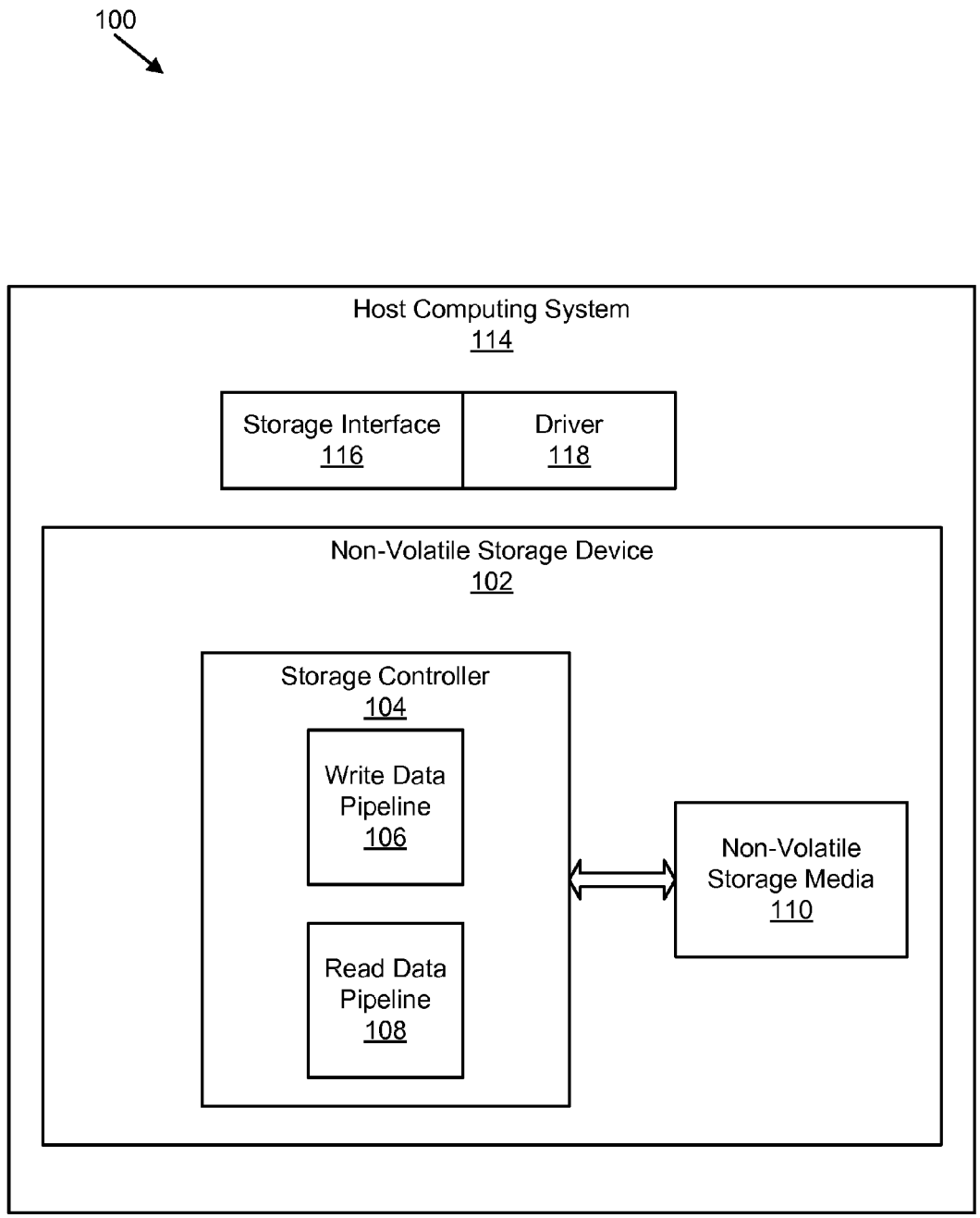
FIG. 1 is a block diagram of a system comprising a non-volatile storage device.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts one embodiment of a system 100 for reducing data loss. In the depicted embodiment, the system 100 includes a host computing system 114, a throughput management apparatus 122, and a storage device 102. The host computing system 114 may be a computer such as a server, laptop, desktop, a mobile device, or other computing device known in the art. The host computing system 114 typically includes components such as memory, processors, buses, and other components as known to those of skill in the art.

The host computing system 114 stores data in the storage device 102 and communicates data with the storage device 102 via a communications connection. The storage device 102 may be internal to the host computing system 114 or external to the host computing system 114. The communications connection may be a bus, a network, or other manner of connection allowing the transfer of data between the host computing system 114 and the storage device 102. In one embodiment, the storage device 102 is connected to the host computing system 114 by a PCI connection such as PCI express ("PCI-e"). The storage device 102 may be a card that plugs into a PCI-e connection on the host computing system 114.

The storage device 102, in the depicted embodiment, performs data storage operations such as reads, writes, erases, etc. In certain embodiments, a power connection and the communications connection for the storage device 102 are part of the same physical connection between the host computing system 114 and the storage device 102. For example, the storage device 102 may receive power over PCI, PCI-e, serial advanced technology attachment ("serial ATA" or "SATA"), parallel ATA ("PATA"), small computer system interface ("SCSI"), IEEE 1394 ("FireWire"), Fiber Channel, universal serial bus ("USB"), PCIe-AS, or another connection with the host computing system 114.

The storage device 102 provides nonvolatile storage for the host computing system 114. FIG. 1 shows the storage device 102 as a nonvolatile non-volatile storage device 102 comprising a storage controller 104, a write data pipeline 106, a read data pipeline 108, and nonvolatile non-volatile storage media 110. The storage device 102 may contain additional components that are not shown in order to provide a simpler view of the storage device 102.

The non-volatile storage media 110 stores data such that the data is retained even when the storage device 102 is not powered. In some embodiments, the non-volatile storage media 110 comprises a solid-state storage media, such as flash memory, nano random access memory ("NRAM"), magneto-resistive RAM ("MRAM"), dynamic RAM ("DRAM"), phase change RAM ("PRAM"), Racetrack memory, Memristor memory, nanocrystal wire-based memory, silicon-oxide based sub-10 nanometer process memory, graphene memory, Silicon-Oxide-Nitride-Oxide-Silicon ("SONOS"), Resistive random-access memory ("RRAM"), programmable metallization cell ("PMC"), conductive-bridging RAM ("CBRAM"), and the like. While, in the depicted embodiment, the storage device 102 includes non-volatile storage media 110, in other embodiments, the storage device 102 may include magnetic media such as hard disks, tape, and the like, optical media, or other nonvolatile data storage media. The storage device 102 also includes a storage controller 104 that coordinates the storage and retrieval of data in the non-volatile storage media 110. The storage controller 104 may use one or more indexes to locate and retrieve data, and perform other operations on data stored in the storage device 102. For example, the storage controller 104 may include a groomer for performing data grooming operations such as garbage collection.

As shown, the storage device 102, in certain embodiments, implements a write data pipeline 106 and a read data pipeline 108, an example of which is described in greater detail below. The write data pipeline 106 may perform certain operations on data as the data is transferred from the host computing system 114 into the non-volatile storage media 110. These operations may include, for example, error correction code (ECC) generation, encryption, compression, and others. The read data pipeline 108 may perform similar and potentially inverse operations on data that is being read out of non-volatile storage media 110 and sent to the host computing system 114.

In one embodiment, the host computing system 114 includes one or more other components in addition to the storage device 102, such as additional storage devices, graphics processors, network cards, and the like. Those of skill in the art, in view of this disclosure, will appreciate the different types of components that may be in a host computing system 114. The components may be internal or external to the host computing system 114. In one embodiment, some of the components may be PCI or PCI-e cards that connect to the host computing system 114 and receive power through the host computing system 114.

In some embodiments, the driver 118, or alternatively the storage interface 116, is an application program interface ("API") and acts to translate commands and other data to a form suitable to be sent to a storage controller 104. In another embodiment, the driver 118 includes one or more functions of the storage controller 104. For example, the driver 118 may include all or a portion of the modules described below and may include one or more indexes or maps for the storage devices 106. The driver 118, one or more storage controllers 104, and one or more storage devices 106 comprising the storage system 102 have a storage interface 116 connection to a file system/file server and allocation traditionally done in a file system/file server is advantageously pushed down (i.e., offloaded) to the storage system 102.

A logical identifier, as used in this application, is an identifier of a data unit that differs from a physical address where data of the data unit is stored. A data unit, as used in this application, is any set of data that is logically grouped together. A data unit may be a file, an object, a data segment of a redundant array of inexpensive/independent disks/drives ("RAID") data stripe, or other data set used in data storage. The data unit may be executable code, data, metadata, directories, indexes, any other type of data that may be stored in a memory device, or a combination thereof. The data unit may be identified by a name, by a logical address, a physical address, an address range, or other convention for identifying data units. A logical identifier includes data unit identifiers, such as a file name, an object identifier, an Mode, Universally Unique Identifier ("UUID"), Globally Unique Identifier ("GUID"), or other data unit label, and may also include a logical block address ("LBA"), cylinder/head/sector ("CHS"), or other lower level logical identifier. A logical identifier generally includes any logical label that can be mapped to a physical location.

In some embodiment, the storage device 106 stores data in a sequential log-based format on the non-volatile storage media 110. For example, when a data unit is modified, data of the data unit is read from one physical storage location, modified, and then written to a different physical storage location. The order and sequence of writing data to the data storage device 106 may comprise an event log of the sequence of storage operations performed on the non-volatile storage device 102. By traversing the event log (and/or replaying the sequence of storage operations), and storage metadata, such as a forward index can be constructed or reconstructed.

In a typical random access device, logical identifiers have almost a one-to-one correspondence to physical addresses of the random access device. This one-to-one mapping in a typical random access device (excluding a small number of physical addresses on the random access device reserved for bad block mapping) also correlates to a near one-to-one relationship between storage capacity associated with logical identifiers and physical capacity associated with physical addresses. For example, if a logical identifier is a logical block address ("LBA"), each logical block associated with an LBA has a fixed size. A corresponding physical block on the random access device is typically the same size as a logical block. This enables a typical file server 114/file system to manage physical capacity on the random access device by managing logical identifiers, such as LBAs. This continuity of LBA to PBA mapping is generally depended upon and utilized by file systems to defragment the data stored on the data storage device. Similarly, some systems may use this continuity to locate the data on specific physical tracks to improve performance as is the case of a technique called "short stroking" the disk drive. The highly predictable LBA to PBA mapping is essential in certain applications to indirectly manage the storage of the data in the physical storage space through direct management of the logical address space.

However, the storage system 102 may be a log structured file system such that there is no "fixed" relationship or algorithm to determine the mapping of the LBA to the PBA, or in another embodiment, may be random access, but may be accessed by more than one client 110 or file server 114/file system such that the logical identifiers allocated to each client 110 or file server 114/file system represent a storage capacity much larger than the one-to-one relationship of logical to physical identifiers of typical systems. The storage system 102 may also be thinly provisioned such that one or more clients 110 each has an allocated logical address range that is much larger than the storage capacity of the storage devices 106 in the storage system 102. In the system 100, the storage system 102 manages and allocates logical identifiers such that there is no pre-determined one-to-one or near one-to-one relationship between logical identifiers and physical identifiers.

The system 100 is advantageous because it allows more efficient management of storage capacity than typical storage systems. For example, for typical random access devices accessible by a number of clients 110, if each client is allocated a certain amount storage space, the storage space typically will exist and be tied up in the allocations even if the actual amount of storage space occupied is much less. The system 100 is also advantageous because the system 100 reduces complexity of standard thin provisioning systems connected to storage devices 106. A standard thin provisioning system has a thin provisioning layer comprising a logical-to-logical mapping between logical identifiers in the logical address space and physical storage locations. The system 100 is more efficient because multiple layers of mapping are eliminated and thin provisioning (logical-to-physical mapping) is done at the lowest level.

Figure 2:
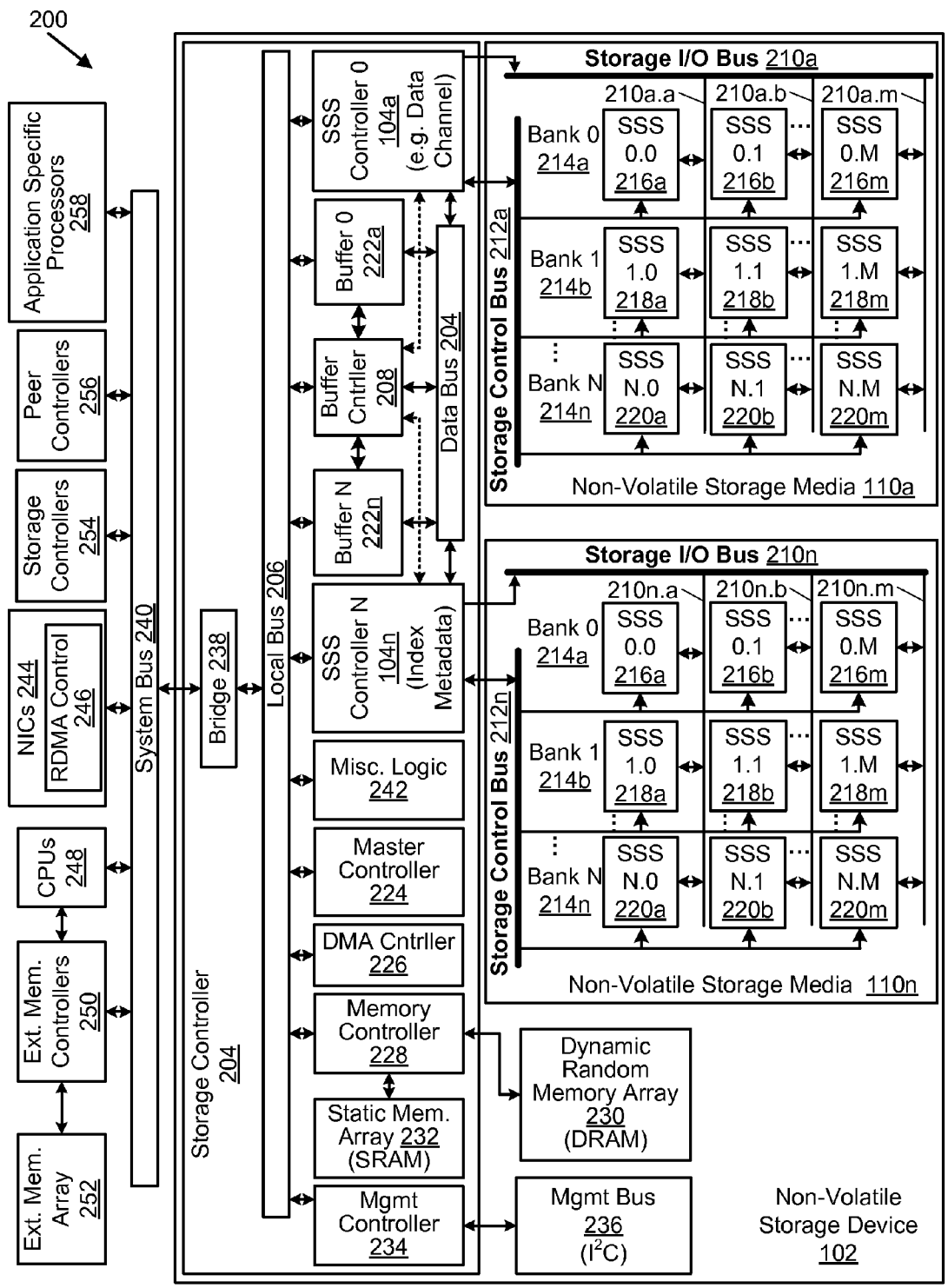
FIG. 2 is a block diagram of one embodiment of a non-volatile storage device.

FIG. 2 is a schematic block diagram illustrating one embodiment 200 of a non-volatile storage device controller 202 that includes a write data pipeline 106 and a read data pipeline 108 in a non-volatile storage device 102 in accordance with the present invention. The non-volatile storage device controller 202 may include a number of storage controllers 0-N 104a-n, each controlling non-volatile storage media 110. In the depicted embodiment, two non-volatile controllers are shown: non-volatile controller 0 104a and storage controller N 104n, and each controlling respective non-volatile storage media 110a-n. In the depicted embodiment, storage controller 0 104a controls a data channel so that the attached non-volatile storage media 110a stores data. Storage controller N 104n controls an index metadata channel associated with the stored data and the associated non-volatile storage media 110n stores index metadata. In an alternate embodiment, the non-volatile storage device controller 202 includes a single non-volatile controller 104*a* with a single non-volatile storage media 110*a*. In another embodiment, there are a plurality of storage controllers 104*a-n* and associated non-volatile storage media 110*a-n*. In one embodiment, one or more non-volatile controllers 104*a*-104*n*-1, coupled to their associated non-volatile storage media 110*a*-110*n*-1, control data while at least one storage controller 104*n*, coupled to its associated non-volatile storage media 110*n*, controls index metadata.

In one embodiment, at least one non-volatile controller 104 is a field-programmable gate array ("FPGA") and controller functions are programmed into the FPGA. In a particular embodiment, the FPGA is a Xilinx® FPGA. In another embodiment, the storage controller 104 comprises components specifically designed as a storage controller 104, such as an application-specific integrated circuit ("ASIC") or custom logic solution. Each storage controller 104 typically includes a write data pipeline 106 and a read data pipeline 108, which are describe further in relation to FIG. 3. In another embodiment, at least one storage controller 104 is made up of a combination FPGA, ASIC, and custom logic components.

The non-volatile storage media 110 is an array of non-volatile storage elements 216, 218, 220, arranged in banks 214, and accessed in parallel through a bi-directional storage input/output ("I/O") bus 210. The storage I/O bus 210, in one embodiment, is capable of unidirectional communication at any one time. For example, when data is being written to the non-volatile storage media 110, data cannot be read from the non-volatile storage media 110. In another embodiment, data can flow both directions simultaneously. However bi-directional, as used herein with respect to a data bus, refers to a data pathway that can have data flowing in only one direction at a time, but when data flowing one direction on the bi-directional data bus is stopped, data can flow in the opposite direction on the bi-directional data bus.

A non-volatile storage element (e.g., SSS 0.0 216*a*) is typically configured as a chip (a package of one or more dies) or a die on a circuit board. As depicted, a non-volatile storage element (e.g., 216*a*) operates independently or semi-independently of other non-volatile storage elements (e.g., 218*a*) even if these several elements are packaged together in a chip package, a stack of chip packages, or some other package element. As depicted, a row of non-volatile storage elements 216*a*, 216*b*, 216*m* is designated as a bank 214. As depicted, there may be "n" banks 214*a-n* and "m" non-volatile storage elements 216*a-m*, 218*a-m*, 220*a-m* per bank in an array of n×m non-volatile storage elements 216, 218, 220 in a non-volatile storage media 110. Of course, different embodiments may include different values for n and m. In one embodiment, a non-volatile storage media 110*a* includes twenty non-volatile storage elements 216*a*-216*m* per bank 214 with eight banks 214. In one embodiment, the non-volatile storage media 110*a* includes twenty-four non-volatile storage elements 216*a*-216*m* per bank 214 with eight banks 214. In addition to the n×m storage elements 216*a*-216*m*, 218*a*-218*m*, 220*a*-220*m*, one or more additional columns (P) may also be addressed and operated in parallel with other non-volatile storage elements 216*a*, 216*b*, 216*m* for one or more rows. The added P columns in one embodiment, store parity data for the portions of an ECC chunk (i.e., an ECC codeword) that span m storage elements for a particular bank. In one embodiment, each non-volatile storage element 216, 218, 220 is comprised of single-level cell ("SLC") devices. In another embodiment, each non-volatile storage element 216, 218, 220 is comprised of multi-level cell ("MLC") devices.

In one embodiment, non-volatile storage elements that share a common line 211 on the storage I/O bus 210*a* (e.g., 216*b*, 218*b*, 220*b*) are packaged together. In one embodiment, a non-volatile storage element 216, 218, 220 may have one or more dies per package with one or more packages stacked vertically and each die may be accessed independently. In another embodiment, a non-volatile storage element (e.g., SSS 0.0 216*a*) may have one or more virtual dies per die and one or more dies per package and one or more packages stacked vertically and each virtual die may be accessed independently. In another embodiment, a non-volatile storage element SSS 0.0 216*a* may have one or more virtual dies per die and one or more dies per package with some or all of the one or more dies stacked vertically and each virtual die may be accessed independently.

In one embodiment, two dies are stacked vertically with four stacks per group to form eight storage elements (e.g., SSS 0.0-SSS 8.0) 216*a*, 218*a* . . . 220*a*, each in a separate bank 214*a*, 214*b* . . . 214*n*. In another embodiment, 24 storage elements (e.g., SSS 0.0-SSS 0.24) 216*a*, 216*b*, . . . 216*m* form a logical bank 214*a* so that each of the eight logical banks has 24 storage elements (e.g., SSS 0.0-SSS 8.24) 216, 218, 220. Data is sent to the non-volatile storage media 110 over the storage I/O bus 210 to all storage elements of a particular group of storage elements (SSS 0.0-SSS 8.0) 216*a*, 218*a*, 220*a*. The storage control bus 212*a* is used to select a particular bank (e.g., Bank 0 214*a*) so that the data received over the storage I/O bus 210 connected to all banks 214 is written just to the selected bank 214*a*.

In one embodiment, the storage I/O bus 210 is comprised of one or more independent I/O buses ("IIOBa-m" comprising 210*a.a-m* . . . 210*n.a-m*) wherein the non-volatile storage elements within each column share one of the independent I/O buses that are connected to each non-volatile storage element 216, 218, 220 in parallel. For example, one independent I/O bus 210*a.a* of the storage I/O bus 210*a* may be physically connected to a first non-volatile storage element 216*a*, 218*a*, 220*a* of each bank 214*a-n*. A second independent I/O bus 210*a.b* of the storage I/O bus 210*b* may be physically connected to a second non-volatile storage element 216*b*, 218*b*, 220*b* of each bank 214*a-n*. Each non-volatile storage element 216*a*, 216*b*, 216*m* in a bank 214*a* (a row of non-volatile storage elements as illustrated in FIG. 2) may be accessed simultaneously and/or in parallel. In one embodiment, where non-volatile storage elements 216, 218, 220 comprise stacked packages of dies, all packages in a particular stack are physically connected to the same independent I/O bus. As used herein, "simultaneously" also includes near simultaneous access where devices are accessed at slightly different intervals to avoid switching noise. Simultaneously is used in this context to be distinguished from a sequential or serial access wherein commands and/or data are sent individually one after the other.

Typically, banks 214*a-n* are independently selected using the storage control bus 212. In one embodiment, a bank 214 is selected using a chip enable or chip select. Where both chip select and chip enable are available, the storage control bus 212 may select one package within a stack of packages. In other embodiments, other commands are used by the storage control bus 212 to individually select one package within a stack of packages. Non-volatile storage elements 216, 218, 220 may also be selected through a combination of control signals and address information transmitted on storage I/O bus 210 and the storage control bus 212.

In one embodiment, each non-volatile storage element 216, 218, 220 is partitioned into erase blocks and each erase block is partitioned into pages. An erase block on a non-volatile storage element 216, 218 220 may be called a physical erase block or "PEB." A typical page is 2048 bytes ("2 kB"). In one example, a non-volatile storage element (e.g., SSS 0.0) includes two registers and can program two pages so that a two-register non-volatile storage element 216, 218, 220 has a capacity of 4 kB. A bank 214 of 20 non-volatile storage elements 216a, 216b, 216m would then have an 80 kB capacity of pages accessed with the same address going out the independent I/O buses of the storage I/O bus 210.

This group of pages in a bank 214 of non-volatile storage elements 216a, 216b, . . . 216m of 80 kB may be called a logical page or virtual page. Similarly, an erase block of each storage element 216a, 216b, . . . 216m of a bank 214a may be grouped to form a logical erase block (which may also be called a virtual erase block). In one embodiment, an erase block of pages within a non-volatile storage element is erased when an erase command is received within the non-volatile storage element. Whereas the size and number of erase blocks, pages, planes, or other logical and physical divisions within a non-volatile storage element 216, 218, 220 are expected to change over time with advancements in technology, it is to be expected that many embodiments consistent with new configurations are possible and are consistent with the general description herein.

Typically, when a packet is written to a particular location within a non-volatile storage element 216, wherein the packet is intended to be written to a location within a particular page which is specific to a particular physical erase block of a particular storage element of a particular bank, a physical address is sent on the storage I/O bus 210 and is followed by the packet. The physical address contains enough information for the non-volatile storage element 216 to direct the packet to the designated location within the page. Since all storage elements in a column of storage elements (e.g., SSS 0.0-SSS N.0 216a, 218a, . . . 220a) are connected to the same independent I/O bus (e.g., 210.a.a) of the storage I/O bus 210a, to reach the proper page and to avoid writing the data packet to similarly addressed pages in the column of storage elements (SSS 0.0-SSS N.0 216a, 218a, . . . 220a), the bank 214a that includes the non-volatile storage element SSS 0.0 216a with the correct page where the data packet is to be written is selected by the storage control bus 212a and other banks 214b . . . 214n of the non-volatile storage 110a are deselected.

Similarly, satisfying a read command on the storage I/O bus 210 requires a signal on the storage control bus 212 to select a single bank 214a and the appropriate page within that bank 214a. In one embodiment, a read command reads an entire page, and because there are multiple non-volatile storage elements 216a, 216b, . . . 216m in parallel in a bank 214a, an entire logical page is read with a read command. However, the read command may be broken into subcommands, as will be explained below with respect to bank interleave. Similarly, an entire logical page may be written to the non-volatile storage elements 216a, 216b, . . . 216m of a bank 214a in a write operation.

An erase block erase command may be sent out to erase an erase block over the storage I/O bus 210 with a particular erase block address to erase a particular erase block. Typically, storage controller 104a may send an erase block erase command over the parallel paths (independent I/O buses 210a-n.a-m) of the storage I/O bus 210 to erase a logical erase block, each with a particular erase block address to erase a particular erase block. Simultaneously, a particular bank (e.g., Bank 0 214a) is selected over the storage control bus 212 to prevent erasure of similarly addressed erase blocks in non-selected banks (e.g., Banks 1-N 214b-n). Alternatively, no particular bank (e.g., Bank 0 214a) is selected over the storage control bus 212 (or all of the banks are selected) to enable erasure of similarly addressed erase blocks in all of the banks (Banks 1-N 214b-n) in parallel. Other commands may also be sent to a particular location using a combination of the storage I/O bus 210 and the storage control bus 212. One of skill in the art will recognize other ways to select a particular storage location using the bi-directional storage I/O bus 210 and the storage control bus 212.

In one embodiment, packets are written sequentially to the non-volatile storage media 110. For example, storage controller 104a streams packets to storage write buffers of a bank 214a of storage elements 216 and, when the buffers are full, the packets are programmed to a designated logical page. Storage controller 104a then refills the storage write buffers with packets and, when full, the packets are written to the next logical page. The next logical page may be in the same bank 214a or another bank (e.g., 214b). This process continues, logical page after logical page, typically until a logical erase block is filled. In another embodiment, the streaming may continue across logical erase block boundaries with the process continuing, logical erase block after logical erase block.

In a read, modify, write operation, data packets associated with requested data are located and read in a read operation. Data segments of the modified requested data that have been modified are not written to the location from which they are read. Instead, the modified data segments are again converted to data packets and then written sequentially to the next available location in the logical page currently being written. The index entries for the respective data packets are modified to point to the packets that contain the modified data segments. The entry or entries in the index for data packets associated with the same requested data that have not been modified will include pointers to original location of the unmodified data packets. Thus, if the original requested data is maintained, for example to maintain a previous version of the requested data, the original requested data will have pointers in the index to all data packets as originally written. The new requested data will have pointers in the index to some of the original data packets and pointers to the modified data packets in the logical page that is currently being written.

In a copy operation, the index includes an entry for the original requested data mapped to a number of packets stored in the non-volatile storage media 110. When a copy is made, a new copy of the requested data is created and a new entry is created in the index mapping the new copy of the requested data to the original packets. The new copy of the requested data is also written to the non-volatile storage media 110 with its location mapped to the new entry in the index. The new copy of the requested data packets may be used to identify the packets within the original requested data that are referenced in case changes have been made in the original requested data that have not been propagated to the copy of the requested data and the index is lost or corrupted.

Beneficially, sequentially writing packets facilitates a more even use of the non-volatile storage media 110 and allows the solid-storage device controller 202 to monitor storage hot spots and level usage of the various logical pages in the non-volatile storage media 110. Sequentially writing packets also facilitates a powerful, efficient garbage collection system, which is described in detail below. One of skill in the art will recognize other benefits of sequential storage of data packets.

In various embodiments, the non-volatile storage device controller 202 also includes a data bus 204, a local bus 206, a buffer controller 208, buffers 0-N 222a-n, a master controller 224, a direct memory access ("DMA") controller 226, a memory controller 228, a dynamic memory array 230, a static random memory array 232, a management controller 234, a management bus 236, a bridge 238 to a system bus 240, and miscellaneous logic 242, which are described below. In other embodiments, the system bus 240 is coupled to one or more network interface cards ("NICs") 244, some of which may include remote DMA ("RDMA") controllers 246, one or more central processing unit ("CPU") 248, one or more external memory controllers 250 and associated external memory arrays 252, one or more storage controllers 254, peer controllers 256, and application specific processors 258, which are described below. The components 244-258 connected to the system bus 240 may be located in the host computing system 114 or may be other devices.

Typically, the storage controller(s) 104 communicate data to the non-volatile storage media 110 over a storage I/O bus 210. In a typical embodiment where the non-volatile storage is arranged in banks 214 and each bank 214 includes multiple storage elements 216a, 216b, 216m accessed in parallel, the storage I/O bus 210 is an array of busses, one for each column of storage elements 216, 218, 220 spanning the banks 214. As used herein, the term "storage I/O bus" may refer to one storage I/O bus 210 or an array of independent data busses wherein individual data busses of the array independently communicate different data relative to one another. In one embodiment, each storage I/O bus 210 accessing a column of storage elements (e.g., 216a, 218a, 220a) may include a logical-to-physical mapping for storage divisions (e.g., erase blocks) accessed in a column of storage elements 216a, 218a, 220a. This mapping (or bad block remapping) allows a logical address mapped to a physical address of a storage division to be remapped to a different storage division if the first storage division fails, partially fails, is inaccessible, or has some other problem.

Data may also be communicated to the storage controller(s) 104 from a requesting device 155 through the system bus 240, bridge 238, local bus 206, buffer(s) 222, and finally over a data bus 204. The data bus 204 typically is connected to one or more buffers 222a-n controlled with a buffer controller 208. The buffer controller 208 typically controls transfer of data from the local bus 206 to the buffers 222 and through the data bus 204 to the pipeline input buffer 306 and output buffer 330. The buffer controller 208 typically controls how data arriving from a requesting device can be temporarily stored in a buffer 222 and then transferred onto a data bus 204, or vice versa, to account for different clock domains, to prevent data collisions, etc. The buffer controller 208 typically works in conjunction with the master controller 224 to coordinate data flow. As data arrives, the data will arrive on the system bus 240, be transferred to the local bus 206 through a bridge 238.

Typically, the data is transferred from the local bus 206 to one or more data buffers 222 as directed by the master controller 224 and the buffer controller 208. The data then flows out of the buffer(s) 222 to the data bus 204, through a non-volatile controller 104, and on to the non-volatile storage media 110 such as NAND flash or other storage media. In one embodiment, data and associated out-of-band metadata ("metadata") arriving with the data is communicated using one or more data channels comprising one or more storage controllers 104a-104n-1 and associated non-volatile storage media 110a-110n-1 while at least one channel (storage controller 104n, non-volatile storage media 110n) is dedicated to in-band metadata, such as index information and other metadata generated internally to the non-volatile storage device 102.

The local bus 206 is typically a bidirectional bus or set of busses that allows for communication of data and commands between devices internal to the non-volatile storage device controller 202 and between devices internal to the non-volatile storage device 102 and devices 244-258 connected to the system bus 240. The bridge 238 facilitates communication between the local bus 206 and system bus 240. One of skill in the art will recognize other embodiments such as ring structures or switched star configurations and functions of buses 240, 206, 204, 210 and bridges 238.

The system bus 240 is typically a bus of a host computing system 114 or other device in which the non-volatile storage device 102 is installed or connected. In one embodiment, the system bus 240 may be a PCI-e bus, a Serial Advanced Technology Attachment ("serial ATA") bus, parallel ATA, or the like. In another embodiment, the system bus 240 is an external bus such as small computer system interface ("SCSI"), FireWire, Fiber Channel, USB, PCIe-AS, or the like. The non-volatile storage device 102 may be packaged to fit internally to a device or as an externally connected device.

The non-volatile storage device controller 202 includes a master controller 224 that controls higher-level functions within the non-volatile storage device 102. The master controller 224, in various embodiments, controls data flow by interpreting object requests and other requests, directs creation of indexes to map object identifiers associated with data to physical locations of associated data, coordinating DMA requests, etc. Many of the functions described herein are controlled wholly or in part by the master controller 224.

In one embodiment, the master controller 224 uses embedded controller(s). In another embodiment, the master controller 224 uses local memory such as a dynamic memory array 230 (dynamic random access memory "DRAM"), a static memory array 232 (static random access memory "SRAM"), etc. In one embodiment, the local memory is controlled using the master controller 224. In another embodiment, the master controller 224 accesses the local memory via a memory controller 228. In another embodiment, the master controller 224 runs a Linux server and may support various common server interfaces, such as the World Wide Web, hyper-text markup language ("HTML"), etc. In another embodiment, the master controller 224 uses a nano-processor. The master controller 224 may be constructed using programmable or standard logic, or any combination of controller types listed above. One skilled in the art will recognize many embodiments for the master controller 224.

In one embodiment, where the storage device/non-volatile storage device controller 202 manages multiple data storage devices/non-volatile storage media 110a-n, the master controller 224 divides the work load among internal controllers, such as the storage controllers 104a-n. For example, the master controller 224 may divide an object to be written to the data storage devices (e.g., non-volatile storage media 110a-n) so that a portion of the object is stored on each of the attached data storage devices. This feature is a performance enhancement allowing quicker storage and access to an object. In one embodiment, the master controller 224 is implemented using an FPGA. In another embodiment, the firmware within the master controller 224 may be updated through the management bus 236, the system bus 240 over a network connected to a NIC 244 or other device connected to the system bus 240.

In one embodiment, the master controller 224, which manages objects, emulates block storage such that a host computing system 114 or other device connected to the storage device/non-volatile storage device 102 views the storage device/non-volatile storage device 102 as a block storage device and sends data to specific physical addresses in the storage device/non-volatile storage device 102. The master controller 224 then divides up the blocks and stores the data blocks as it would objects. The master controller 224 then maps the blocks and physical address sent with the block to the actual locations determined by the master controller 224. The mapping is stored in the object index. Typically, for block emulation, a block device application program interface ("API") is provided in a driver in a computer such as the host computing system 114, or other device wishing to use the storage device/non-volatile storage device 102 as a block storage device.

In another embodiment, the master controller 224 coordinates with NIC controllers 244 and embedded RDMA controllers 246 to deliver just-in-time RDMA transfers of data and command sets. NIC controller 244 may be hidden behind a non-transparent port to enable the use of custom drivers. Also, a driver on a host computing system 114 may have access to the computer network 116 through an I/O memory driver using a standard stack API and operating in conjunction with NICs 244.

In one embodiment, the master controller 224 is also a redundant array of independent drive ("RAID") controller. Where the data storage device/non-volatile storage device 102 is networked with one or more other data storage devices/non-volatile storage devices 102, the master controller 224 may be a RAID controller for single tier RAID, multi-tier RAID, progressive RAID, etc. The master controller 224 also allows some objects to be stored in a RAID array and other objects to be stored without RAID. In another embodiment, the master controller 224 may be a distributed RAID controller element. In another embodiment, the master controller 224 may comprise many RAID, distributed RAID, and other functions as described elsewhere. In one embodiment, the master controller 224 controls storage of data in a RAID-like structure where parity information is stored in one or more storage elements 216, 218, 220 of a logical page where the parity information protects data stored in the other storage elements 216, 218, 220 of the same logical page.

In one embodiment, the master controller 224 coordinates with single or redundant network managers (e.g., switches) to establish routing, to balance bandwidth utilization, failover, etc. In another embodiment, the master controller 224 coordinates with integrated application specific logic (via local bus 206) and associated driver software. In another embodiment, the master controller 224 coordinates with attached application specific processors 258 or logic (via the external system bus 240) and associated driver software. In another embodiment, the master controller 224 coordinates with remote application specific logic (via the computer network 116) and associated driver software. In another embodiment, the master controller 224 coordinates with the local bus 206 or external bus attached hard disk drive ("HDD") storage controller.

In one embodiment, the master controller 224 communicates with one or more storage controllers 254 where the storage device/non-volatile storage device 102 may appear as a storage device connected through a SCSI bus, Internet SCSI ("iSCSI"), fiber channel, etc. Meanwhile the storage device/non-volatile storage device 102 may autonomously manage objects and may appear as an object file system or distributed object file system. The master controller 224 may also be accessed by peer controllers 256 and/or application specific processors 258.

In another embodiment, the master controller 224 coordinates with an autonomous integrated management controller to periodically validate FPGA code and/or controller software, validate FPGA code while running (reset) and/or validate controller software during power on (reset), support external reset requests, support reset requests due to watchdog timeouts, and support voltage, current, power, temperature, and other environmental measurements and setting of threshold interrupts. In another embodiment, the master controller 224 manages garbage collection to free erase blocks for reuse. In another embodiment, the master controller 224 manages wear leveling. In another embodiment, the master controller 224 allows the data storage device/non-volatile storage device 102 to be partitioned into multiple logical devices and allows partition-based media encryption. In yet another embodiment, the master controller 224 supports a storage controller 104 with advanced, multi-bit ECC correction. One of skill in the art will recognize other features and functions of a master controller 224 in a storage controller 202, or more specifically in a non-volatile storage device 102.

In one embodiment, the non-volatile storage device controller 202 includes a memory controller 228, which controls a dynamic random memory array 230 and/or a static random memory array 232. As stated above, the memory controller 228 may be independent or integrated with the master controller 224. The memory controller 228 typically controls volatile memory of some type, such as DRAM (dynamic random memory array 230) and SRAM (static random memory array 232). In other examples, the memory controller 228 also controls other memory types such as electrically erasable programmable read only memory ("EEPROM"), etc. In other embodiments, the memory controller 228 controls two or more memory types and the memory controller 228 may include more than one controller. Typically, the memory controller 228 controls as much SRAM 232 as is feasible and by DRAM 230 to supplement the SRAM 232.

In one embodiment, the object index is stored in memory 230, 232 and then periodically offloaded to a channel of the non-volatile storage media 110n or other non-volatile memory. One of skill in the art will recognize other uses and configurations of the memory controller 228, dynamic memory array 230, and static memory array 232.

In one embodiment, the non-volatile storage device controller 202 includes a DMA controller 226 that controls DMA operations between the storage device/non-volatile storage device 102 and one or more external memory controllers 250 and associated external memory arrays 252 and CPUs 248. Note that the external memory controllers 250 and external memory arrays 252 are called external because they are external to the storage device/non-volatile storage device 102. In addition, the DMA controller 226 may also control RDMA operations with requesting devices through a NIC 244 and associated RDMA controller 246.

In one embodiment, the non-volatile storage device controller 202 includes a management controller 234 connected to a management bus 236. Typically, the management controller 234 manages environmental metrics and status of the storage device/non-volatile storage device 102. The management controller 234 may monitor device temperature, fan speed, power supply settings, etc. over the management bus 236. The management controller 234 may support the reading and programming of erasable programmable read only memory ("EEPROM") for storage of FPGA code and controller software. Typically, the management bus 236 is connected to the various components within the storage device/non-volatile storage device 102. The management controller 234 may communicate alerts, interrupts, etc. over the local bus 206 or may include a separate connection to a system bus 240 or other bus. In one embodiment, the management bus 236 is an Inter-Integrated Circuit ("I2C") bus. One of skill in the art will recognize other related functions and uses of a management controller 234 connected to components of the storage device/non-volatile storage device 102 by a management bus 236.

In one embodiment, the non-volatile storage device controller 202 includes miscellaneous logic 242 that may be customized for a specific application. Typically, where the non-volatile device controller 202 or master controller 224 is/are configured using a FPGA or other configurable controller, custom logic may be included based on a particular application, customer requirement, storage requirement, etc.

Figure 3:
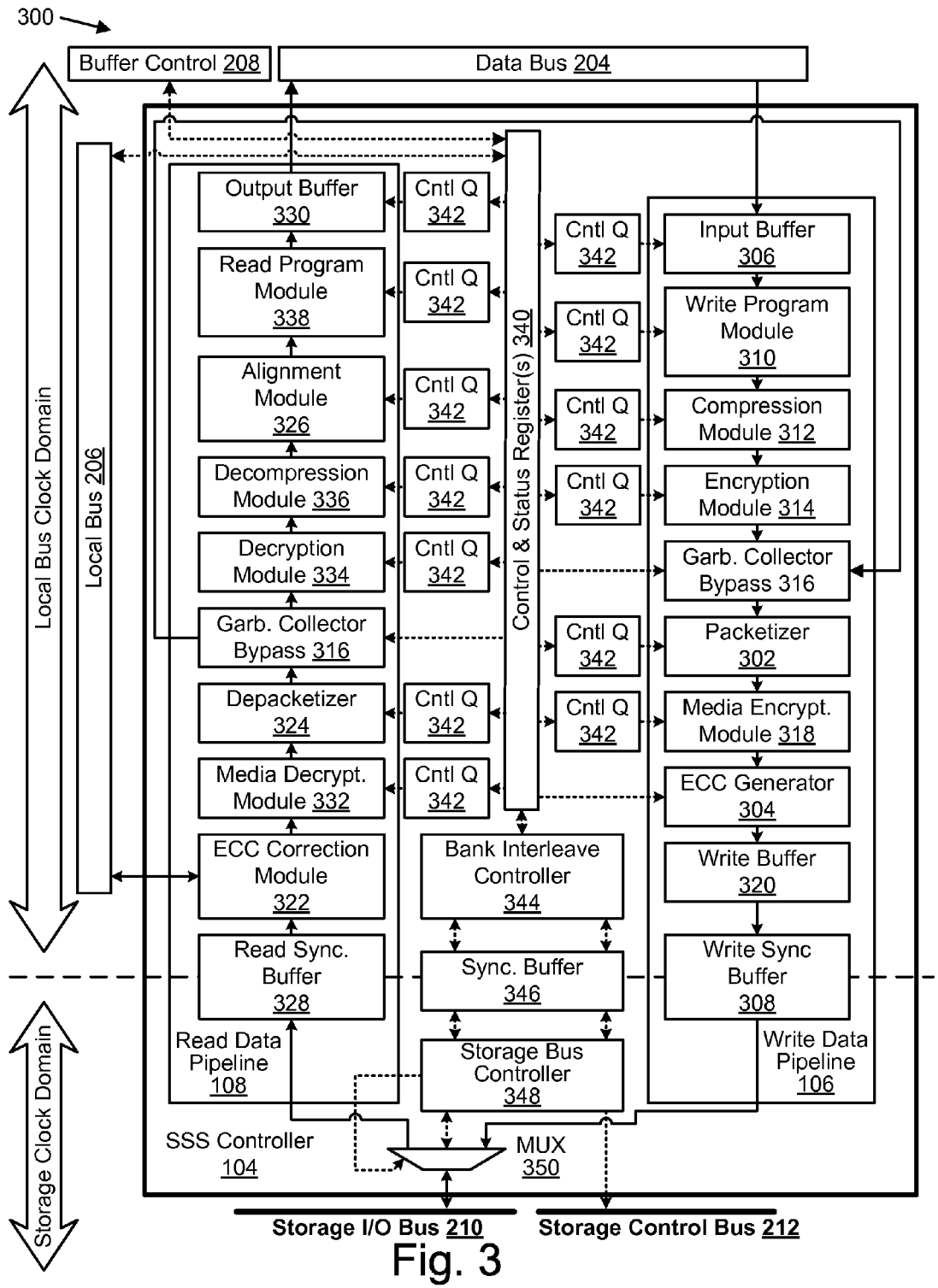
FIG. 3 is a block diagram of one embodiment of a storage controller comprising a write data pipeline and a read data pipeline.

FIG. 3 is a schematic block diagram illustrating one embodiment 300 of a storage controller 104 with a write data pipeline 106, a read data pipeline 108 and a throughput management apparatus 122 in a non-volatile storage device 102 in accordance with the present invention. The embodiment 300 includes a data bus 204, a local bus 206, and buffer control 208, which are substantially similar to those described in relation to the non-volatile storage device controller 202 of FIG. 2. The write data pipeline 106 includes a packetizer 302 and an error-correcting code ("ECC") generator 304. In other embodiments, the write data pipeline 106 includes an input buffer 306, a write synchronization buffer 308, a write program module 310, a compression module 312, an encryption module 314, a garbage collector bypass 316 (with a portion within the read data pipeline 108), a media encryption module 318, and a write buffer 320. The read data pipeline 108 includes a read synchronization buffer 328, an ECC correction module 322, a depacketizer 324, an alignment module 326, and an output buffer 330. In other embodiments, the read data pipeline 108 may include a media decryption module 332, a portion of the garbage collector bypass 316, a decryption module 334, a decompression module 336, and a read program module 338. The storage controller 104 may also include control and status registers 340 and control queues 342, a bank interleave controller 344, a synchronization buffer 346, a storage bus controller 348, and a multiplexer ("MUX") 350. The components of the non-volatile controller 104 and associated write data pipeline 106 and read data pipeline 108 are described below. In other embodiments, synchronous non-volatile storage media 110 may be used and synchronization buffers 308 328 may be eliminated.

The write data pipeline 106 includes a packetizer 302 that receives a data or metadata segment to be written to the non-volatile storage, either directly or indirectly through another write data pipeline 106 stage, and creates one or more packets sized for the non-volatile storage media 110. The data or metadata segment is typically part of a data structure such as an object, but may also include an entire data structure. In another embodiment, the data segment is part of a block of data, but may also include an entire block of data. Typically, a set of data such as a data structure is received from a computer such as the host computing system 114, or other computer or device and is transmitted to the non-volatile storage device 102 in data segments streamed to the non-volatile storage device 102. A data segment may also be known by another name, such as data parcel, but as referenced herein includes all or a portion of a data structure or data block.

Each data structure is stored as one or more packets. Each data structure may have one or more container packets. Each packet contains a header. The header may include a header type field. Type fields may include data, attribute, metadata, data segment delimiters (multi-packet), data structures, data linkages, and the like. The header may also include information regarding the size of the packet, such as the number of bytes of data included in the packet. The length of the packet may be established by the packet type. The header may include information that establishes the relationship of the packet to a data structure. An example might be the use of an offset in a data packet header to identify the location of the data segment within the data structure. One of skill in the art will recognize other information that may be included in a header added to data by a packetizer 302 and other information that may be added to a data packet.

Each packet includes a header and possibly data from the data or metadata segment. The header of each packet includes pertinent information to relate the packet to the data structure to which the packet belongs. For example, the header may include an object identifier or other data structure identifier and offset that indicate the data segment, object, data structure or data block from which the data packet was formed. The header may also include a logical address used by the storage bus controller 348 to store the packet. The header may also include information regarding the size of the packet, such as the number of bytes included in the packet. The header may also include a sequence number that identifies where the data segment belongs with respect to other packets within the data structure when reconstructing the data segment or data structure. The header may include a header type field. Type fields may include data, data structure attributes, metadata, data segment delimiters (multi-packet), data structure types, data structure linkages, and the like. One of skill in the art will recognize other information that may be included in a header added to data or metadata by a packetizer 302 and other information that may be added to a packet.

The write data pipeline 106 includes an ECC generator 304 that that generates one or more error-correcting codes ("ECC") for the one or more packets received from the packetizer 302. The ECC generator 304 typically uses an error-correcting algorithm to generate ECC check bits, which are stored with the one or more data packets. The ECC codes generated by the ECC generator 304 together with the one or more data packets associated with the ECC codes comprise an ECC chunk. The ECC data stored with the one or more data packets is used to detect and to correct errors introduced into the data through transmission and storage. In one embodiment, packets are streamed into the ECC generator 304 as un-encoded blocks of length N. A syndrome of length S is calculated, appended, and output as an encoded block of length N+S. The value of N and S are dependent upon the characteristics of the ECC algorithm, which is selected to achieve specific performance, efficiency, and robustness metrics. In one embodiment, there is no fixed relationship between the ECC blocks and the packets; the packet may comprise more than one ECC block; the ECC block may comprise more than one packet; and a first packet may end anywhere within the ECC block and a second packet may begin after the end of the first packet within the same ECC block. In one embodiment, ECC algorithms are not dynamically modified. In one embodiment, the ECC data stored with the data packets is robust enough to correct errors in more than two bits.

Beneficially, using a robust ECC algorithm allowing more than single bit correction or even double bit correction allows the life of the non-volatile storage media 110 to be extended. For example, if flash memory is used as the storage medium in the non-volatile storage media 110, the flash memory may be written approximately 100,000 times without error per erase cycle. This usage limit may be extended using a robust ECC algorithm. Having the ECC generator 304 and corresponding ECC correction module 322 onboard the non-volatile storage device 102, the non-volatile storage device 102 can internally correct errors and has a longer useful life than if a less robust ECC algorithm is used, such as single bit correction. However, in other embodiments the ECC generator 304 may use a less robust algorithm and may correct single-bit or double-bit errors. In another embodiment, the non-volatile storage device 110 may comprise less reliable storage such as multi-level cell ("MLC") flash in order to increase capacity, which storage may not be sufficiently reliable without more robust ECC algorithms.

In one embodiment, the write pipeline 106 includes an input buffer 306 that receives a data segment to be written to the non-volatile storage media 110 and stores the incoming data segments until the next stage of the write data pipeline 106, such as the packetizer 302 (or other stage for a more complex write data pipeline 106) is ready to process the next data segment. The input buffer 306 typically allows for discrepancies between the rate data segments are received and processed by the write data pipeline 106 using an appropriately sized data buffer. The input buffer 306 also allows the data bus 204 to transfer data to the write data pipeline 106 at rates greater than can be sustained by the write data pipeline 106 in order to improve efficiency of operation of the data bus 204. Typically, when the write data pipeline 106 does not include an input buffer 306, a buffering function is performed elsewhere, such as in the non-volatile storage device 102 but outside the write data pipeline 106, in the host computing system 114, such as within a network interface card ("NIC"), or at another device, for example when using remote direct memory access ("RDMA").

In another embodiment, the write data pipeline 106 also includes a write synchronization buffer 308 that buffers packets received from the ECC generator 304 prior to writing the packets to the non-volatile storage media 110. The write synchronization buffer 308 is located at a boundary between a local clock domain and a non-volatile storage clock domain and provides buffering to account for the clock domain differences. In other embodiments, synchronous non-volatile storage media 110 may be used and synchronization buffers 308 328 may be eliminated.

In one embodiment, the write data pipeline 106 also includes a media encryption module 318 that receives the one or more packets from the packetizer 302, either directly or indirectly, and encrypts the one or more packets using an encryption key unique to the non-volatile storage device 102 prior to sending the packets to the ECC generator 304. Typically, the entire packet is encrypted, including the headers. In another embodiment, headers are not encrypted. In this document, encryption key is understood to mean a secret encryption key that is managed externally from a storage controller 104.

The media encryption module 318 and corresponding media decryption module 332 provide a level of security for data stored in the non-volatile storage media 110. For example, where data is encrypted with the media encryption module 318, if the non-volatile storage media 110 is connected to a different storage controller 104, non-volatile storage device 102, or server, the contents of the non-volatile storage media 110 typically could not be read without use of the same encryption key used during the write of the data to the non-volatile storage media 110 without significant effort.

In a typical embodiment, the non-volatile storage device 102 does not store the encryption key in non-volatile storage and allows no external access to the encryption key. The encryption key is provided to the storage controller 104 during initialization. The non-volatile storage device 102 may use and store a non-secret cryptographic nonce that is used in conjunction with an encryption key. A different nonce may be stored with every packet. Data segments may be split between multiple packets with unique nonces for the purpose of improving protection by the encryption algorithm.

The encryption key may be received from a host computing system 114, a server, key manager, or other device that manages the encryption key to be used by the storage controller 104. In another embodiment, the non-volatile storage media 110 may have two or more partitions and the storage controller 104 behaves as though it was two or more storage controllers 104, each operating on a single partition within the non-volatile storage media 110. In this embodiment, a unique media encryption key may be used with each partition.

In another embodiment, the write data pipeline 106 also includes an encryption module 314 that encrypts a data or metadata segment received from the input buffer 306, either directly or indirectly, prior sending the data segment to the packetizer 302, the data segment encrypted using an encryption key received in conjunction with the data segment. The encryption keys used by the encryption module 314 to encrypt data may not be common to all data stored within the non-volatile storage device 102 but may vary on an per data structure basis and received in conjunction with receiving data segments as described below. For example, an encryption key for a data segment to be encrypted by the encryption module 314 may be received with the data segment or may be received as part of a command to write a data structure to which the data segment belongs. The solid-state storage device 102 may use and store a non-secret cryptographic nonce in each data structure packet that is used in conjunction with the encryption key. A different nonce may be stored with every packet. Data segments may be split between multiple packets with unique nonces for the purpose of improving protection by the encryption algorithm.

The encryption key may be received from a host computing system 114, another computer, key manager, or other device that holds the encryption key to be used to encrypt the data segment. In one embodiment, encryption keys are transferred to the storage controller 104 from one of a non-volatile storage device 102, host computing system 114, computer, or other external agent, which has the ability to execute industry standard methods to securely transfer and protect private and public keys.

In one embodiment, the encryption module 314 encrypts a first packet with a first encryption key received in conjunction with the packet and encrypts a second packet with a second encryption key received in conjunction with the second packet. In another embodiment, the encryption module 314 encrypts a first packet with a first encryption key received in conjunction with the packet and passes a second data packet on to the next stage without encryption. Beneficially, the encryption module 314 included in the write data pipeline 106 of the non-volatile storage device 102 allows data structure-by-data structure or segment-by-segment data encryption without a single file system or other external system to keep track of the different encryption keys used to store corresponding data structures or data segments. Each requesting device 155 or related key manager independently manages encryption keys used to encrypt only the data structures or data segments sent by the requesting device 155.

In one embodiment, the encryption module 314 may encrypt the one or more packets using an encryption key unique to the non-volatile storage device 102. The encryption module 314 may perform this media encryption independently, or in addition to the encryption described above. Typically, the entire packet is encrypted, including the headers. In another embodiment, headers are not encrypted. The media encryption by the encryption module 314 provides a level of security for data stored in the non-volatile storage media 110. For example, where data is encrypted with media encryption unique to the specific non-volatile storage device 102, if the non-volatile storage media 110 is connected to a different storage controller 104, non-volatile storage device 102, or host computing system 114, the contents of the non-volatile storage media 110 typically could not be read without use of the same encryption key used during the write of the data to the non-volatile storage media 110 without significant effort.

In another embodiment, the write data pipeline 106 includes a compression module 312 that compresses the data for metadata segment prior to sending the data segment to the packetizer 302. The compression module 312 typically compresses a data or metadata segment using a compression routine known to those of skill in the art to reduce the storage size of the segment. For example, if a data segment includes a string of 512 zeros, the compression module 312 may replace the 512 zeros with code or token indicating the 512 zeros where the code is much more compact than the space taken by the 512 zeros.

In one embodiment, the compression module 312 compresses a first segment with a first compression routine and passes along a second segment without compression. In another embodiment, the compression module 312 compresses a first segment with a first compression routine and compresses the second segment with a second compression routine. Having this flexibility within the non-volatile storage device 102 is beneficial so that computing systems 114 or other devices writing data to the non-volatile storage device 102 may each specify a compression routine or so that one can specify a compression routine while another specifies no compression. Selection of compression routines may also be selected according to default settings on a per data structure type or data structure class basis. For example, a first data structure of a specific data structure may be able to override default compression routine settings and a second data structure of the same data structure class and data structure type may use the default compression routine and a third data structure of the same data structure class and data structure type may use no compression.

In one embodiment, the write data pipeline 106 includes a garbage collector bypass 316 that receives data segments from the read data pipeline 108 as part of a data bypass in a garbage collection system. A garbage collection system (also referred to as a "groomer" or grooming operation) typically marks packets that are no longer valid, typically because the packet is marked for deletion or has been modified and the modified data is stored in a different location. At some point, the garbage collection system determines that a particular section (e.g., an erase block) of storage may be recovered. This determination may be due to a lack of available storage capacity, the percentage of data marked as invalid reaching a threshold, a consolidation of valid data, an error detection rate for that section of storage reaching a threshold, or improving performance based on data distribution, etc. Numerous factors may be considered by a garbage collection algorithm to determine when a section of storage is to be recovered.

Once a section of storage has been marked for recovery, valid packets in the section typically must be relocated. The garbage collector bypass 316 allows packets to be read into the read data pipeline 108 and then transferred directly to the write data pipeline 106 without being routed out of the storage controller 104. In one embodiment, the garbage collector bypass 316 is part of an autonomous garbage collector system that operates within the non-volatile storage device 102. This allows the non-volatile storage device 102 to manage data so that data is systematically spread throughout the non-volatile storage media 110 to improve performance, data reliability and to avoid overuse and underuse of any one location or area of the non-volatile storage media 110 and to lengthen the useful life of the non-volatile storage media 110.

The garbage collector bypass 316 coordinates insertion of segments into the write data pipeline 106 with other segments being written by computing systems 114 or other devices. In the depicted embodiment, the garbage collector bypass 316 is before the packetizer 302 in the write data pipeline 106 and after the depacketizer 324 in the read data pipeline 108, but may also be located elsewhere in the read and write data pipelines 106, 108. The garbage collector bypass 316 may be used during a flush of the write pipeline 108 to fill the remainder of the logical page in order to improve the efficiency of storage within the non-volatile storage media 110 and thereby reduce the frequency of garbage collection.

Grooming may comprise refreshing data stored on the non-volatile storage media 110. Data stored on the non-volatile storage media 110 may degrade over time. The storage controller 104 may comprise a groomer that identifies "stale" data on the non-volatile storage device 102 (data that has not been modified and/or moved for a pre-determined time), and refreshes the stale data by re-writing the data to a different storage location.

In some embodiments, the garbage collection system, groomer, and/or garbage collection bypass 316 may be temporarily disabled to allow data to be stored contiguously on physical storage locations of the non-volatile storage device 102. Disabling the garbage collection system and/or bypass 316 may ensure that data in the write data pipeline 106 is not interleaved with other data. For example, and discussed below, garbage collection and/or the garbage collection bypass 316 may be disabled when storing data pertaining to an atomic storage request.

In some embodiments, the garbage collection and/or groomer may be restricted to a certain portion of the physical storage space of the non-volatile storage device. For example, storage metadata, such as the reverse index described below, may be periodically persisted to a non-volatile storage location. The garbage collection and/or grooming may be restricted to operating on portions of the non-volatile storage media that correspond to the persisted storage metadata.

In one embodiment, the write data pipeline 106 includes a write buffer 320 that buffers data for efficient write operations. Typically, the write buffer 320 includes enough capacity for packets to fill at least one logical page in the non-volatile storage media 110. This allows a write operation to send an entire logical page of data to the non-volatile storage media 110 without interruption. By sizing the write buffer 320 of the write data pipeline 106 and buffers within the read data pipeline 108 to be the same capacity or larger than a storage write buffer within the non-volatile storage media 110, writing and reading data is more efficient since a single write command may be crafted to send a full logical page of data to the non-volatile storage media 110 instead of multiple commands.

While the write buffer 320 is being filled, the non-volatile storage media 110 may be used for other read operations. This is advantageous because other non-volatile devices with a smaller write buffer or no write buffer may tie up the non-volatile storage when data is written to a storage write buffer and data flowing into the storage write buffer stalls. Read operations will be blocked until the entire storage write buffer is filled and programmed. Another approach for systems without a write buffer or a small write buffer is to flush the storage write buffer that is not full in order to enable reads. Again, this is inefficient because multiple write/program cycles are required to fill a page.

For depicted embodiment with a write buffer 320 sized larger than a logical page, a single write command, which includes numerous subcommands, can then be followed by a single program command to transfer the page of data from the storage write buffer in each non-volatile storage element 216, 218, 220 to the designated page within each non-volatile storage element 216, 218, 220. This technique has the benefits of eliminating partial page programming, which is known to reduce data reliability and durability and freeing up the destination bank for reads and other commands while the buffer fills.

In one embodiment, the write buffer 320 is a ping-pong buffer where one side of the buffer is filled and then designated for transfer at an appropriate time while the other side of the ping-pong buffer is being filled. In another embodiment, the write buffer 320 includes a first-in first-out ("FIFO") register with a capacity of more than a logical page of data segments. One of skill in the art will recognize other write buffer 320 configurations that allow a logical page of data to be stored prior to writing the data to the non-volatile storage media 110.

In another embodiment, the write buffer 320 is sized smaller than a logical page so that less than a page of information could be written to a storage write buffer in the non-volatile storage media 110. In the embodiment, to prevent a stall in the write data pipeline 106 from holding up read operations, data is queued using the garbage collection system that needs to be moved from one location to another as part of the garbage collection process. In case of a data stall in the write data pipeline 106, the data can be fed through the garbage collector bypass 316 to the write buffer 320 and then on to the storage write buffer in the non-volatile storage media 110 to fill the pages of a logical page prior to programming the data. In this way, a data stall in the write data pipeline 106 would not stall reading from the non-volatile storage device 102.

In another embodiment, the write data pipeline 106 includes a write program module 310 with one or more user-definable functions within the write data pipeline 106. The write program module 310 allows a user to customize the write data pipeline 106. A user may customize the write data pipeline 106 based on a particular data requirement or application. Where the storage controller 104 is an FPGA, the user may program the write data pipeline 106 with custom commands and functions relatively easily. A user may also use the write program module 310 to include custom functions with an ASIC, however, customizing an ASIC may be more difficult than with an FPGA. The write program module 310 may include buffers and bypass mechanisms to allow a first data segment to execute in the write program module 310 while a second data segment may continue through the write data pipeline 106. In another embodiment, the write program module 310 may include a processor core that can be programmed through software.

Note that the write program module 310 is shown between the input buffer 306 and the compression module 312, however, the write program module 310 could be anywhere in the write data pipeline 106 and may be distributed among the various stages 302-320. In addition, there may be multiple write program modules 310 distributed among the various states 302-320 that are programmed and operate independently. In addition, the order of the stages 302-320 may be altered. One of skill in the art will recognize workable alterations to the order of the stages 302-320 based on particular user requirements.

The read data pipeline 108 includes an ECC correction module 322 that determines if a data error exists in ECC blocks a requested packet received from the non-volatile storage media 110 by using ECC stored with each ECC block of the requested packet. The ECC correction module 322 then corrects any errors in the requested packet if any error exists and the errors are correctable using the ECC. For example, if the ECC can detect an error in six bits but can only correct three bit errors, the ECC correction module 322 corrects ECC blocks of the requested packet with up to three bits in error. The ECC correction module 322 corrects the bits in error by changing the bits in error to the correct one or zero state so that the requested data packet is identical to when it was written to the non-volatile storage media 110 and the ECC was generated for the packet.

If the ECC correction module 322 determines that the requested packets contains more bits in error than the ECC can correct, the ECC correction module 322 cannot correct the errors in the corrupted ECC blocks of the requested packet and sends an interrupt. In one embodiment, the ECC correction module 322 sends an interrupt with a message indicating that the requested packet is in error. The message may include information that the ECC correction module 322 cannot correct the errors or the inability of the ECC correction module 322 to correct the errors may be implied. In another embodiment, the ECC correction module 322 sends the corrupted ECC blocks of the requested packet with the interrupt and/or the message.

In one embodiment, a corrupted ECC block or portion of a corrupted ECC block of the requested packet that cannot be corrected by the ECC correction module 322 is read by the master controller 224, corrected, and returned to the ECC correction module 322 for further processing by the read data pipeline 108. In one embodiment, a corrupted ECC block or portion of a corrupted ECC block of the requested packet is sent to the device requesting the data. The requesting device 155 may correct the ECC block or replace the data using another copy, such as a backup or mirror copy, and then may use the replacement data of the requested data packet or return it to the read data pipeline 108. The requesting device 155 may use header information in the requested packet in error to identify data required to replace the corrupted requested packet or to replace the data structure to which the packet belongs. In another embodiment, the storage controller 104 stores data using some type of RAID and is able to recover the corrupted data. In another embodiment, the ECC correction module 322 sends an interrupt and/or message and the receiving device fails the read operation associated with the requested data packet. One of skill in the art will recognize other options and actions to be taken as a result of the ECC correction module 322 determining that one or more ECC blocks of the requested packet are corrupted and that the ECC correction module 322 cannot correct the errors.

The read data pipeline 108 includes a depacketizer 324 that receives ECC blocks of the requested packet from the ECC correction module 322, directly or indirectly, and checks and removes one or more packet headers. The depacketizer 324 may validate the packet headers by checking packet identifiers, data length, data location, etc. within the headers. In one embodiment, the header includes a hash code that can be used to validate that the packet delivered to the read data pipeline 108 is the requested packet. The depacketizer 324 also removes the headers from the requested packet added by the packetizer 302. The depacketizer 324 may directed to not operate on certain packets but pass these forward without modification. An example might be a container label that is requested during the course of a rebuild process where the header information is required for index reconstruction. Further examples include the transfer of packets of various types destined for use within the non-volatile storage device 102. In another embodiment, the depacketizer 324 operation may be packet type dependent.

The read data pipeline 108 includes an alignment module 326 that receives data from the depacketizer 324 and removes unwanted data. In one embodiment, a read command sent to the non-volatile storage media 110 retrieves a packet of data. A device requesting the data may not require all data within the retrieved packet and the alignment module 326 removes the unwanted data. If all data within a retrieved page is requested data, the alignment module 326 does not remove any data.

The alignment module 326 re-formats the data as data segments of a data structure in a form compatible with a device requesting the data segment prior to forwarding the data segment to the next stage. Typically, as data is processed by the read data pipeline 108, the size of data segments or packets changes at various stages. The alignment module 326 uses received data to format the data into data segments suitable to be sent to the requesting device 155 and joined to form a response. For example, data from a portion of a first data packet may be combined with data from a portion of a second data packet. If a data segment is larger than a data requested by the requesting device 155, the alignment module 326 may discard the unwanted data.

In one embodiment, the read data pipeline 108 includes a read synchronization buffer 328 that buffers one or more requested packets read from the non-volatile storage media 110 prior to processing by the read data pipeline 108. The read synchronization buffer 328 is at the boundary between the non-volatile storage clock domain and the local bus clock domain and provides buffering to account for the clock domain differences.

In another embodiment, the read data pipeline 108 includes an output buffer 330 that receives requested packets from the alignment module 326 and stores the packets prior to transmission to the requesting device 155. The output buffer 330 accounts for differences between when data segments are received from stages of the read data pipeline 108 and when the data segments are transmitted to other parts of the storage controller 104 or to the requesting device 155. The output buffer 330 also allows the data bus 204 to receive data from the read data pipeline 108 at rates greater than can be sustained by the read data pipeline 108 in order to improve efficiency of operation of the data bus 204.

In one embodiment, the read data pipeline 108 includes a media decryption module 332 that receives one or more encrypted requested packets from the ECC correction module 322 and decrypts the one or more requested packets using the encryption key unique to the non-volatile storage device 102 prior to sending the one or more requested packets to the depacketizer 324. Typically, the encryption key used to decrypt data by the media decryption module 332 is identical to the encryption key used by the media encryption module 318. In another embodiment, the non-volatile storage media 110 may have two or more partitions and the storage controller 104 behaves as though it was two or more storage controllers 104 each operating on a single partition within the non-volatile storage media 110. In this embodiment, a unique media encryption key may be used with each partition.

In another embodiment, the read data pipeline 108 includes a decryption module 334 that decrypts a data segment formatted by the depacketizer 324 prior to sending the data segment to the output buffer 330. The data segment may be decrypted using an encryption key received in conjunction with the read request that initiates retrieval of the requested packet received by the read synchronization buffer 328. The decryption module 334 may decrypt a first packet with an encryption key received in conjunction with the read request for the first packet and then may decrypt a second packet with a different encryption key or may pass the second packet on to the next stage of the read data pipeline 108 without decryption. When the packet was stored with a non-secret cryptographic nonce, the nonce is used in conjunction with an encryption key to decrypt the data packet. The encryption key may be received from a host computing system 114, a client, key manager, or other device that manages the encryption key to be used by the storage controller 104.

In another embodiment, the read data pipeline 108 includes a decompression module 336 that decompresses a data segment formatted by the depacketizer 324. In one embodiment, the decompression module 336 uses compression information stored in one or both of the packet header and the container label to select a complementary routine to that used to compress the data by the compression module 312. In another embodiment, the decompression routine used by the decompression module 336 is dictated by the device requesting the data segment being decompressed. In another embodiment, the decompression module 336 selects a decompression routine according to default settings on a per data structure type or data structure class basis. A first packet of a first object may be able to override a default decompression routine and a second packet of a second data structure of the same data structure class and data structure type may use the default decompression routine and a third packet of a third data structure of the same data structure class and data structure type may use no decompression.

In another embodiment, the read data pipeline 108 includes a read program module 338 that includes one or more user-definable functions within the read data pipeline 108. The read program module 338 has similar characteristics to the write program module 310 and allows a user to provide custom functions to the read data pipeline 108. The read program module 338 may be located as shown in FIG. 3, may be located in another position within the read data pipeline 108, or may include multiple parts in multiple locations within the read data pipeline 108. Additionally, there may be multiple read program modules 338 within multiple locations within the read data pipeline 108 that operate independently. One of skill in the art will recognize other forms of a read program module 338 within a read data pipeline 108. As with the write data pipeline 106, the stages of the read data pipeline 108 may be rearranged and one of skill in the art will recognize other orders of stages within the read data pipeline 108.

The storage controller 104 includes control and status registers 340 and corresponding control queues 342. The control and status registers 340 and control queues 342 facilitate control and sequencing commands and subcommands associated with data processed in the write and read data pipelines 106, 108. For example, a data segment in the packetizer 302 may have one or more corresponding control commands or instructions in a control queue 342 associated with the ECC generator 304. As the data segment is packetized, some of the instructions or commands may be executed within the packetizer 302. Other commands or instructions may be passed to the next control queue 342 through the control and status registers 340 as the newly formed data packet created from the data segment is passed to the next stage.

Commands or instructions may be simultaneously loaded into the control queues 342 for a packet being forwarded to the write data pipeline 106 with each pipeline stage pulling the appropriate command or instruction as the respective packet is executed by that stage. Similarly, commands or instructions may be simultaneously loaded into the control queues 342 for a packet being requested from the read data pipeline 108 with each pipeline stage pulling the appropriate command or instruction as the respective packet is executed by that stage. One of skill in the art will recognize other features and functions of control and status registers 340 and control queues 342.

The storage controller 104 and or non-volatile storage device 102 may also include a bank interleave controller 344, a synchronization buffer 346, a storage bus controller 348, and a multiplexer ("MUX") 350.

Figure 4:
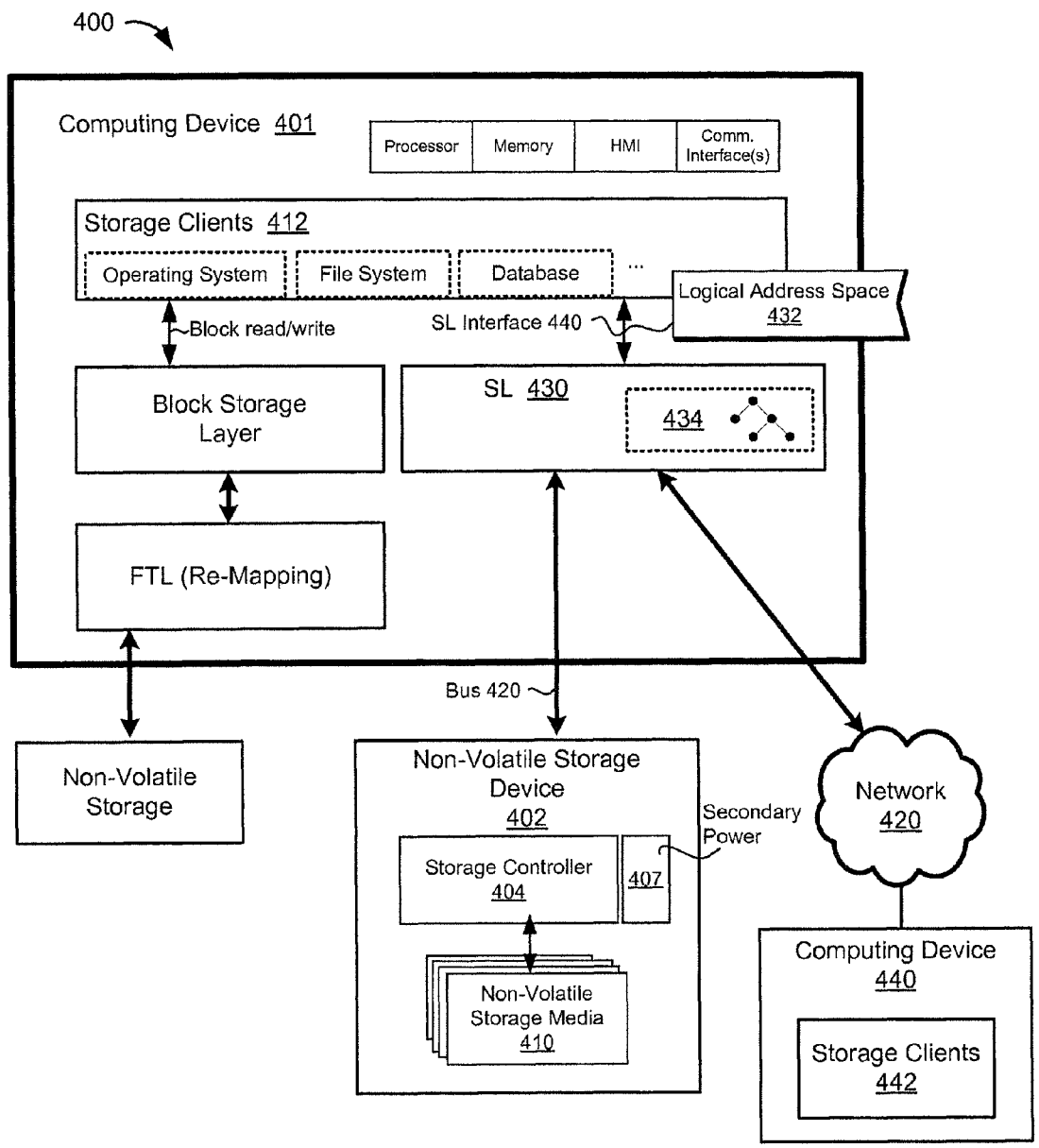
FIG. 4 is a block diagram of one embodiment of a system comprising a storage layer.

In some embodiments, a storage layer provides an interface through which storage clients perform persistent operations. The storage layer may simplify data storage operations for storage clients and expose enhanced storage features, such as atomicity, transactional support, recovery, and so on. FIG. 4 depicts one embodiment of a system comprising a storage layer (SL) 430 that presents a logical address space 432 of the non-volatile storage device 402 to storage client applications 412 operating on a computing device 401. The computing device 401 may comprise a processor, non-volatile storage, memory, human-machine interface (HMI) components, communication interfaces (for communication via the network 420), and the like.

The non-volatile storage device 402 may comprise a single non-volatile storage device, may comprise a plurality of non-volatile storage devices, a cluster of storage devices, or other suitable configuration. The storage layer 430 may comprise a driver, a user-space application, or the like. In some embodiments, the storage layer 430 is implemented in conjunction with the driver 118 described above. The storage layer 430 and/or the storage clients 412 may be embodied as instructions stored on a non-volatile storage device.

The SL 430 may maintain and present a logical address space to 432 to the storage clients 412 via one or more interfaces and/or APIs provided by the SL 430 (VSL interface 440). The storage clients 412 may include, but are not limited to: operating systems, virtual operating systems (e.g., guest operating systems, hypervisors, etc.), file systems, database applications, server applications, general-purpose applications, and the like. In some embodiments, one or more storage clients 412 operating on a remote computing device 1740 access the SL 430 via a network 420.

The SL 430 is configured to perform persistent storage operations on the non-volatile storage device 402, which may comprise a non-volatile storage device as described above. The SL 430 communicates with the non-volatile storage device 402 via a communication bus 420, which may include, but is not limited to: a PCE-e bus, a network connection (e.g., Infiniband), a storage network, Fibre Channel Protocol (FCP) network, HyperSCSI, or the like. The storage operations may be configured according to the capabilities and/or configuration of the non-volatile storage device 402. For example, if the non-volatile storage device 402 comprises a write-once, block-erasable device, the VSL 430 may be configured to perform storage operations accordingly (e.g., storage data on initialized or erased storage locations, etc.).

In some embodiments, the SL 430 accesses storage metadata 434 to maintain associations between logical identifiers (e.g., blocks) in the logical address space 432 and physical storage locations on the non-volatile storage device 402. As used herein, a physical storage location may refer to any storage location of the non-volatile storage device 402, which may include, but are not limited to: storage divisions, erase blocks, storage units, pages, logical pages, logical erase blocks, and so on.

The SL 430 maintains "any-to-any" assignments between logical identifiers in the logical address space 432 and physical storage locations on the non-volatile storage device 402. The SL 430 may cause data to be written or updated "out-of-place" on the non-volatile storage device 402. In some embodiments, data is stored sequentially and in a log-based format. Storing data "out-of-place" provides wear-leveling benefits and addresses "erase-and-program-once" properties of many non-volatile storage devices. Moreover, out-of-place writing (and writing data in logical storage locations as opposed to individual pages) addresses asymmetric properties of the non-volatile storage device 402. Asymmetric properties refers to the idea that different storage operations (read, write, erase) take very different amounts of time. For example, it may take ten times as long to program data on a non-volatile storage media 410 as it takes to read data from the solid-state storage element media 410. Moreover, in some cases, data may only be programmed to physical storage locations that have first been initialized (e.g., erased). An erase operation may take ten times as long as a program operation (and by extension one hundred times as long as a read operation). Associations between logical identifiers in the logical address space 432 and physical storage locations on the nonvolatile storage device 402 are maintained in the storage metadata 434.

In some embodiments, the SL 430 causes data to be persisted on the non-volatile storage 402 in a sequential, log-based format. Sequential, log-based storage may comprise persisting the order of storage operations performed on the non-volatile storage device 402. In some embodiments, data is stored with persistent metadata that is persisted on the non-volatile storage device 402 with the data itself. For example, a sequence order of storage operations performed may be maintained using sequence indicators (e.g., timestamps, sequence numbers, or other indicators) that are stored on the non-volatile storage device 402 and/or the current storage location (e.g., append point, discussed below) of the non-volatile storage device 402.

Persisting data in a sequential, log-based format may comprise persisting metadata on the non-volatile storage device 402 that describes the data. The persistent metadata may be stored with the data itself (e.g., in the same program and/or storage operation and/or in the smallest write unit supported by the non-volatile storage device 402); the persistent metadata may, therefore, be guaranteed to be stored with the data it describes. In some embodiments, data is stored in a container format (e.g., a packet, ECC codeword, etc.). Persistent metadata may be included as part of the packet format of the data (e.g., as a header, footer, or other field within the packet). Alternatively, or in addition, portions of the persistent metadata may be stored separately from the data it describes.

The persistent metadata describes the data and may include, but is not limited to: a logical identifier (or other identifier) of the data, security or access control parameters, sequence information (e.g., a sequence indicator), a persistent metadata flag (e.g., indicating inclusion in an atomic storage operation), a transaction identifier, or the like. The persistent metadata may comprise sufficient information to reconstruct the storage metadata and/or replay the sequence of storage operations performed on the non-volatile storage device 402.

The sequential, log-based data may comprise an "event log" of storage operations that are performed on the non-volatile storage device 402. Accordingly, the SL 430 may be capable of replaying a sequence of storage operations performed on the non-volatile storage device 402 by accessing the data stored on the non-volatile storage media 410 in a particular order that matches the order of the event log. The sequential, log-based data format enables the SL 430 to reconstruct the storage metadata 434, as well as other data, in the event of an invalid shutdown (or other failure condition). Examples of apparatus, systems, and methods for crash recovery and/or data integrity despite invalid shutdown conditions are described in U.S. Provisional Patent Application No. 61/424,585, entitled, "APPARATUS, SYSTEM, AND METHOD FOR PERSISTENT MANAGEMENT OF DATA IN A CACHE DEVICE," filed Dec. 17, 2010, and in U.S. Provisional Patent Application No. 61/425,167, entitled, "APPARATUS, SYSTEM, AND METHOD FOR PERSISTENT MANAGEMENT OF DATA IN A CACHE DEVICE," filed Dec. 20, 2010, which are hereby incorporated by reference in their entirety. In some embodiments, the non-volatile storage device 402 comprises a secondary power source 407 (e.g., battery, capacitor, etc.) to power the storage controller 404 and/or non-volatile storage media 410 in the event of an invalid shutdown. The non-volatile storage device 402 (or controller 404) may, therefore, comprise a "protection domain" or "powercut safe domain" (defined by the secondary power source 407). Once data is transferred to within the protection domain, of the non-volatile storage device, it may be guaranteed to be persisted on the non-volatile storage media 410. Alternatively, or in addition, the storage controller 404 may be capable of performing storage operations independent of the host computing device 401.

The sequential, log-based storage format implemented by the SL 430 provides crash-recovery and/or data integrity for the data stored on the non-volatile storage 402 as well as the storage metadata 434. After an invalid shutdown and reconstruction operation, the SL 430 may expose the reconstructed storage metadata 434 to storage clients 412. The storage clients 412 may, therefore, delegate crash-recovery and/or data integrity to the SL 430, which may significantly simplify the storage clients 412 and/or allow the storage clients 412 to operate more efficiently. For example, a file system storage client 412 may require crash-recovery and/or data integrity services for some of its metadata, such as I-node tables, file allocation tables, and so on. The storage client 412 may have to implement these services itself, which may impose significant overhead and/or complexity on the storage client 412. The storage client 412 may be relieved from this overhead by delegating crash recovery and/or data integrity to the SL 430. As described above, the SL 430 stores data in a sequential, log-based format. As such, in the event of an invalid shutdown, the SL 430 is capable of reconstructing the storage metadata 434 and/or identifying the "current" version of data using the sequential, log-based formatted data on the non-volatile storage device 402. The SL 430 provides access to the reconstructed storage metadata 434 and/or data via the SL interface 440. Accordingly, after an invalid shutdown, a file system storage client 412 may access crash-recovered file system metadata and/or may ensure the integrity of file data accessed through the SL 430.

The logical address space 432 may be "sparse" meaning the logical address space 432 is large enough that allocated/assigned logical identifiers are non-contiguous and separated by sections of one or more unallocated/unassigned addresses, and, as such, may comprise a logical capacity that exceeds the physical storage capacity of the non-volatile storage device 402. Accordingly, the logical address space 432 may be defined independent of the non-volatile storage device 402; the logical address space 432 may present a larger address space than the physical storage capacity of the non-volatile storage device 402, may present different storage location partitions and/or block sizes than provided by the non-volatile storage device 402, and so on. Associations between the logical address space 432 and the non-volatile storage 402 are managed by the VSL 430 (using the storage metadata 434). Storage clients 412 may leverage the SL interface 440, as opposed to a more limited block-storage layer and/or the other storage interface provided by a particular non-volatile storage device 402.

In some embodiments, the logical address space 432 may be very large, comprising a 64-bit address space referenced by 64-bit logical identifiers (LIDs). Each 64-bit logical identifier in the logical address space 432 (e.g., 64-bit address) references a respective virtual storage location. As used herein, a virtual storage location refers to a block of logical storage capacity (e.g., an allocation block). The SL 430 may be configured to implement arbitrarily sized virtual storage locations; typical sizes range from 512 to 4086 bytes (or even 8 kb to 16 kb depending on the needs of the storage clients 412); the disclosure, however, is not limited in this regard. Since the logical address space 432 (and the virtual storage locations therein) is independent of the physical storage capacity and/or storage partitioning of the non-volatile storage device 402, the logical address space 432 may be tailored to the requirements of the storage clients 412.

The SL 430 may manage allocations within the logical address space using storage metadata 434. In some embodiments, the SL 430 maintains storage metadata 434 that tracks allocations of the logical address space 432 using a forward index. The SL 430 may allocate ranges within the logical address space 432 for use by particular storage clients 412. Logical identifiers may be allocated for a particular storage client 412 to persist a storage entity. As used herein, a storage entity refers to any data or data structure in the logical address space 412 that is capable of being persisted to the non-volatile storage device 402; accordingly, a storage entity may include, but is not limited to: file system objects (e.g., files, streams, I-nodes, etc.), a database primitive (e.g., database table, extent, or the like), streams, persistent memory space, memory mapped files, or the like. A storage entity may also be referred to as a Virtual Storage Unit (VSU). A file system object refers to any data structure used by a file system including, but not limited to: a file, a stream, file attributes, file index, volume index, node table, or the like.

As described above, allocating a logical identifier refers to reserving a logical identifier for a particular use or storage client. A logical identifier may refer to a set or range of the logical address space 432 (e.g., a set or range of virtual storage locations). The logical capacity of an allocated logical identifier may be determined by the size of the virtual storage locations of the logical address space 432. As described above, the logical address space 432 may be configured to present virtual storage locations of any predetermined size. The size of the virtual storage locations may be configured by one or more storage clients 412, the SL 430, or the like.

An allocated logical identifier, however, may not necessarily be associated with and/or assigned to physical storage locations on the non-volatile storage device 402 until required. In some embodiments, the SL 430 allocates logical identifiers comprising large, contiguous ranges in the logical address space 432. The availability of large, contiguous ranges in the logical address space is enabled by the large address space (e.g., 64-bit address space) presented by the SL 430. For example, a logical identifier allocated for a file may be associated by the SL 430 with an address range of 2^32 contiguous virtual storage locations in the logical address space 432 for data of the file. If the virtual storage locations (e.g., allocation blocks) are 512 bytes each, the allocated logical identifier may represent a logical capacity of two (2) terabytes. The physical storage capacity of the non-volatile storage device 402 may be smaller than two (2) terabytes and/or may be sufficient to store only a small number of such files, such that if logical identifier allocations were to cause equivalent assignments in physical storage space, the SL 430 would quickly exhaust the capacity of the non-volatile storage device 402. Advantageously, however, the SL 430 is configured to allocate large, contiguous ranges within the logical address space 432 and to defer assigning physical storage locations on the non-volatile storage device 402 to the logical identifiers until necessary. Similarly, the SL 430 may support the use of "sparse" allocated logical ranges. For example, a storage client 412 may request that a first data segment be persisted at the "head" of an allocated logical identifier and a second data segment be persisted at the "tail" of an allocated logical identifier. The SL 430 may assign only those physical storage locations on the non-volatile storage device 402 that are needed to persist the first and second data segments. The SL 430 may not assign or reserve physical storage locations on the non-volatile storage device 402 for allocated logical identifiers that are not being used to persist data.

The SL 430 maintains storage metadata 434 to track allocations in the logical address space and to track assignments between logical identifiers in the logical address space 432 and physical storage locations on the non-volatile storage media 410. In some embodiments, the SL 430 track both logical allocations and physical storage location assignments using a single metadata structure. Alternatively, or in addition, the SL 430 may be configured to track logical allocations in logical allocation metadata and to track assigned physical storage locations on the non-volatile storage media 410 using separate, physical reservation metadata.

Storage clients 412 may access the SL 430 via the SL interface 440. In some embodiments, storage clients 412 may delegate certain functions to the SL. For example, and as described above, storage clients 412 may leverage the sequential, log-based data format of the SL 430 to delegate crash recovery and/or data integrity functions to the SL 430. In some embodiments, storage clients may also delegate allocations in the logical address space 432 and/or physical storage reservations to the SL 430.

Typically, a storage client 412, such as a file system, tracks the logical addresses and/or physical storage locations that are available for use. The logical storage locations available to the storage client 412 may be limited to the physical storage capacity of the underlying non-volatile storage device (or partition thereof). Accordingly, the storage client 412 may maintain a set of logical addresses that "mirrors" the physical storage locations of the non-volatile storage device. For example, and as shown in FIG. 4, a storage client 412 may identify one or more available logical block addresses (LBAs) for a new file. Since the LBAs map directly to physical storage locations in conventional implementations, the LBAs are unlikely to be contiguous; the availability of contiguous LBAs may depend upon the capacity of the underlying block storage device and/or whether the device is "fragmented." The storage client 412 then performs block-level operations to store the file through, inter alia, a block storage layer (e.g., a block-device interface). If the underlying storage device provides a one-to-one mapping between logical block address and physical storage locations, as with conventional storage devices, the block storage layer performs appropriate LBA-to-physical address translations and implements the requested storage operations. If, however, the underlying non-volatile storage device does not support one-to-one mappings (e.g., the underlying storage device is a sequential, or write-out-of-place device, such as a non-volatile storage device, in accordance with embodiments of this disclosure), another redundant set of translations is needed (e.g., a Flash Translation Layer, or other mapping). The redundant set of translations and the requirement that the storage client 412 maintain logical address allocations may represent a significant overhead for storage operations performed by the storage client 412 and may make allocating contiguous LBA ranges difficult or impossible without time-consuming "defragmentation" operations.

In some embodiments, storage clients 412 delegate allocation functionality to the SL 430. Storage clients 412 may access the SL interface 440 to request logical ranges in the logical address space 432. The SL 430 tracks the allocation status of the logical address space 432 using the storage metadata 434. If the SL 430 determines that the requested logical address range is unallocated, the SL 430 allocates the requested logical address range for the storage client 412. If the requested range is allocated (or only a portion of the range is unallocated), the SL 430 may return an alternative range in the logical address space 430 and/or may return a failure. In some embodiments, the SL 430 may return an alternative range in the logical address space 430 that includes contiguous range of logical addresses. Having a contiguous range of logical addresses often simplifies the management of the storage entity associated with this range of logical addresses. Since the SL 430 uses the storage metadata 434 to maintain associations between the logical address space 432 and physical storage locations on the non-volatile storage device 402, no redundant set of address translations is needed. Moreover, the SL 430 uses the storage metadata 434 to identify unallocated logical identifiers, which frees the storage client 412 from this overhead In some embodiments, the SL 430 makes allocations within the logical address space 432 as described above. The SL 430 may access an index comprising allocated logical address ranges (e.g., forward index of FIG. 5) to identify unallocated logical identifiers, which are allocated to storage clients 412 upon request. For example, the SL 430 may maintain storage metadata 434 comprising a range-encoded tree data structure, as described above; entries in the tree may represent allocated logical identifiers in the logical address space 432, and "holes" in the tree represent unallocated logical identifiers. Alternatively, or in addition, the SL 430 maintains an index of unallocated logical identifiers that can be allocated to storage clients (e.g., without searching a forward index).

Figure 5:
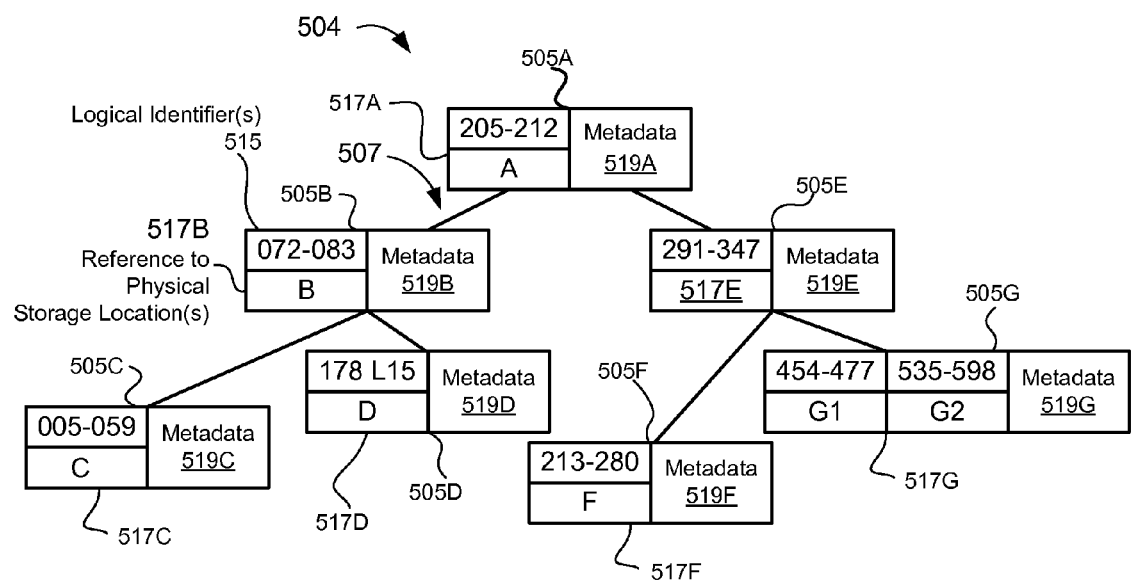
FIG. 5 depicts one embodiment of a forward index.

FIG. 5 depicts one example of storage metadata and, in particular, a forward index 504 that maintains allocations of the logical address space of one or more non-volatile storage devices (e.g., storage devices 106 described above). The forward index 504 may be further configured to maintain assignments between allocated logical identifiers and physical storage locations on a nonvolatile storage device. The forward index 504 may be maintained by the SL 430, a storage controller (e.g., storage controller 404, described above), and/or a driver (e.g., driver 118 described above), or the like.

In the FIG. 5 example, the data structure 504 is implemented as a range-encoded B-tree. The disclosure is not limited in this regard, however; the forward index 504 may be implemented using and suitable data structure including, but not limited to: a tree, a B-tree, a range-encoded B-tree, a radix tree, a map, a content addressable map (CAM), a table, a hash table, or other suitable data structure (or combination of data structures).

The forward index 504 comprises a plurality of entries 505 (entries 505A-G), each representing one or more logical identifiers in the logical address space. For example, the entry 505B references logical identifiers 515 (LIDs 072-083). Data may be stored sequentially or "out-of place" on the non-volatile storage device and, as such, there may be no correspondence between logical identifiers and the physical storage locations. The forward index 504 maintains assignments between allocated logical identifiers and physical storage locations (e.g., using physical storage location references 517). For example, the reference 517B assigns the logical identifiers 515 (LIDs 072-083) to one or more physical storage locations of the non-volatile storage device. In some embodiments, the references 517 comprise a physical address on the non-volatile storage device. Alternatively, or in addition, the references 517 may correspond to a secondary data structure (e.g., a reverse index), or the like. The references 517 may be updated in response to changes to the physical storage location of data (e.g., due to grooming operations, data refresh, modification, overwrite, or the like).

In some embodiments, one or more of the entries 505 may represent logical identifiers that have been allocated to a storage client, but have not been assigned to any particular physical storage locations (e.g., the storage client has not caused data to be written to the logical identifiers). The physical storage location reference 517 of an unassigned entry 505 may be marked as "null" or not assigned.

The entries 505 are arranged into a tree data structure by the edges 507. In some embodiments, the entries 505 are indexed by logical identifier, which provides for fast and efficient entry 505 lookup. In the FIG. 5 example, the entries 505 are arranged in logical identifier order such that the entry 505C references the "lowest" logical identifiers and 505G references the "largest" logical identifiers. Particular entries 505 are accessed by traversing the edges 507 of the forward index 504. In some embodiments, the forward index 504 is balanced, such that all leaf entries 505 are of a similar depth within the tree.

For clarity, the FIG. 5 example depicts entries 505 comprising numeric logical identifiers, however, the disclosure is not limited in this regard, and one of skill in the art will recognize that the entries 505 could comprise any suitable logical identifier representation, including, but not limited to: alpha-numerical characters, hexadecimal characters, binary values, text identifiers, hash codes, or the like.

The entries 505 of the index 504 may reference logical identifiers of variable size and/or length; a single entry 51205 may reference a plurality of logical identifiers (e.g., a set of logical identifiers, a logical identifier range, a noncontiguous set of logical identifiers, or the like). For example, the entry 505B represents a contiguous range of logical identifiers 072-083. Other entries of the index 504, may represent a noncontiguous set of logical identifiers; entry 505G represents logical identifiers 454-477 and 535-598, each assigned to respective physical storage locations by respective references 517G and 527G. The forward index 504 may represent logical identifiers using any suitable technique; for example, the entry 505D references logical identifier 178 and length 15, which corresponds to a range of logical identifiers 178-192.

In some embodiments, the entries 504 comprise and/or reference metadata 519, which may comprise metadata pertaining to the logical identifiers, such as age, size, logical identifier attributes (e.g., client identifier, data identifier, file name, group identifier), the underlying physical storage location(s), or the like. The metadata 519 may be indexed by logical identifier (through association with the respective entries 505) and, as such, the metadata 519 may remain associated with entry 505 regardless of changes to the location of the underlying physical storage locations of the data.

The index 504 may be used to efficiently determine whether the non-volatile storage device comprises a particular logical identifier. In one example, a storage client may request allocation of a particular logical identifier. If the index 504 comprises an entry 505 that includes the requested logical identifiers, the logical identifier(s) associated with the request may be identified as being already allocated. If the logical identifiers are not in the index, they may be allocated to the requester by creating a new entry 505 in the index 504. In another example, a storage client requests data of a particular logical identifier. The physical storage location of the data is determined by accessing the reference 517 to the physical storage location of the entry 505 comprising the logical identifier. In another example, a client modifies data pertaining to a logical identifier. In another example, a storage client modifies existing data of a particular logical identifier. The modified data is written sequentially to a new physical storage location on the non-volatile storage device, and the physical storage location reference 517 of the entry 505 in the index 504 is updated to reference the physical storage location of the new data. The obsolete data may be marked as invalid for reclamation in a grooming operation.

The forward index 504 of FIG. 5 maintains a logical address space and, as such, is indexed by logical identifier. As discussed above, entries 505 in index 504 may comprise references 517 to physical storage locations on a non-volatile storage device. In some embodiments, the references 517 may comprise physical addresses (or address ranges) of the physical storage locations. Alternatively, or in addition, the references 517 may be indirect (e.g., reference a secondary data structure, such as a reverse index).

Figure 6:
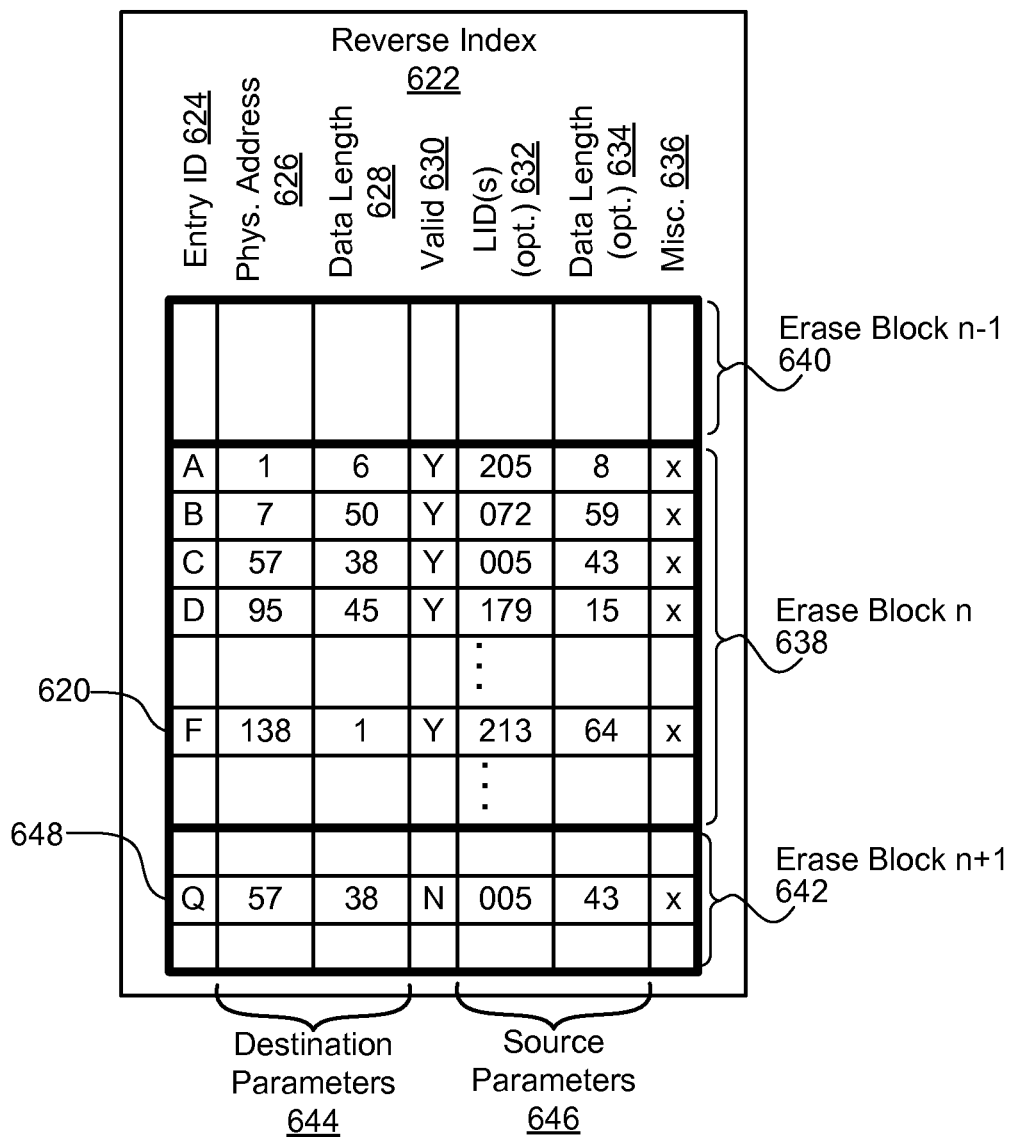
FIG. 6 depicts one embodiment of a reverse index.

FIG. 6 depicts one example of a reverse index 622 for maintaining metadata pertaining to physical storage locations of a non-volatile storage device. In the FIG. 6 example, the reverse index 622 is implemented as a table data structure. The disclosure is not limited in this regard, however, and could implement the reverse index 622 using any suitable data structure. For example, in some embodiments, the reverse index 622 is implemented in the same data structure with the forward index 504 described above (e.g., portions and/or entries of the reverse index 622 may be included as leaf entries of the forward index 504). The index 622 comprises a plurality of entries 620 (depicted as rows in the table data structure 622), each of which may comprise an entry ID 624, a physical address 626, a data length 628 associated with the data stored at the physical address 626 on the non-volatile storage media 410 (in this case the data is compressed), a valid tag 630, a logical address 632 associated with the data, a data length 634 associated with the logical address 632, and other miscellaneous data 636. In a further embodiment, the reverse index 622 may include an indicator of whether the physical address 626 stores dirty or clean data, or the like.

The reverse index 622 may be organized according to the configuration and/or layout of a particular non-volatile storage device. Accordingly, the reverse index 622 may be arranged by storage divisions (e.g., erase blocks), physical storage locations (e.g., pages), logical storage locations, or the like. In the FIG. 6 example, the reverse index 622 is arranged into a plurality of erase blocks (640, 638, and 642), each comprising a plurality of physical storage locations (e.g., pages, logical pages, or the like).

The entry 620 comprises metadata pertaining to the physical storage location(s) comprising data of the entry 505F of FIG. 5. The entry 620 indicates that the physical storage location is within erase block n 638. Erase block n 638 is preceded by erase block n−1 640 and followed by erase block n+1 642. (The contents of erase blocks n−1 and n+1 are not shown).

The entry ID 624 may be an address, a virtual link, or other data to associate entries in the reverse index 622 with entries in the forward index 504 (or other storage metadata). The physical address 626 indicates a physical address on the non-volatile storage device (e.g., non-volatile storage media 410). The data length 628 associated with the physical address 626 identifies a length of the data stored at the physical address 626. Together the physical address 626 and data length 628 may be referred to as destination parameters 644.

The logical identifier 632 and data length 634 may be referred to as source parameters 646. The logical identifier 632 associates the entry with a logical identifier of the logical address space. The logical identifier 632 may be used to associate an entry in the reverse index 622 with an entry 505 of the forward index 504. The data length 624 refers to the length of the data in the logical address space (e.g., from the perspective of the storage client). The source parameter 646 data length 634 may be different from the source parameter 644 data length 634 due to, inter alia, data compression, header overhead, encryption overhead, or the like. In the FIG. 6 example, the data associated with the entry 620 is highly compressible and was compressed from 64 blocks in the logical address space to 1 block on the non-volatile storage device.

The valid tag 630 indicates whether the data mapped to the entry 620 is valid. In this case, the data associated with the entry 620 is valid and is depicted in FIG. 6 as a "Y" in the row of the entry 620. As used herein, valid data refers to data that is up-to-date and has not been deleted and/or made obsolete (overwritten or modified). The reverse index 622 may track the validity status of each physical storage location of the non-volatile storage device. The forward index 504 may comprise entries corresponding to valid data only. In the FIG. 6 example, entry "Q" 648 indicates that data associated with the entry 648 is invalid. Note that the forward index 504 does not include logical addresses associated with entry Q 648. The entry Q 648 may correspond to an obsolete version of the data of entry 505C (overwritten by data now stored at entry "C").

The reverse index 622 may maintain entries for invalid data so that valid and invalid data can be quickly distinguished for storage recovery (e.g., grooming). In some embodiments, the forward index 504 and/or the reverse index 622 may track dirty and clean data in a similar manner to distinguish dirty data from clean data when operating as a cache.

In some embodiments, the reverse index 622 may omit the source parameters 646. For example, if the source parameters 646 are stored with the data, possibly in a header of the stored data, the reverse index 622 may identify a logical address indirectly by including a physical address 626 associated with the data and the source parameters 646 could be identified from the stored data.

The reverse index 622 may also include other miscellaneous data 636, such as a file name, object name, source data, storage client, security flags, atomicity flag, transaction identifier, or the like. One of skill in the art will recognize other information useful in a reverse index 622. While physical addresses 626 are depicted in the reverse index 622, in other embodiments, physical addresses 626, or other destination parameters 644, may be included in other locations, such as in the forward index 604, an intermediate table or data structure, or the like.

The reverse index 622 may be arranged by erase block or erase region (or other storage division) so that traversing a section of the index allows a groomer to identify valid data in a particular storage division (e.g., erase block 638) and to quantify an amount of valid data, or conversely invalid data, therein. The groomer may select storage divisions for recovery based, in part, on the amount of valid and/or invalid data in each division.

In some embodiments the groomer and/or garbage collection processes are restricted to operating within certain portions of the physical storage space. For example, portions of the storage metadata 434 may be periodically persisted on the non-volatile storage device 402, and the garbage collector and/or groomer may be limited to operating on the physical storage locations corresponding to the persisted storage metadata 434. In some embodiments, storage metadata 434 is persisted by relative age (e.g., sequence), with older portions being persisted, while more current portions are retained in volatile memory. Accordingly, the groomer and/or garbage collection systems may be restricted to operating in older portions of the physical address space and, as such, are less likely to affect data of an in process atomic storage request. Therefore, in some embodiments, the garbage collection system and/or groomer may continue to operate while an atomic storage request is serviced. Alternatively, or in addition, the garbage collection system and/or groomer may access the storage metadata and/or inflight index (discussed below) to prevent interference with atomic storage operations.

Referring back to FIG. 4, the non-volatile storage device 402 may be configured to store data on the non-volatile storage media 410 in a sequential, log-based format. The contents of the non-volatile storage device may, therefore, comprise an ordered "event log" of storage operations on the non-volatile storage media 410. The sequential ordering of storage operations may be maintained by appending data at an append point within the physical storage space of the non-volatile storage device 402. Alternatively, or in addition, sequence information may be maintained through persistent data stored on the non-volatile storage device 402. For example, each storage division on the storage device may comprise a respective indicator (e.g., timestamp, sequence number, or other indicator), to indicate an order of the storage division within the event log.

Figure 7A:
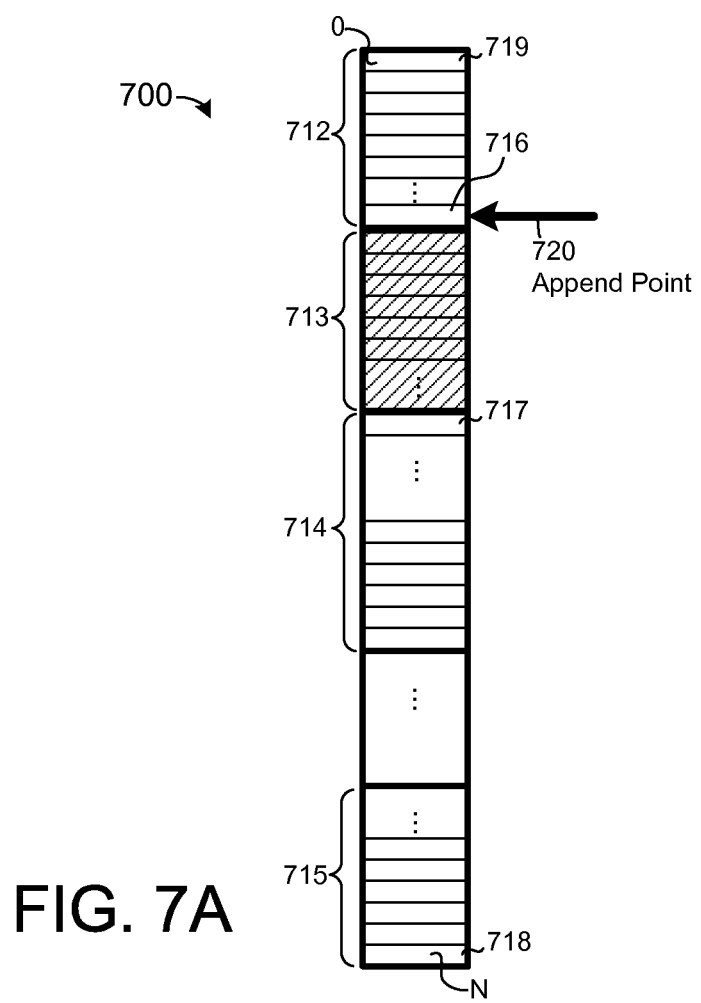
FIG. 7A depicts one embodiment of an append point within a physical storage space of a non-volatile storage device.

FIG. 7A depicts a physical storage space 700 of a non-volatile storage device. The physical storage space 700 is arranged into storage divisions (e.g., erase blocks 712), each of which can be initialized (e.g., erased) in a single operation. Each storage division comprises a plurality of physical storage locations (e.g., pages or logical pages) capable of storing data.

Each physical storage location may be assigned a respective physical address ranging from zero (0) to N. Data is stored sequentially at an append point 720. The append point 720 moves sequentially through the physical storage space 700. After storing data at the append point 720, the append point advances sequentially to the next available physical storage location. As used herein, an available physical storage location refers to a physical storage location that has been initialized and is ready to store data (e.g., has been erased). Some non-volatile storage media, such as non-volatile storage media 410, can only be programmed once after erasure. Accordingly, as used herein, an available physical storage location may refer to a storage location that is in an initialized (or erased) state. If the next storage division in the sequence is unavailable (e.g., comprises valid data, has not been erased or initialized, is out of service, etc.), the append point 720 selects the next available physical storage location. In the FIG. 7 example, after storing data on the physical storage location 716, the append point 720 may skip the unavailable storage division 713, and continue at the next available location (e.g., physical storage location 717 of storage division 718).

Figure 7B:
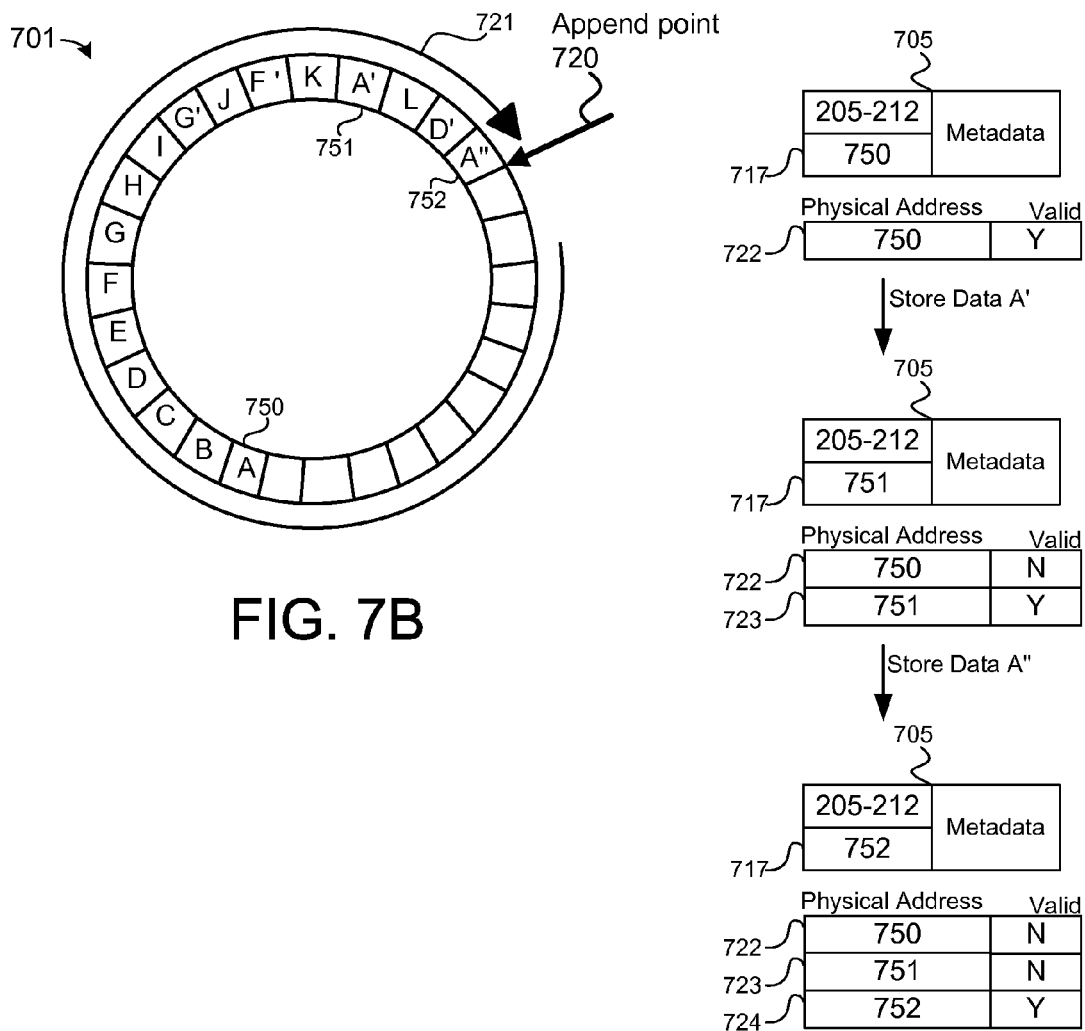
FIG. 7B depicts cyclic, sequential storage operations on a non-volatile storage device.

After storing data on the "last" storage location (e.g., storage location N 718 of storage division 815), the append point 720 wraps back to the first division 712 (or the next available storage division if 712 is unavailable). Accordingly, the append point 720 may treat the physical address space 710 as a loop or cycle. As depicted in FIG. 7B, the append point 720 sequentially cycles through the storage locations 701 of the non-volatile storage device.

As discussed above, storing data in a sequential, log-based format may comprise persisting metadata on the non-volatile storage device 402 that describes the data stored thereon. The persistent metadata may comprise the logical identifier associated with the data and/or provide sequence information pertaining to the sequential ordering of storage operations performed on the non-volatile storage device. Accordingly, the sequential, log-based data may represent an "event log" that tracks the sequence of storage operations performed on the non-volatile storage device 402.

Figure 8:
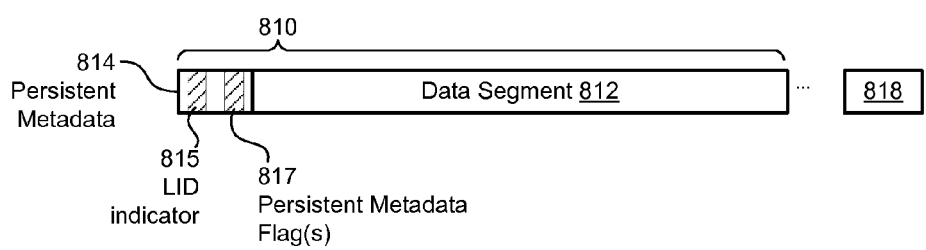
FIG. 8 depicts one embodiment of a log-based data format.

FIG. 8 depicts one example of a sequential, log-based data format (packet format 810). A data packet 810 includes a data segment 812 comprising data of one or more logical identifiers. In some embodiments, the data segment 812 comprises compressed, encrypted, and/or whitened data. Furthermore, the data segment 812 may be encoded in one or more error-correcting code data structure (e.g., ECC codewords). The data segment 812 may be a predetermined size (e.g., a fixed "block" or "segment" size). Alternatively, the data segment 812 may be a variable size.

The packet 810 includes persistent metadata 814 that is stored on the non-volatile storage device. In some embodiments, the persistent metadata 814 is stored with the data segment 812 (e.g., as a packet header, footer, or the like). The persistent metadata 814 may include a logical identifier indicator 815 that identifies the logical identifier(s) to which the data segment 812 pertains. The logical identifier indicator 815 may be used to reconstruct the storage metadata, such as the forward index (e.g., forward index 504) and/or reverse index (e.g., reverse index 622). The persistent metadata 814 may further comprise one or more metadata flags 817. As discussed below, the flags 817 may be used to support atomic storage operations, transactions, or the like.

In some embodiments, the packet 810 is associated with a sequence indicator 818. The sequence indicator 818 may be persisted on the storage location (e.g., page) with the packet 810 and/or on the storage division (e.g., erase block) of the packet 810. Alternatively, the sequence indicator 818 may be persisted in a separate storage location. In some embodiments, a sequence indicator is applied when a storage division is made available for use (e.g., when erased, when the first or last storage location is programmed, or the like). The sequence indicator 818 may be used to determine the temporal sequential ordering of storage operations on the non-volatile storage device.

Referring back to FIG. 4, the sequential, log-based format disclosed herein enables the SL 430 to reconstruct the storage metadata 434, as well as other data, in the event of an invalid shutdown (or other failure condition).

The storage metadata 434 (e.g., the forward index 504 of FIG. 5) maintains assignments between logical identifiers and physical storage locations on the non-volatile storage device. Accordingly, there may be no pre-determined mapping between logical identifiers and physical storage locations; data of a logical identifier may be stored on any arbitrary physical storage location of the non-volatile storage device. Moreover, since data is stored in sequentially and in a log-based format, when data is overwritten or modified, previous versions of the data may be retained (until recovered in a grooming operation).

Referring back to FIG. 7B, the letters A-L represent data stored on physical storage locations of a non-volatile storage device. Data A is initially stored at physical storage location 750. When the data A is persisted at location 750, the physical storage location reference 717 of the corresponding forward index entry 705 is updated to reference the physical storage location 80. In addition, a reverse index entry 722 may be updated to indicate that the physical storage location 80 comprises valid data and/or to associate the physical storage location 750 with logical identifiers 205-212 (not shown). (For clarity, other portions of the forward index and/or reverse index are omitted from FIG. 7B.)

When the data A is modified and/or overwritten, the updated data may not be stored in the original physical storage location 750. Instead, the updated data A is stored sequentially (out-of-place) at storage location 751 (at the current position of the append point 720). The storage metadata is updated accordingly. The forward index entry 705 is updated to associate the logical identifiers 205-212 with the physical storage location 81 comprising A. The entry 722 of the reverse index is updated to mark physical storage location 80 as invalid and to indicate that the physical storage location 81 comprises valid data. Marking the physical storage location 80 as invalid may allow the storage location 80 to be reclaimed in a grooming and/or garbage collection operation, as described above.

The data A is further modified and/or overwritten with data A. The updated data A is stored at the current append point 720 (physical storage location 752). The storage metadata is updated, as described above: the forward index entry 705 is updated to associate the entry with the physical storage location 752, and a reverse index entry 724 is updated to indicate that the physical storage address 82 comprises valid data (and that the physical address 81 comprises invalid data).

The "obsolete" versions A and A may be retained on the non-volatile storage device until the corresponding physical storage locations 80 and/or 81 are reclaimed (e.g., erased) in a grooming operation.

The data A, A, and A may be stored in the sequential, log-based format (an "event-log" format) described above. Storage metadata, such as the forward index 504 of FIG. 5 may be reconstructed from the sequential, log-based formatted data. The logical identifier indicator of the persistent metadata stored with data A, A, and/or A may indicate that the data stored at the physical storage locations 80, 81, and 82 corresponds to logical identifiers 205-212. A sequence indicator of the data A, A, and/or A (and/or the position of the append point 50) indicates that the physical storage location 82 comprises the current, valid copy of the data. Therefore, the forward index entry 705 may be reconstructed to associate the logical identifiers 205-212 with the physical storage location 82. In addition, the reverse index entries 722, 723, and/or 724 may be reconstructed to indicate that the physical storage locations 750 and 751 comprise invalid data, and that the physical storage location 752 comprises valid data.

The storage metadata and sequential, log-based storage disclosed herein may be leveraged to implement efficient atomic operations. Many applications (e.g., user applications 412) rely on atomic storage operations. Atomic storage operations may be limited to a relatively small, fixed-sized data (e.g., a single sector within a block storage device). Atomic storage operations may require a "copy on write" operation to ensure consistency (e.g., to allow the atomic storage operation to be rolled back, if necessary), which may significantly impact the performance of the atomic storage operations. Moreover, support for atomic storage operations may typically be provided by a layer that maintains its own, separate metadata pertaining to atomic storage operations, resulting in duplicative effort, increased overhead, and/or decreased performance.

In some embodiments, the storage metadata 434 is leveraged and/or extended to provide efficient atomic storage operations through the SL interface 440. Consistency of the storage metadata 434 may be maintained by deferring updates until the one or more storage operations comprising the atomic storage request are complete. Metadata pertaining to storage operations that are "in process" (e.g., ongoing operations that are not yet complete) may be maintained in separate "inflight" metadata, described below. Accordingly, in certain embodiments, the state of the storage metadata 434 is maintained until the atomic storage operation successfully completes, obviating the need for extensive postfailure "roll back" operations.

The sequential, log-based data format provides an "event log" of storage operations on the non-volatile storage device 402. The sequential, log-based storage retains multiple copies of data (e.g., previous versions of the data) on the non-volatile storage device 402. The previous versions may be retained until the data is marked as invalid in the storage metadata 434 and/or the data is recovered in a grooming operation.

As discussed above, the storage metadata 434 may be reconstructed from the sequential, log-based data stored on the non-volatile storage device 402. The up-to-date version of data is identified based upon the location of the append point and/or sequence indicators associated with the data. During reconstruction, data pertaining to an incomplete atomic storage request may be identified (and discarded) using persistent metadata associated with the data, as depicted in FIG. 8.

In some embodiments, the SL 430 provides atomic storage operations by storing data in a sequential, log-based format, storing data pertaining to an atomic storage request together with persistent metadata on the non-volatile storage device, and/or acknowledging completion of the atomic storage request when the one or more storage operations are complete. The logical identifiers of the atomic storage request may be noncontiguous. Completion of a storage request may comprise transferring data to a write buffer, a protection domain, a powercut safe domain, and/or storing the data on a non-volatile storage device 402. The persistent metadata may be stored with data of the atomic storage request in a single storage operation. The storage metadata 434 may be preserved while an atomic storage operation is in process by deferring updates to the storage metadata 434 until the atomic storage operation is complete. Metadata pertaining to an atomic storage operation that is in progress may be maintained in a separate index (inflight index). In some embodiments, a first persistent metadata flag identifies data pertaining to the atomic storage request, and a second persistent metadata flag indicates completion of the atomic storage request. An incomplete atomic storage request is identified when the non-volatile storage device 402 comprises the first flag, but not the second flag. Alternatively, the persistent metadata flags may comprise an identifier (e.g., transaction or atomic storage request identifier). Storage operations of an atomic storage request may be completed despite invalid shutdown conditions, such as a failure of a host computing device 401, power loss or the like. Assignments between logical identifiers and physical storage locations may be preserved until the atomic storage operation completes. Metadata pertaining to in process atomic storage operations may be maintained in an inflight index, which may be separate from other storage metadata. The inflight index may be accessed to identify read and/or write hazards pertaining to the atomic storage request.

Figure 9A:
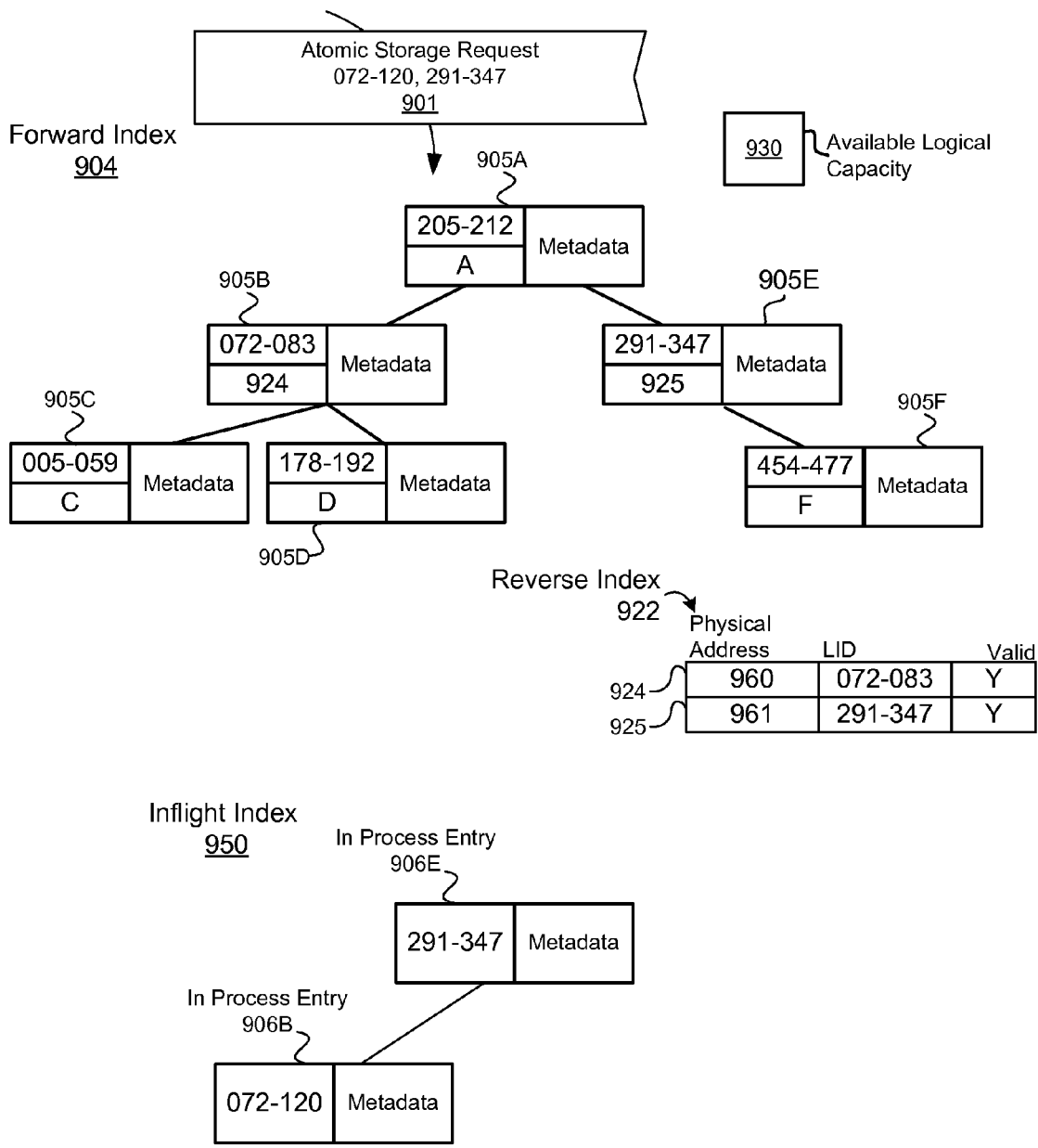
FIGS. 9A-E depict exemplary storage metadata comprising a separate inflight index for atomic storage operations.

FIG. 9A depicts one example of storage metadata 434 that comprises a forward index 904 and a separate, inflight index 950. Like the forward index 504 described above, the index 904 is a range-encoded B-tree that tracks allocations of logical identifiers within the logical address space of a non-volatile storage device. The forward index 904 may also track the available logical capacity 930 of the logical address space and/or may include an unallocated index (not shown) to track unallocated portions of the logical address space.

Figure 9B:
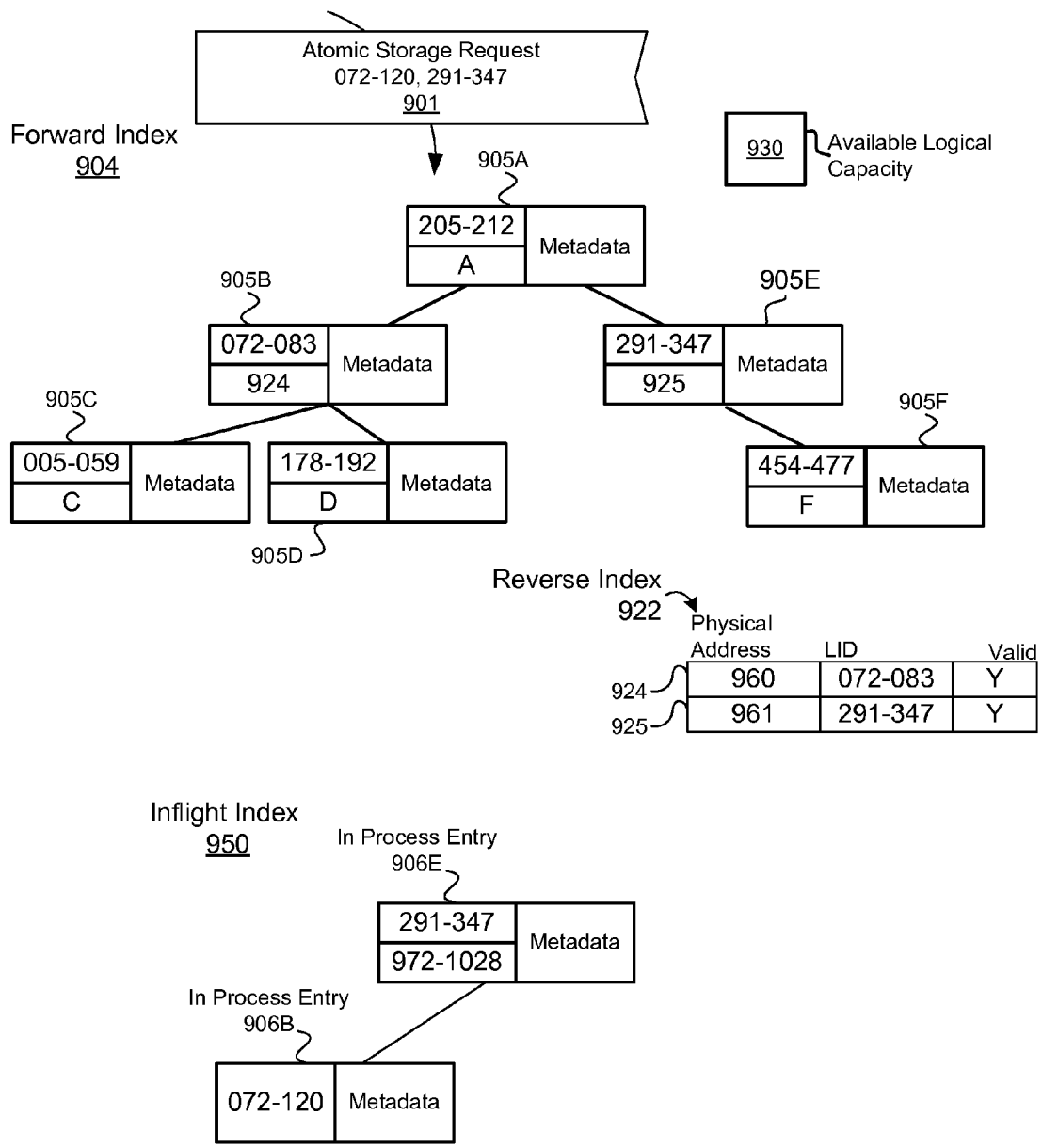
Figure 9C:
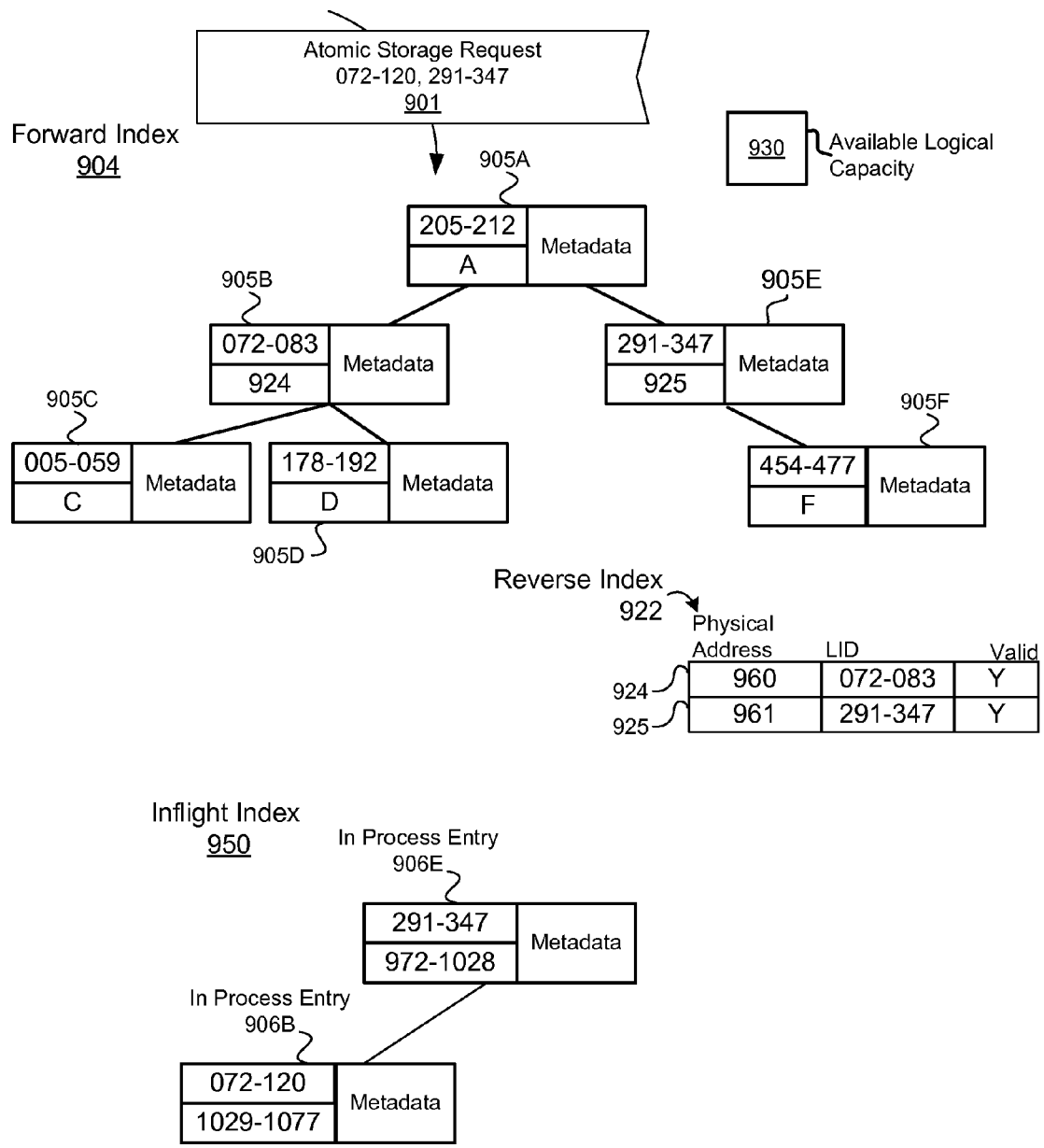

An atomic storage request 901 may comprise a request to store data atomically to a set of one or more noncontiguous, contiguous, or combination of contiguous and noncontiguous logical identifiers. In the FIG. 9A example, the atomic storage request 901 comprises atomically storing to two noncontiguous logical identifier ranges (072-120 and 291-347), portions of which overwrite existing data in the forward index 904. The existing data is referenced by entries 905B and 905E of the forward index 904. The entries 905B and 905E may comprise references to physical storage locations of the data and/or may reference the physical storage locations 960 and 961 of the data using the entries 924 and 925 of a reverse index 922 (for clarity, only a portion of the reverse index 922 and reverse index entries are depicted). As illustrated in FIG. 9A, the atomic storage request expands the logical identifier range of 072-083 to 072-120. Servicing the atomic storage request may, therefore, comprise allocating additional logical identifiers in the logical address space. The new logical identifiers may be allocated in the forward index 904 (in an unassigned entry (not shown)), or, as depicted in FIGS. 9A-9C in the inflight data structure 950.

As discussed above, the storage metadata 434 may be updated as data is stored on the non-volatile storage device 402. The updating may comprise updating one or more entries in the forward index 904 to assign logical identifiers to updated physical storage locations. The updating may further comprise updating the reverse index 922 to invalidate previous versions of overwritten/modified data and to track the physical storage locations of the updated data. This updating changes the state of the storage metadata 434, which may make it difficult to "roll back" a failed atomic storage operation. Moreover, the updates may cause previous versions of the data to be removed from the non-volatile storage device 402 by a groomer, garbage collection system, or other process, such as cache manager or the like; as discussed above, storage locations comprising invalid data as indicated by absence from the forward index 904 and/or marking the data as invalid in the reverse index 922, may be removed. Removal of the previous version of data overwritten by a data of an atomic storage request may make it difficult or impossible to roll back the atomic storage request in the event of a failure.

Use of the inflight data structure 950 may provide additional advantages over tracking in-process storage operations using the forward index 904 alone. For example, as a storage request is performed, the inflight data structure 950 may be updated via an "exclusive" or "locked" operation. If these updates were performed in the forward index 904 (or other shared metadata), the lock may preclude other storage requests from being completed. Isolating these updates in a separate data structure may "free up" the storage metadata to service other, potentially concurrent, requests. In addition, the inflight index 950 may track in-process operations that may be rolled back in the event of failure (e.g., atomic storage operations). Furthermore, isolating the in-process metadata within the inflight index 950 allows the other metadata 904 to be maintained in a consistent state (until the storage request is fully complete), and may allow for more efficient rollback of failed and/or incomplete storage requests.

In some embodiments, the state of the storage metadata 434 is preserved until completion of an atomic storage request. The progress of an atomic storage request (e.g., request 901) may be tracked in a separate data structure, such as an inflight index 950. Modifications to the inflight index 950 may be applied to the storage metadata (forward index 904 and/or reverse index 922) upon completion of the atomic storage request (and/or upon reaching a point after which the atomic storage operation is guaranteed to complete).

The inflight index 950 depicted in FIG. 9A may comprise a separate data structure from the forward index 904. The disclosure is not limited in this regard; in other embodiments, the inflight index 950 may be implemented within the forward index 904 (using special-purpose entries in the index 904), as metadata entries of the forward index entries, or the like.

The inflight index 950 may comprise any suitable data structure (e.g., tree, B-tree, radix tree, map, etc.). In the FIG. 9A example, the inflight index 950 is implemented using a range encoded tree. The entries 906 in the inflight index 950 may be indexed by logical identifier, as described above.

Entries 906B and 906E are added to the inflight index 950 in response to the atomic storage request 901. The entries 906B and 906E identify logical identifiers pertaining to the atomic storage operation. As illustrated in FIG. 9A, the atomic storage request 901 comprises two noncontiguous logical identifier ranges. The inflight index 950 comprises respective entries 906B and 906E for each logical identifier range. The disclosure is not limited in this regard, however, and could be adapted to generate entries each logical identifier, for sub-ranges of logical identifiers in the request, and so on.

The inflight index 950 is updated in response to completion of one or more portions of the atomic storage request 901. FIG. 9B depicts the inflight index 950 after storing a first portion of the data of the atomic storage request 901. The entry 906E indicates that the data corresponding to logical identifiers 291-347 has been successfully stored at physical storage locations 972-1028. Alternatively, or in addition, the physical storage locations may be referenced using a secondary datastructure, such as a separate reverse index or the like. The forward index 904 and reverse index 922 remain unchanged.

The inflight index is further updated in response to completion of other portions of the atomic storage request 901. FIG. 9C depicts the inflight index 950 as the atomic storage request is completed. The inflight index entry 906B is updated to assign physical storage locations to the logical identifiers 072-083. The forward index 904 and/or reverse index 922 remain unchanged.

The storage metadata 434 may be updated in response to detecting completion of the atomic storage request 901 and/or determining that the atomic storage request 901 will successfully complete (e.g., data of the atomic storage request has been received at a write data pipeline or write buffer of the non-volatile storage device 402).

Figure 9D:
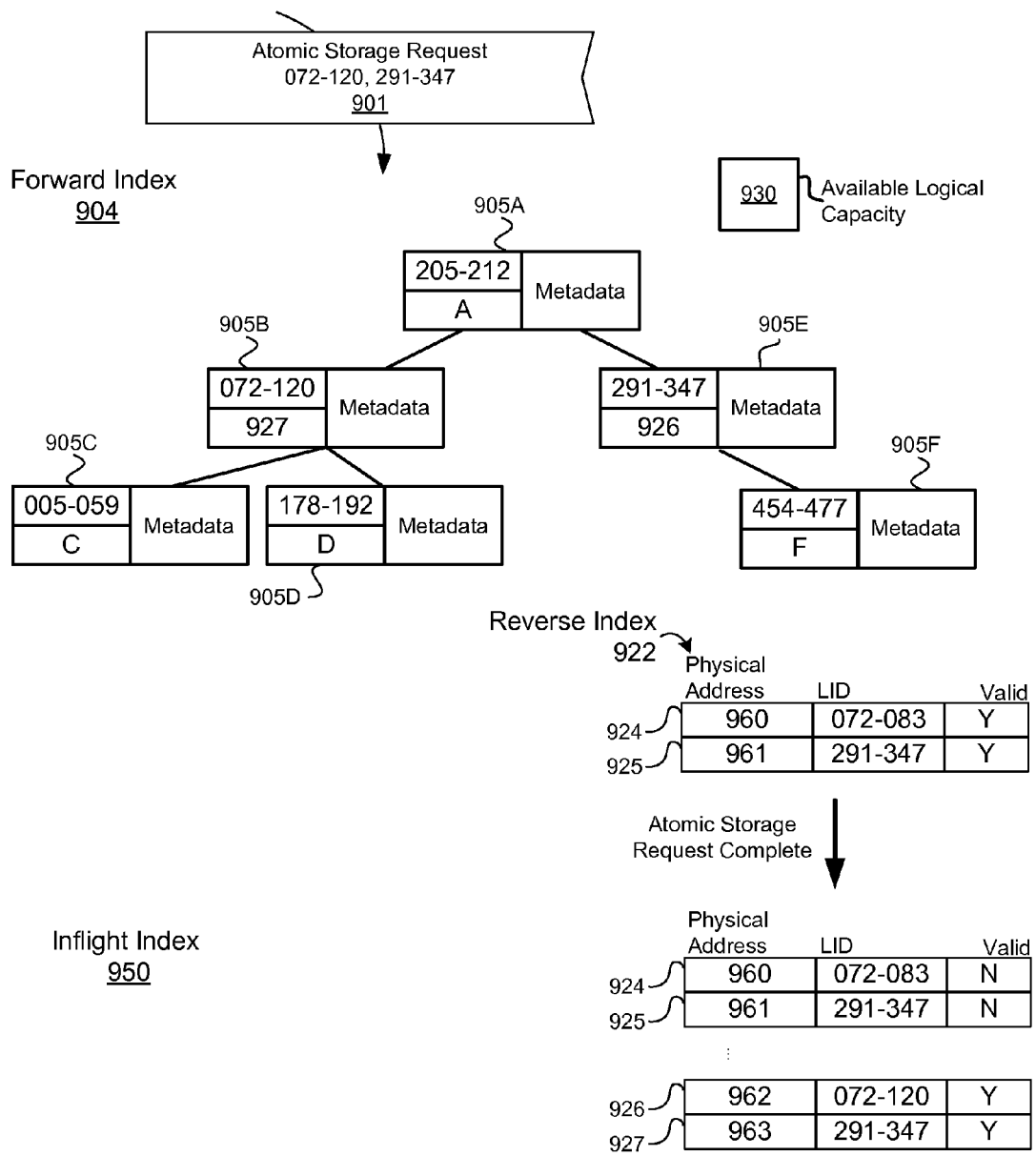

FIG. 9D depicts updated storage metadata 434 following completion of the atomic storage request 901. As shown in FIG. 9D, the entries 906B and 906E may be removed from the inflight index 950. In addition, the reverse index 922 may be updated to invalidate data overwritten and/or modified by the atomic storage request (e.g., invalidate entries 924 and 925) and to add entries 926 and 927 representing storage locations of the updated data. The entries 950B and 950E of the forward index 904 are updated to assign the logical identifiers of the atomic storage request 901 to the updated physical storage locations 926 and 927. The updating may further comprise expanding the entry 950B from a logical identifier range of 072-83 to 072-120. The forward index 904 and/or portions thereof may be locked during the updating. The lock may prevent potential read/write hazards due to concurrent storage requests.

Figure 9E:
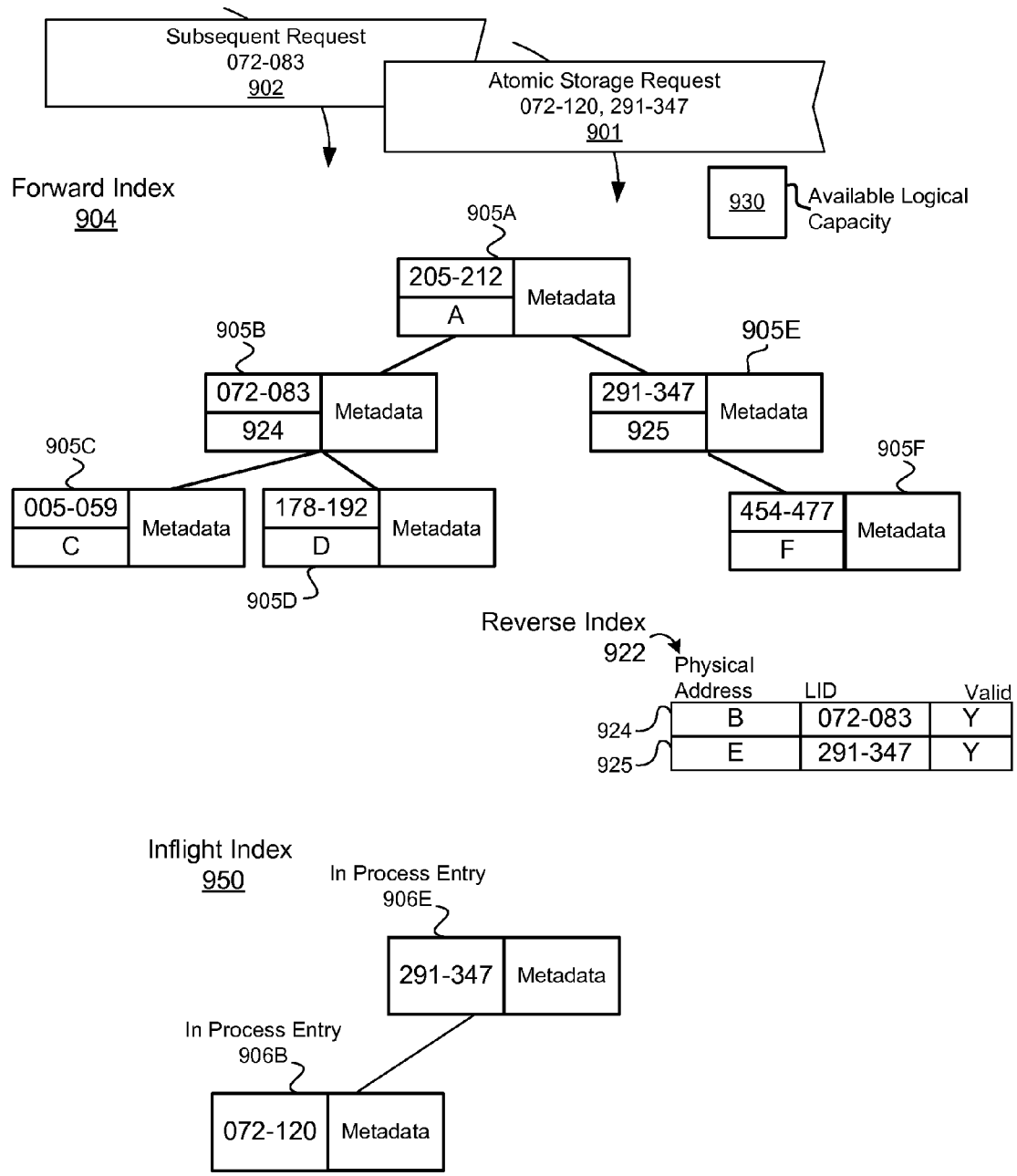

In some embodiments, the inflight index 950 is used to avoid write and/or read hazards. As shown in FIG. 9E, a storage request 902 pertaining to a logical identifier of an atomic storage request may be received after or concurrent with the atomic storage request 901, but before completion of the atomic storage request 901. For example, the storage request may pertain to logical identifiers 072-083 that are to be overwritten by the atomic storage request 901. If the request 902 is to read data of 072-083, the request may pose a read hazard (e.g., read before write), since reading the physical storage location 924 of the entry 950B will return obsolete data. The read hazard may be identified in the inflight index 950, which indicates that the target of the request 902 is in the process of being modified. The request 902 may be delayed until completion or failure of the atomic storage request 901 (and removal of the in-process entry 906B from the inflight index 950). A write hazard may be detected and addressed similarly.

The inflight index 950 may also be used to prevent a subsequent storage request from writing data to the logical identifiers of the atomic storage request. For example, the entry 906B of the inflight index 950 may be accessed to prevent another storage client from allocating logical identifiers 084-120.

Referring back to FIG. 4, data may be stored on the non-volatile storage device 402 in an "event log;" data is stored in a sequential log-based format, wherein data is appended to the non-volatile storage media 410 at an append point which moves sequentially (and cyclically) through the physical storage space of the non-volatile storage device 402. In the event of an invalid shutdown, the storage metadata 434 may be reconstructed from the contents of the non-volatile storage device 402. This reconstruction is enabled by the sequential, log-based format of the data; data is stored in conjunction with persistent metadata that associates the data with one or more logical identifiers from which a forward and/or reverse index may be derived. Up to date, valid data may be distinguished from obsolete or invalid data based upon the ordering of storage operations (e.g., relative to the position of the append point and/or sequence identifiers associated with the data).

Figure 10:
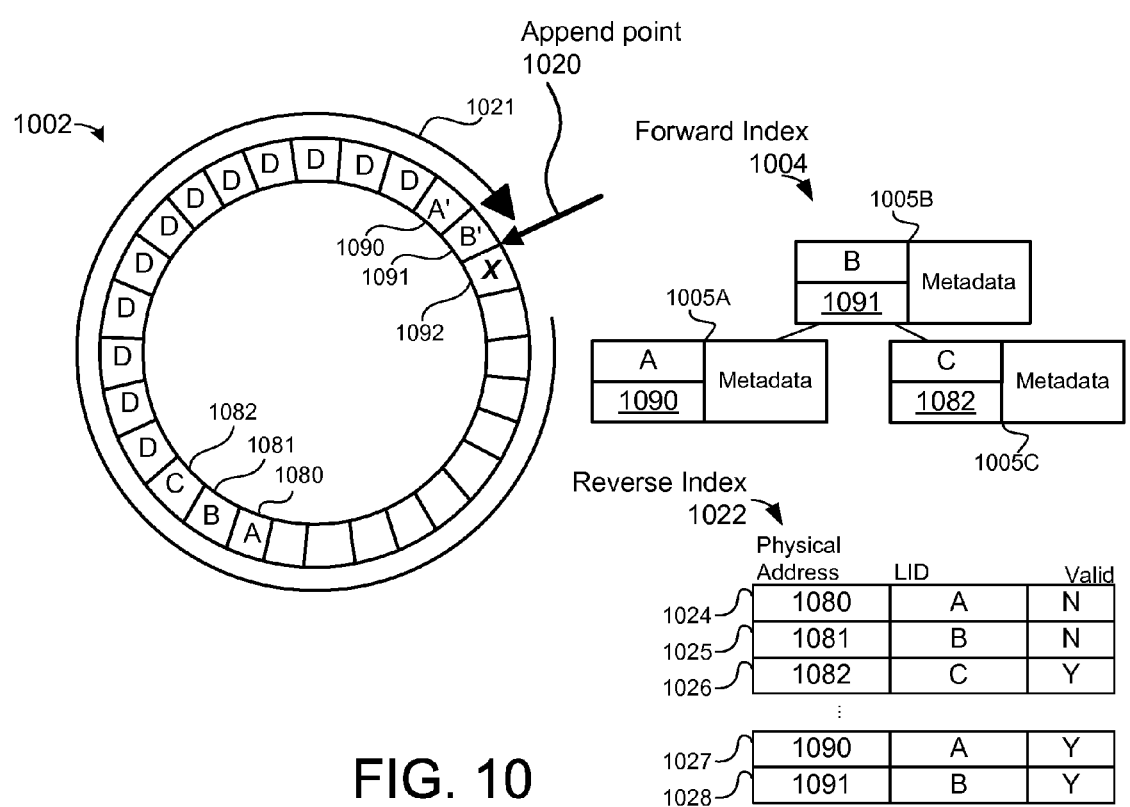
FIG. 10 depicts an incomplete atomic storage operation.

Partially completed atomic storage operations should be identifiable during reconstruction. Otherwise, data pertaining to a failed atomic storage operation may appear to be the most up-to-date version of data. This potential issue is illustrated in FIG. 10. Data A, B, C are stored on physical storage locations 1080, 1081, and 1082 respectively. Other data D is subsequently stored within the physical storage space of a non-volatile storage device 1002. The data A, B, and C is modified (overwritten) in a subsequent atomic storage request. The atomic storage request stores a portion of the updated data A at physical storage location 1090 and updated B 1091, but a failure occurs (with the append point 1020 at physical storage location 1092) before the atomic storage operation is completed (before writing C at physical storage location 1092). The failure may require the storage metadata (e.g., forward index and/or reverse index through power loss or data corruption) to be reconstructed.

As discussed above, the forward index may be reconstructed from the "event log" of sequential log-based data on the non-volatile storage device. The event log is accessed from the last known append point 1020, which corresponds to the most recent operations in the log. In some embodiments, the append point 1020 location is periodically stored on a non-volatile storage device. Alternatively, or in addition, the append point 1020 may be determined using sequence indicators associated with storage divisions (e.g., erase blocks) of the non-volatile storage device. The metadata is reconstructed by traversing the event log in a predetermined order (e.g., from the most recent storage operations to older storage operations).

As discussed above, data is stored on the non-volatile storage device 1002 in a sequential log-based format, in which the data is stored with persistent metadata. FIG. 8, discussed above, illustrates an exemplary sequential log-based data format 810 comprising a data segment 812 and persistent metadata 814. The persistent metadata 814 may include a logical identifier indicator 815 that identifies the logical identifier(s) to which the data segment 812 is assigned. A sequence indicator 1018 (included as part of the data format 1010, on the same storage division (e.g., erase block), or the like), may be used to determine the relative order of the data 810 in the event log.

Referring back to FIG. 10, based the on event log (the sequential log-based data stored on the non-volatile storage device 1002), the data A at 1090 and B 1091 of the failed atomic storage request may appear to comprise the most up-to-date versions of the data A and B (rendering obsolete the previous versions(s) of A at 1080, and B at 1081). However, the atomic storage request should have been rolled back to preserve the original data A, B, and C. This may result in reconstructing invalid entries 1005A and 1005B in the forward index 1004 that associate the A and B logical identifiers with data of the failed atomic storage request (e.g. storage locations 1090 and/or 1091). The reverse index 1022 may comprise entries 1024 and 1025 that improperly invalidate A data at 1080 and B data at 1081, and entries 1027 and 1028 that improperly indicate that the data of the failed atomic storage request at 1090 and 1091 is valid.

In some embodiments, persistent indicators are used to track in-process storage requests on the non-volatile storage device and/or to account for loss of storage metadata. As used herein, a persistent indicator refers to an indicator that is stored (persisted) on the non-volatile storage device with the data to which it pertains. In some embodiments, the persistent indicators are persisted with the data (e.g., as a packet header associated with the data, or the like). The persistent indicators may be stored with the data in a single storage operation and/or in the smallest write unit supported by the non-volatile storage device 102. Accordingly, persistent storage indicators will be available when the storage metadata is reconstructed from the contents of the non-volatile storage device. The persistent indicators may identify incomplete and/or failed atomic storage requests despite an invalid shutdown and/or loss of storage metadata 434.

Referring back to FIG. 8, in some embodiments, the persistent metadata 814 of the sequential log-based data format is used to identify failed atomic storage requests. The persistent metadata flag(s) 817 may identify data 810 pertaining to an atomic storage request and/or indicate completion of an atomic storage request. The persistent metadata flag(s) 817 may be stored with the data segment 812 in a single storage operation (e.g., single program operation, write buffer programming operation, or the like).

Figure 11A:
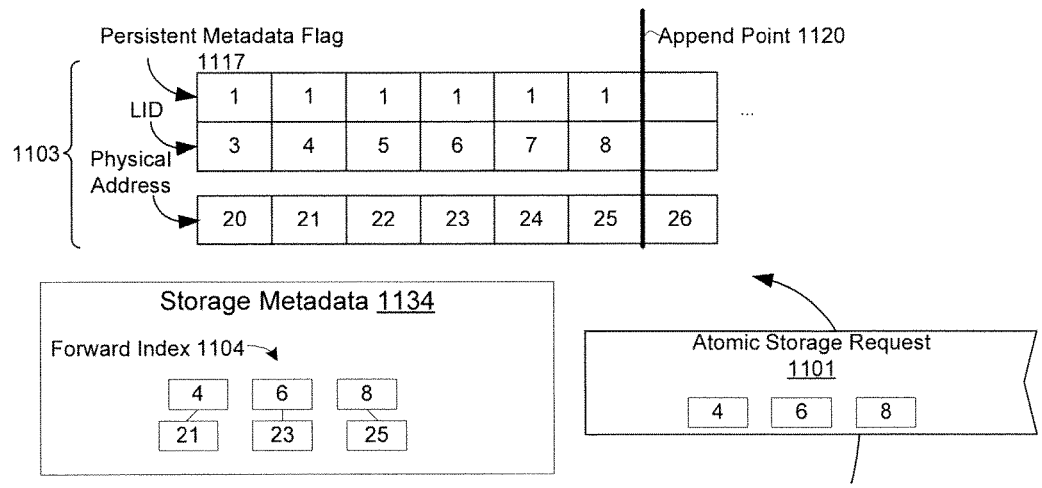
FIGS. 11A-C depict exemplary persistent metadata flags for atomic storage operations.
Figure 11B:
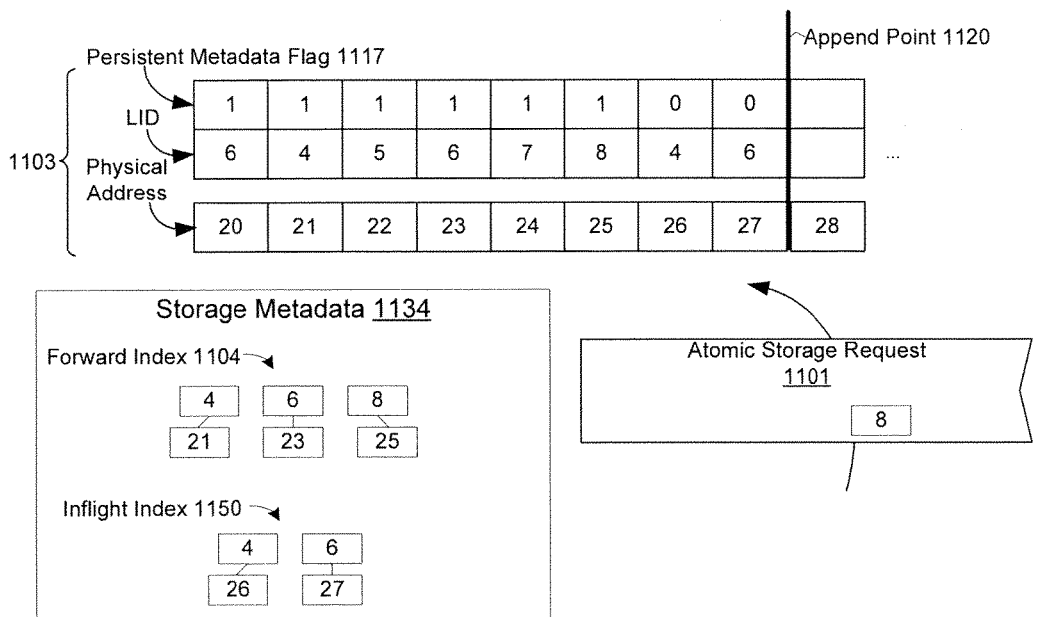
Figure 11C:
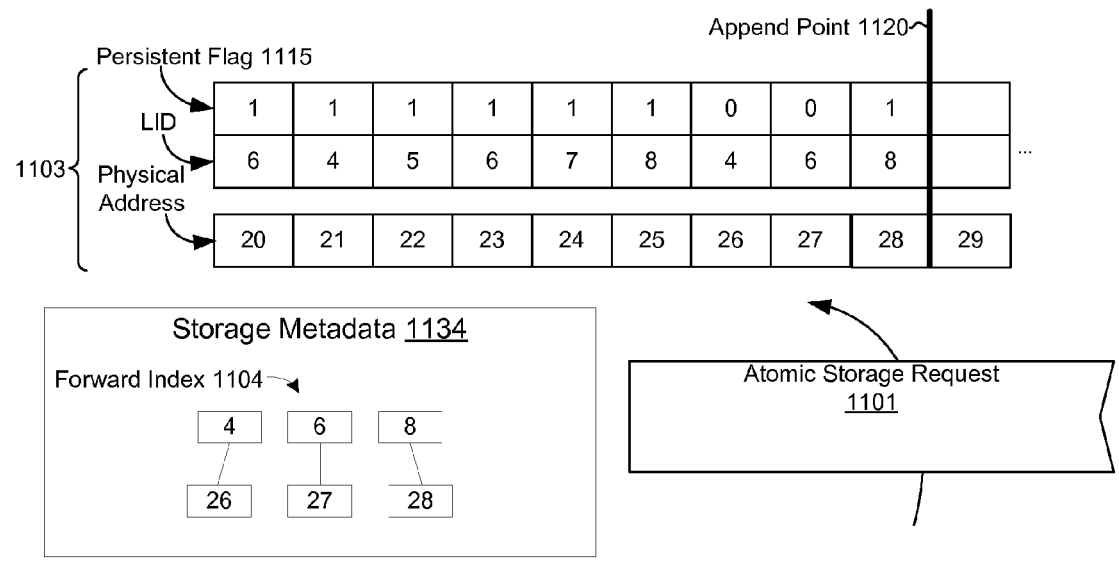

In some embodiments, data pertaining to an atomic storage operation is stored with a first persistent metadata flag 817 (e.g., a single bit "0"). Data that does not pertain to an atomic storage operation, or indicates completion of an atomic storage operation, is stored with a second persistent metadata flag 817 (e.g., a single bit "1"). FIGS. 11A-C illustrate the progression of persistent metadata flags in an exemplary atomic storage operation.

In FIG. 11A, the event log (sequential log-based data) 1103 comprises data pertaining to logical identifiers 3-8 stored on respective physical storage locations 20-25. The append point 1120 is to store data at the next, sequential physical storage location 26. A forward index 1104 associates logical identifiers 4, 6, and 8 with respective physical storage locations as described above.

An atomic storage request 1101 is received to store data in association with a noncontiguous set of logical identifiers (LIDs 4, 6, and 8). In some embodiments, an atomic storage request 1101 is formed by aggregating one or more sub-requests. The sub-requests may be combined into a single atomic storage request that is implemented as a whole.

In some embodiments, data of the atomic storage request 1101 is stored contiguously in the event log 1103, such that data that does not pertain to the atomic storage request 1101 is not interleaved with data of the atomic storage request. The logical identifiers of the atomic storage request 1101, however, may be noncontiguous, out of order, or the like. Accordingly, while data of the atomic storage request 1101 is being stored on event log 1103, other data that does not pertain to the request 1101, such as garbage collection bypass data, grooming data (e.g., data refresh), other data requests, and the like, may be suspended.

FIG. 11B depicts the state of the storage metadata 114, inflight index 1150, and event log 1103 while the atomic storage request 1101 is in process. In FIG. 11B, data of logical identifiers 4 and 6 have been stored on the event log 1103 (e.g., programmed to a physical storage location, streamed to a program buffer, or the like). The inflight index 1150 tracks the progress of the atomic storage request (e.g., assigns the logical identifiers 4 and 6 to the physical storage locations 26 and 27 comprising data of the atomic storage request 1101).

The persistent metadata flag 1117 stored with the data on physical storage locations 26 and 27 indicates that the physical storage locations 26 and 27 comprise data pertaining to an incomplete atomic storage operation (the persistent metadata flag 1117 is a "0" rather than a "1," reading left to right from the first "0" the end of an atomic storage operation will be signaled by the last packet of the atomic storage operation having a "1" for the persistent metadata flag 1117). The persistent metadata flag 1117 may be stored with the data on the physical storage locations 26 and 27.

If a failure were to occur, the persistent metadata flags 1117 may be used to identify data pertaining to the failed atomic storage request 1101. As discussed above in conjunction with FIG. 10, storage metadata is reconstructed using the event log of sequential log-based data. When the event log 1103 of FIG. 11B is traversed in reverse sequence order (e.g., left to right), the first persistent metadata flag 1117 will be a "0," indicating that the data pertains to a failed atomic storage request. The data at storage location 27 may, therefore, be invalidated and may not result in reconstructing invalid storage metadata 1134 as in the FIG. 10 example. The data may continue to be invalidated or ignored, until a "1" flag is encountered at physical storage location 25. As will be appreciated by one of skill in the art, this approach relies on data of the atomic storage request 1101 being stored contiguously within the event log 1103. If data comprising a "1" persistent metadata flag 1117 were interleaved with the atomic storage data (before completion of the atomic storage request 1101), the data at 26 and/or 27 could be misidentified as being valid (e.g., pertaining to a complete atomic storage request 1101).

FIG. 11C illustrates completion of the atomic storage request 1101. The final storage operation of the atomic storage request 1101 comprises a "1" flag indicating that the atomic storage request 1101 is complete. The forward index 1104 is updated to assign the logical identifiers 4, 6, and 8 with updated physical storage locations 26, 27, and 28. The inflight index is updated (the entries representing logical identifiers 4, 6, and 8 are removed) to indicate that the atomic storage request 1101 is no longer in process (e.g., is complete).

If a failure were to occur subsequent to persisting the data at physical storage location 28, the storage metadata 1134 could be correctly reconstructed. When traversing the event log 1103 in reverse sequence (e.g., from left from the append point), the first persistent metadata flag 1117 encountered would be the "1" flag on the physical storage location 28, indicating that the data at physical storage locations 26 and 27 pertain to a successfully completed atomic storage request.

In some embodiments, the data of such an atomic storage request may be limited by storage boundaries of the non-volatile storage device (e.g., page boundaries, logical page boundaries, storage divisions, erase blocks, logical erase blocks, etc.). Alternatively, the size of the data for an atomic storage request may require that the atomic storage request wait until the append point is on a storage division with sufficient free space to fit the atomic storage request before reaching a logical erase block boundary. Accordingly, the size of an atomic storage request may be limited to a logical page size. Additionally, in some embodiments, atomic storage requests do not cross logical erase block boundaries.

In another example, the persistent metadata flag 1117 may comprise an identifier, which may allow data to be interleaved with atomic storage requests and/or allow atomic storage requests to be serviced concurrently.

Figure 12:
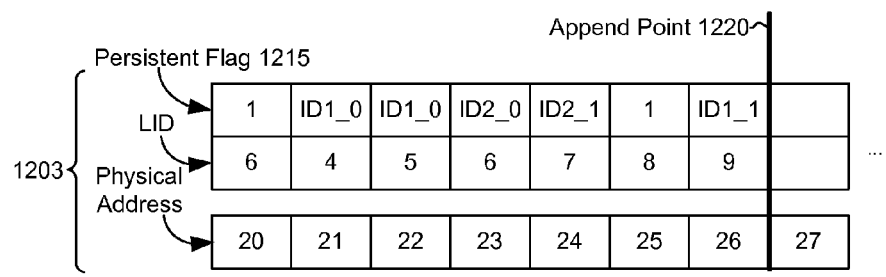
FIG. 12 depicts another exemplary persistent metadata flag for atomic storage operations.

FIG. 12 depicts one example of an event log 1203 comprising persistent metadata flags 1217. The event log 1203 comprises data pertaining to two atomic storage operations having respective identifiers ID1 and ID2. ID1 corresponds to an atomic storage request pertaining to logical identifiers 4, 5, and 9 and ID2 corresponds to an atomic storage request pertaining to logical identifiers 6 and 7.

The ID1_0 persistent metadata flag 1217 on physical storage locations 21 and 22 identifies data pertaining to the atomic storage operation ID1 that has not yet been completed. The persistent metadata flag 1217 ID1_1 on the physical storage location 26 indicates successful completion of the atomic storage operation ID1. Another persistent metadata flag 1217 ID2_0 identifies data pertaining to a different, interleaved atomic storage operation. The persistent metadata flag 1217 ID2_1 of physical storage location 24 indicates successful completion of the atomic storage request ID2. Data that does not pertain to an atomic storage operation may comprise a "1" persistent metadata flag 1217 or other, pre-determined identifier. When reconstructing storage metadata from the event log 1203, if an atomic storage request identifier comprising a "0" flag (e.g, ID1_0) is encountered before (or without) encountering a completion persistent metadata flag 1217 (e.g., ID1_1), all data associated with the persistent metadata flag 1217 ID1 may be invalidated. By contrast, after encountering the ID1_1 flag, all data associated with the ID1 persistent metadata flag 1217 may be identified pertaining to a completed atomic storage request. Although the extended persistent metadata flags 1217 of FIG. 12 may provide for more robust support for atomic storage operations, they may impose additional overhead.

Figure 13A:
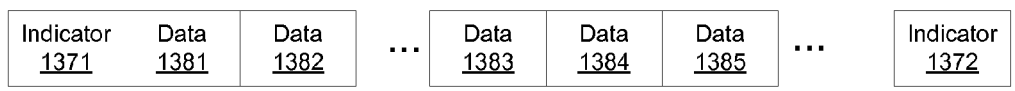
FIGS. 13A-C depict exemplary persistent metadata flags for atomic storage operations.
Figure 13B:
Figure 13C:
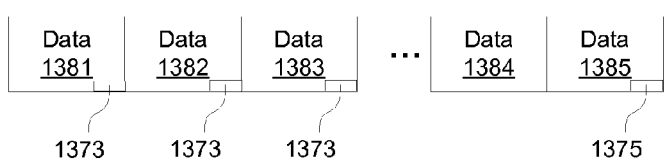

FIGS. 13A-C depict another approach to providing atomic storage operations. When an atomic storage request is serviced, a persistent indicator 1371 may be stored on the non-volatile storage media 1370. The indicator 1371 identifies an atomic storage request and indicates that the atomic storage request is incomplete. The persistent indicator 1371 may identify the atomic storage request using one or more logical identifiers, a logical identifier range, or other suitable identifier. In some embodiments, the indicator 1371 may identify the atomic storage request by its corresponding logical identifiers or other suitable identifier.

As discussed above, data is stored on the non-volatile storage media 1370 in a sequential log-based format (e.g., in a packetized format). Each data packet 1381-1385 may include header information that identifies, inter alia, a logical identifier associated with the corresponding data segment. The header information allows the storage metadata to be reconstructed from the data stored on the non-volatile storage media 1370 in the event of an invalid shutdown or other loss of storage metadata. In the FIG. 13A example, data segments 1381, 1382, 1383, and 1385 pertain to the atomic storage operation of the indicator 1371, and data segment 1384 pertains to a different, unrelated storage operation (since data 1384 does not include the indicator 1371).

The persistent indicator 1372 is stored on the non-volatile storage media 1370 in response to completion of the storage operations of the atomic storage request. The persistent indicator 1372 identifies the atomic storage request and indicates that the atomic storage request is complete (e.g., indicates that all storage operations of the atomic storage request were successfully completed). The persistent indicator 1372 may identify the atomic storage request as described above (e.g., by logical identifier, logical identifier range, or the like).

The persistent indicators 1371 and 1372 may be used to distinguish between complete and incomplete (e.g., failed) atomic storage requests without reference to the storage metadata. When reconstructing the storage metadata (or performing some other operation, such as grooming or garbage collection), the persistent indicator 1371 identifies an incomplete (e.g., open) atomic storage request. Data packets 1381, 1382, 1383, and 1385 pertaining to the atomic storage request may be associated with the atomic storage operation using the header information thereof (e.g., by comparing logical identifiers of the data packets 1381, 1382, 1384, and 1385 with logical identifiers or ranges, of the persistent indicator 1371). When the indicator 1372 is encountered, the atomic storage request and the corresponding data packets 1381, 1382, 1383, and 1385 are verified as pertaining to a complete (e.g., "closed") atomic storage request.

As depicted in FIG. 13B, invalid shutdown (or other failure condition) may prevent the second indicator 1372 and/or one or more packets (e.g., packet 1385) from being stored on the non-volatile storage media 1370. Accordingly, the non-volatile storage media 1370 in FIG. 13B does not include the data packet 1385 and/or the persistent indicator 1372. When reconstructing the storage metadata (or performing another storage operation), the atomic storage request is identified using the persistent indicator 1371. Data packets pertaining to the atomic storage request are identified using header information as described above. The persistent indicator 1372, however, is not on the non-volatile storage media 1370. Based upon the absence of the persistent indicator 1372, the atomic storage request is identified as being incomplete (failed). The failed atomic storage request may be rolled back, as described above. Accordingly, data pertaining to the incomplete atomic storage request may be invalidated and/or need not be included in the reconstructed storage metadata. Invalidating the data may comprise marking the data 1381, 1382, and 1383 as invalid in storage metadata, storing another persistent indicator, erasing the data, or the like. The data packet 1384 that is unrelated to the incomplete atomic storage request (based upon the header information thereof) is not invalidated.

FIG. 13C depicts another example of persistent indicators. In the FIG. 13C example, each data packet pertaining to the atomic storage request (packets 1381, 1382, 1383, and 1385) includes a persistent indicator 1373 identifying the atomic storage request. Advantageously, including the persistent indicator 1373 with the data to which it pertains is done in such a manner that both the indicator 1373 and its associated data are written to the storage media in a single non-divisible write operation. In this manner, the data and its indicator 1373 are either successfully written together or not and so there is no chance that the media will reflect and inconsistent state regarding the atomic request. The indicator 1373 may be included in the header (or other field) of the "first" packet 1381 and/or other, in-process packets 1382, and 1383 of the atomic storage request. Like the indicator 1371, the indicator 1373 identifies an in-process, incomplete atomic storage request (and indicates that the corresponding packet(s) are part of the request). A "last" packet 1385 of the request may include an indicator 1375, which, like the indicator 1372, indicates that the atomic storage request is complete. Omission of the indicator 1375 may allow an incomplete atomic storage operation to be identified and rolled back as described above. Indicator 1373 and 1375 may be the same type of indicator or comprise an encoding in accordance with a particular algorithm such that the presence of an indicator 1373, 1375 or absence of an indicator communicate the status of a completed or interrupted atomic storage request.

Figure 14:
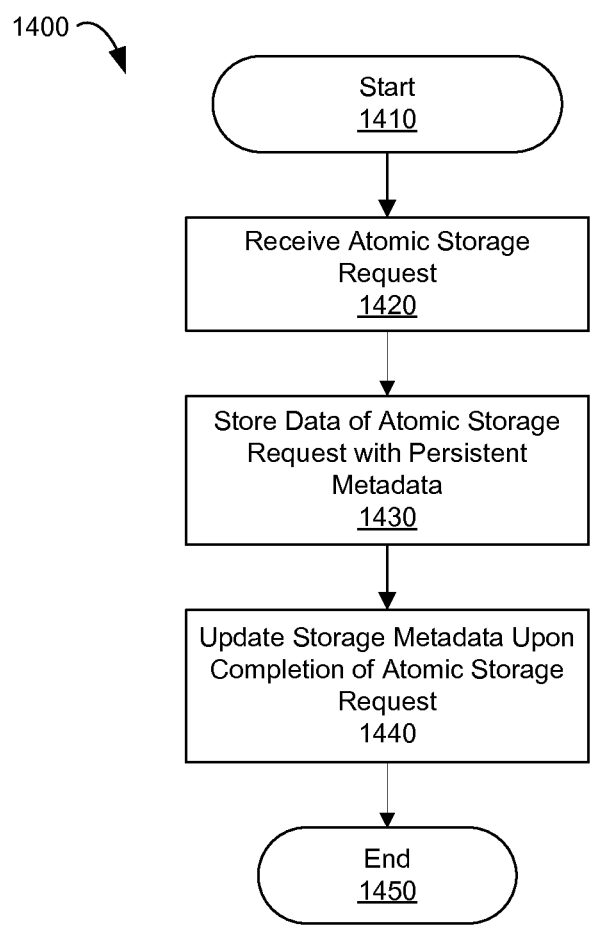
FIG. 14 is a flow diagram of one embodiment of a method for providing atomic storage operations on a non-volatile storage device.

FIG. 14 is a flow diagram of one embodiment of a method 1400 for storing data on a non-volatile storage device in an atomic storage operation. The method 1400 may be implemented within and/or in conjunction of a non-volatile storage system, such the storage system 102 described above. In some embodiments, steps of the method 1400 may be implemented in a driver or other storage layer of a computing device. Accordingly, portions of the method 1400 may be implemented as computer-readable instructions or modules) operating on a processor of a computing device (e.g., SL 430 and/or computing device 402 of FIG. 4). The instructions and/or modules of the method 1400 may be stored on a non-transitory computer-readable storage medium.

The method 1400 starts and is initialized at step 1410. Step 1410 may comprise initializing and/or allocating resources to manage the non-volatile storage device (e.g., non-volatile storage device 402), such as communications interfaces (e.g., bus, network, and so on), allocating volatile memory, accessing non-volatile storage media, and so on. The initialization may further comprise presenting a logical address space to one or more storage client, initializing storage metadata, and so on.

Step 1420 comprises receiving a request to perform an atomic storage operation on the non-volatile storage device. The request may pertain to one or more noncontiguous sets or ranges of logical identifiers in a logical address space of the non-volatile storage device. The atomic storage request may be received via an interface (e.g., API) presented by a storage layer.

Step 1430 comprises storing data pertaining to the atomic storage request on the non-volatile storage device. The data may be stored in connection with persistent metadata that identifies the data as pertaining to the atomic storage request. The persistent metadata may be stored with the data in a single storage operation; for example, the persistent metadata may be included in a packet or other container comprising the data. In some embodiments, the persistent metadata comprises a flag (e.g., "0"). Alternatively, or in addition, the persistent metadata may comprise an atomic storage request identifier, or the like.

Step 1430 may comprise storing the data contiguously within an event log on the non-volatile storage device. The contiguous storage may allow data pertaining to incomplete and/or failed atomic storage requests to be identified. Accordingly, step 1430 may comprise preventing other data that does not pertain to the atomic storage request from being interleaved with data of the atomic storage request. Step 1430 may, therefore, comprise disabling a garbage collector and/or a garbage collector bypass of a write data pipeline or the like.

In some embodiments, step 1430 further comprises maintaining the state of existing storage metadata. Accordingly, step 1430 may comprise tracking completion of the atomic storage request in an inflight index that is separate from a forward index of the storage metadata.

Step 1440 comprises updating storage metadata in response to completion of the atomic storage request. Step 1440 may comprise updating a forward index to assign logical identifiers of the atomic storage request to the physical storage locations comprising the data of the atomic storage request. Step 1440 may further comprise invalidating data overwritten and/or modified by the atomic storage request (e.g., marking obsolete data as invalid, removing references to obsolete data, and so on).

In some embodiments, step 1440 further comprises storing a persistent metadata flag to indicate completion of the atomic storage request within the event log (e.g., on the sequential log based data stored on the non-volatile storage device). The persistent metadata flag may be stored with a last packet of the atomic storage request. Alternatively, or in addition, the persistent metadata flag may be stored as a separate piece of data following a last packet of the atomic storage request.

At step 1450 the flow terminates until a next atomic storage request is received.

Figure 15:
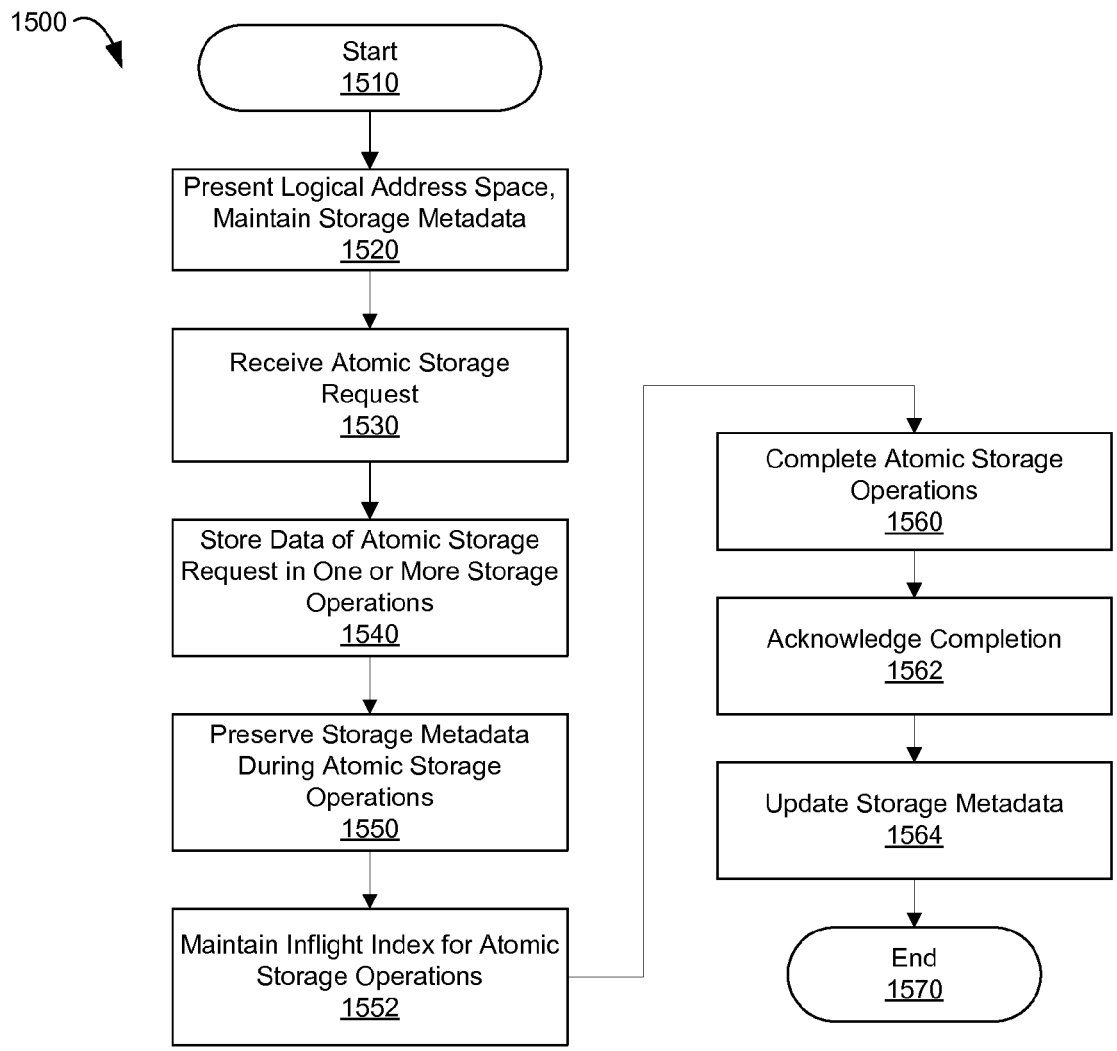
FIG. 15 is a flow diagram of another embodiment of a method for providing atomic storage operations on a non-volatile storage device.

FIG. 15 is a flow diagram 1500 of another embodiment of a method 1500 for storing data on a non-volatile storage device in an atomic storage operation. At steps 1510 the method 1500 starts and initialized, as described above.

Step 1520 comprises presenting a logical address space and/or maintaining storage metadata pertaining to the non-volatile storage device. The storage metadata may include a forward index that tracks allocations of the logical address space. The forward index may also maintain assignments between logical identifiers and physical storage locations on the non-volatile storage device. The storage metadata may further comprise a reverse index comprising metadata pertaining to physical storage locations on the non-volatile storage device.

At step 1530 a request to perform an atomic storage operation is received, as described above.

Step 1540 comprises storing data of the atomic storage request in one or more storage operations, as described above. Step 1540 may comprise storing a persistent metadata flag with the data that identifies the data as pertaining to the atomic storage request. The persistent metadata flag may comprise a flag bit ("0" or "1"). Accordingly, step 1540 may comprise storing the data contiguously on the non-volatile storage media, preventing other data that does not pertain to the atomic storage request from being interleaved with the data of the atomic storage request. Step 1540 may comprise disabling a groomer or garbage collection process and/or the garbage collection bypass described above.

Step 1550 comprises preserving the state of the storage metadata maintained at step 1520 while the storage operations of the atomic storage request are performed at step 1540. Step 1550 may comprise preventing previous versions of data overwritten and/or modified by the atomic storage request from being removed from the non-volatile storage device (e.g., marked as invalid). Step 1550 may further comprise preserving existing assignments between logical identifiers and physical storage locations in the forward index.

In some embodiments, the storage metadata is preserved by maintaining metadata pertaining to the atomic storage operations in a separate inflight index. The inflight index may comprise assignments between logical identifiers of the atomic storage request and physical storage locations comprising data of the atomic storage request.

Step 1552 may further comprise leveraging the inflight index to prevent read and/or write hazards as described above. The inflight index of step 1552 may also be used to prevent another storage client from allocating a logical identifier of the atomic storage operation.

Step 1560 comprises completing the one or more storage operations of the atomic storage request. Step 1560 may comprise storing a persistent metadata flag with a final data segment of the atomic storage request to indicate that the atomic storage request is complete. The persistent metadata flag may comprise a "1," an identifier, or the like.

Step 1562 comprises acknowledging completion of the atomic storage request to a storage client or the like. The acknowledgement of step 1562 may be sent asynchronously via a callback or other mechanism. Alternatively, the atomic storage request may be synchronous, and the acknowledgement of step 1562 may comprise returning from a synchronous function or method call.

In some embodiments, the acknowledgement of step 1562 is provided as soon as it can be assured that the data of the atomic storage request will be persisted to the non-volatile storage device, but before the data is actually stored thereon. For example, the acknowledgement of step 1562 may be sent upon transferring data of the atomic storage request into a buffer of the non-volatile storage device, into a write data pipeline, transferring the data to a storage controller (e.g., within a protection domain of the storage controller 404), or the like.

Step 1564 comprises updating the storage metadata (e.g., storage metadata 434) to reflect completion of the atomic storage request. Step 1564 may comprise removing one or more entries from an inflight index and/or updating the forward index in accordance with one or more entries in the inflight data structure. The updating may further comprise invalidating data overwritten and/or modified by the atomic storage request (e.g., in a reverse index, or the like).

At step 1570, the flow 1500 ends until a next atomic storage request is received.

Figure 16:
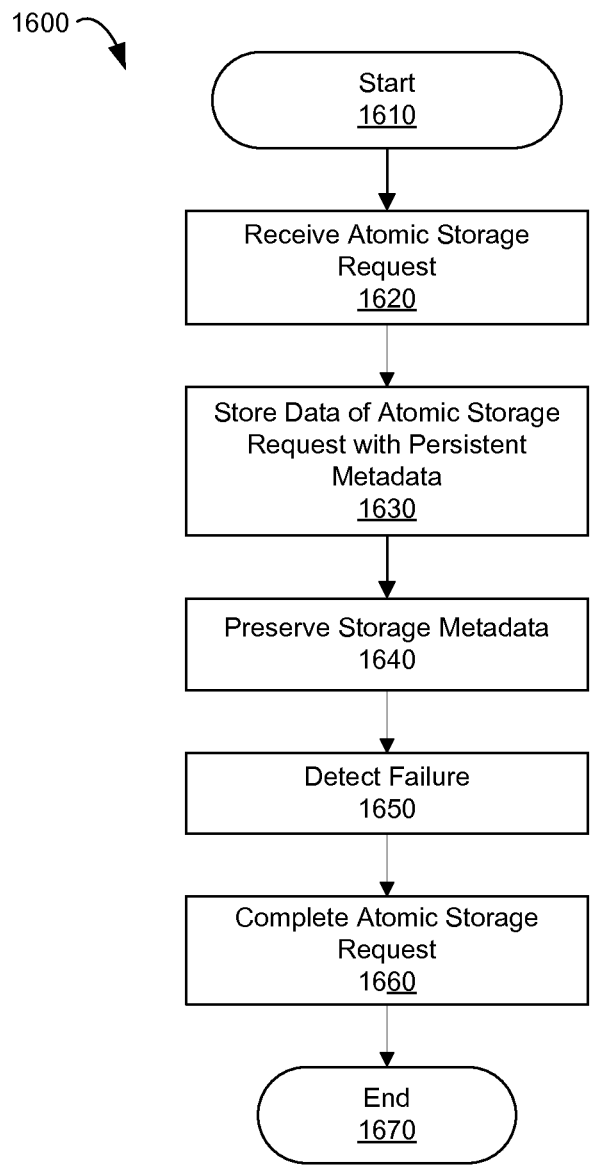
FIG. 16 is a flow diagram of another embodiment of a method for providing atomic storage operations on a non-volatile storage device.

FIG. 16 is a flow diagram of one embodiment of a method 1600 for storing data on a non-volatile storage device in an atomic storage operation. At steps 1610 1620, and 1630, the method 1600 starts, is initialized, receives an atomic storage request, and stores data of the atomic storage request with persistent metadata flags as described above.

Step 1640 comprises preserving storage metadata during one or more storage operations of the atomic storage request, as described above.

Step 1650 comprises detecting a failure condition pertaining to the non-volatile storage device. The failure condition may be due to any number of reasons including, but not limited to: a hardware fault of a host computing device, a software fault of a host computing device, power loss, or the like.

Step 1660 comprises completing the atomic storage request despite the failure condition. Step 1660 may comprise flushing a buffer of the non-volatile storage device to complete the atomic storage request, programming contents of a write buffer, or the like. While the atomic storage request is being completed, the non-volatile storage device may operate independently of the host computing device and/or using a secondary power source. The secondary power source may comprise a battery, capacitor, or other power storage device.

The method ends at step 1670.

Figure 17:
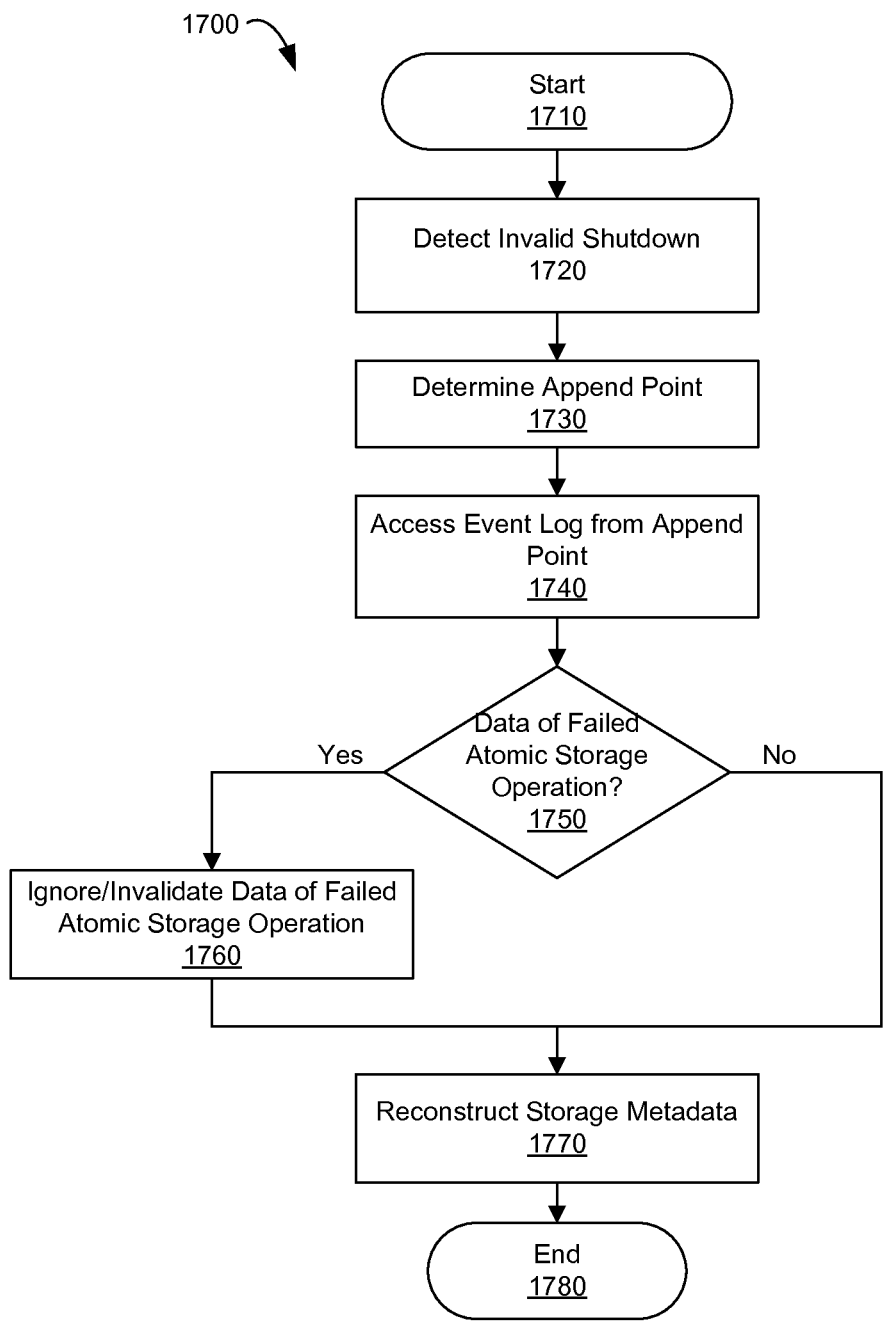
FIG. 17 is a flow diagram of one embodiment of a method for reconstructing storage metadata from an event log of sequential log-based data.

FIG. 17 is a flow diagram of one embodiment of a method 1700 for reconstructing storage metadata from an event log of sequential log-based data. At step 1710 the method 1700 starts and is initialized as described above.

Step 1720 comprises detecting an invalid shutdown of the non-volatile storage device. Step 1720 may comprise determining that storage metadata is not available (e.g., was not persisted during shutdown). Alternatively, or in addition, step 1720 may comprise determining that closure data (e.g., pre-determined data sequence) was not stored on the non-volatile storage device before shutdown. In response to detecting the invalid shutdown and/or lack of current storage metadata, the method 1700 reconstructs the storage metadata from the event log of storage operations persisted in the sequential log-based data stored on the non-volatile storage device.

Step 1730 comprises determining the current append point on the non-volatile storage device. The append point may be stored in a persistent storage location. Alternatively, the method 1700 may determine the append point using sequence indicators on storage divisions of the non-volatile storage device. The append point may be identified as the location comprising the most current sequence indicator. In some embodiments, the append point is identified by progressively scanning the non-volatile storage device starting at a particular location (e.g., chip 0, erase block 0, page 0, etc.) until the append point is found.

Step 1740 comprises accessing the event log sequentially from the append point. The access of step 1740 may traverse the event log backwards from the append point (e.g., starting at the most current data at the append point and moving backwards through the sequence of storage operations in the event log).

Step 1750 comprises identifying failed atomic storage operation(s) based upon the traversal of the event log. As discussed above, data may be stored in conjunction with persistent metadata flags that identify data as pertaining to an atomic storage operation. In some embodiments, a persistent metadata flag "0" identifies data of an incomplete atomic storage operation and a persistent metadata flag "1" indicates completion of an atomic storage operation. When the traversal of the event log at step 1740 encounters data flagged with "0," step 1750 identifies the data as pertaining to a failed atomic storage request and the flow continues to step 1760. In other embodiments, persistent metadata flags may comprise persistent indicators stored separately from the data and/or persistent metadata flags comprising an atomic storage request identifier. Step 1750 may, therefore, comprise identifying data pertaining to an atomic storage request that has not been closed and/or for which no completion persistent indicator is found. When data pertaining to a failed (or incomplete) atomic storage request is identified, the flow continues to step 1760; otherwise the flow continues to step 1770.

Step 1760 comprises invalidating and/or ignoring the data pertaining to the failed atomic storage request. Step 1760 may comprise omitting the physical storage locations associated with the failed atomic storage request from a forward index and/or marking the physical storage locations as invalid in a reverse index.

Step 1770 comprises reconstructing storage metadata from the sequential log-based data of the event log, as described above. Logical identifiers associated with the data may be determined from persistent metadata stored with the data as part of the log-based data format. The most current version of data of a particular logical identifier is determined based upon the relative ordering of the data in the event log (e.g., based upon an offset of the data from the append point and/or a sequence indicator associated with the data).

The flow ends at step 1780.

We claim:

1. A method, comprising:
    storing a plurality of data units pertaining to an atomic storage request sequentially at an append point of a log within a physical address space of a non-volatile storage device in a plurality of storage operations, each storage operation to write a respective data unit at the append point of the log with respective persistent metadata and to advance the append point sequentially in the physical address space, such that physical storage addresses of data units stored within the log correspond to a sequence order of the data units, wherein:
        the persistent metadata of data units to be written in storage operations other than a last storage operation of the atomic storage request comprises a first value configured to indicate that the data units correspond to an incomplete atomic storage request, and
        the persistent metadata of a data unit to be written in the last storage operation of the atomic storage request comprises a second value configured to indicate that the plurality of data units correspond to a completed atomic storage request; and
    determining whether the atomic storage request completed, the determining comprising:
        traversing data units stored within the log in a reverse sequence order of the data units, the reverse sequence order corresponding to physical storage addresses of the data units stored within the log; and
        accessing the persistent metadata of a first data unit in the reverse sequence order.

2. The method of claim 1, further comprising:
    updating translation metadata of the non-volatile storage device in response to writing the last data unit on the non-volatile storage device, wherein:
        the translation metadata is updated such that client requests pertaining to logical identifiers of the atomic storage request are associated with respective physical storage addresses of the data units written to the non-volatile storage device, and
    logical identifiers of the atomic storage request are non-contiguous within a logical address space.

3. The method of claim 1, further comprising acknowledging completion of the atomic storage request in response to one or more of transferring the data units to a write buffer of the non-volatile storage device, transferring the data units to a protection domain of the non-volatile storage device, transferring the data units to a powercut safe domain of the non-volatile storage device, and storing the data units on a non-volatile storage medium of the non-volatile storage device.

4. The method of claim 1, further comprising updating a forward index to assign logical identifiers of the atomic storage request to the respective physical storage locations of the data units pertaining to the atomic storage request stored on the non-volatile storage device.

5. The method of claim 1, further comprising invalidating one or more data units stored on the non-volatile storage device in response to determining that the one or more data units do not correspond to a data unit written with persistent metadata comprising the second value.

6. The method of claim 1, wherein traversing the data units stored within the log in the reverse sequencer order comprises determining a physical storage address of a data unit stored at a head of the log based on physical storage addresses of the data units stored within the log; and
   determining whether the plurality of write operations of the atomic storage request completed successfully based on the persistent metadata included in the first data unit accessed at the head of the log.

7. The method of claim 1, wherein the data units are stored at contiguous physical storage addresses of the non-volatile storage device.

8. The method of claim 1, further comprising disabling a garbage collection bypass while storing the plurality of data units on the non-volatile storage device.

9. The method of claim 1, further comprising:
   detecting a loss of a primary power source of the non-volatile storage device; and
   completing one or more of the plurality of storage operations of the atomic storage request using a secondary power source.

10. The method of claim 1, wherein a logical identifier of the atomic storage request is associated with existing data stored on the non-volatile storage device, the method further comprising:
    preserving an association between the logical identifier and the existing data in logical-to-physical translation metadata pertaining to the non-volatile storage device until the last data unit is written to the non-volatile storage device; and
    preserving the existing data on the non-volatile storage device until the last data unit is stored on the non-volatile storage device.

11. The method of claim 1, further comprising:
    maintaining translation metadata for the non-volatile storage device, the translation metadata comprising logical-to-physical assignments between logical identifiers and data stored on the non-volatile storage device;
    tracking completion of the atomic storage request in inflight metadata, independent of the translation metadata, the tracking comprising recording logical-to-physical assignments between logical identifiers of the atomic storage request and the data units pertaining to the atomic storage request stored on the non-volatile storage device in the inflight metadata, such that the logical-to-physical assignments recorded in the inflight metadata differ from corresponding logical-to-physical assignments of the translation metadata; and
    updating the translation metadata with the logical-to-physical assignments of the inflight metadata in response to writing the last data unit on the non-volatile storage device.

12. The method of claim 11, further comprising accessing the inflight metadata structure to prevent one or more of a read hazard and a write hazard.

13. A non-transitory computer-readable storage medium comprising machine-readable instructions configured to cause a machine to perform operations, comprising:
    storing data of an atomic storage request on the non-volatile storage device within a plurality of data packets, each data packet stored in a respective storage operation comprising, writing the data packet at an append point for a log maintained on a non-volatile storage medium and advancing the append point sequentially within a physical address space of the non-volatile storage medium, such that physical addresses of the data packets appended to the log correspond to a sequencer order of the data units, wherein:
       data packets to be appended to the log in storage operations other than a last storage operation of the atomic storage request comprise a first persistent flag configured to indicate that the data packets correspond to an incomplete atomic storage operation, and
       a data packet to be appended to the log in the last storage operation of the atomic storage request comprises a second persistent value configured to indicate that the plurality of data packets correspond to a complete atomic storage operation; and
    determining whether the atomic storage request was successful, the determining comprising:
       accessing data packets stored within the log on the non-volatile storage medium in a reverse sequence order, the reverse sequencer order corresponding to physical addresses of the data packets on the non-volatile storage medium; and
       evaluating a persistent flag of a first data packet accessed in the reverse sequence order.

14. The non-transitory computer-readable storage medium of claim 13, the operations further comprising:
    maintaining a forward index comprising associations between logical identifiers of a logical address space and physical storage locations storing data corresponding to the logical identifiers on a non-volatile storage medium;
    recording associations between logical identifiers of the atomic storage request and physical addresses of respective data packets stored within the log in an inflight index separate from the forward index;
    updating the forward index with the associations recorded in the inflight index in response to completing the last storage operation of the atomic storage request; and
    acknowledging completion of the atomic storage request in response to the updating.

15. An apparatus for providing atomic storage operations, comprising:
    a non-volatile storage device comprising a non-volatile storage medium; and
    a storage layer configured to:
       receive an atomic storage request from a storage client, and
       store a plurality of data segments of the atomic storage request within a log on the non-volatile storage device, each data segment being written to the log in a respective storage operation, comprising writing the data segment at an append point for the log together with persistent metadata, and advancing the append point sequentially within a storage address space of the non-volatile storage device, such that storage addresses of the data segments stored on the non-volatile storage device correspond to a sequence order of the data segments in the log, wherein:
the persistent metadata stored with data segments to be written in storage operations other than a last storage operation of the atomic storage request comprises a first value configured to indicate that the data segments correspond to an incomplete atomic storage request, and
the persistent metadata stored with a data segment to be written in the last storage operation of the atomic storage request comprises a second value configured to indicate that the plurality of data segments correspond to a completed atomic storage request; and
to determine whether the atomic storage request was successfully completed, the storage layer is further configured to:
identify a current append point of the log within the storage address space of the non-volatile storage device, and
read persistent metadata of a data segment stored at the current append point of the log.

16. The apparatus of claim 15, wherein the storage layer is further configured to:
maintain a forward index comprising assignments between logical identifiers of the logical address space and corresponding data stored on the non-volatile storage device, the forward index comprising an assignment between a particular logical identifier of the atomic storage request and existing data stored on the non-volatile storage device;
maintain the assignments of the translation metadata, including the assignment between the particular logical identifier and the existing data, while the plurality of data segments of the atomic storage request are stored on the non-volatile storage device; and
update the forward index to assign the particular logical identifier to a stored data segment of the atomic storage request in response to completing storing the last storage operation of the atomic storage request on the non-volatile storage medium.

17. The apparatus of claim 15, wherein the storage layer is further configured to:
determine that the atomic storage request failed in response to the persistent metadata of the first data segment comprising the first value; and
invalidate the first data segment in response to determining that the atomic storage request failed.

18. The apparatus of claim 17, wherein the storage layer is further configured to:
invalidate one or more data segments that precede the first data segment in the sequence order in the log in response to persistent metadata of the one more data segments comprising the first value.

19. The apparatus of claim 17, wherein, in response to determining that the atomic storage request failed, the storage layer is further configured to:
traverse data segments appended to the log in a reverse sequence order, the reverse sequence order corresponding to storage addresses of the data segments stored on the non-volatile storage device; and
to invalidate data segments accessed while traversing the log in the reverse sequence order until accessing a data segment stored with persistent metadata comprising the second value.

* * * * *